(12) United States Patent  
Kimishima

(10) Patent No.: US 10,909,631 B2  
(45) Date of Patent: Feb. 2, 2021

(54) INFORMATION PROCESSING APPARATUS AND METHOD

(71) Applicant: SONY CORPORATION, Tokyo (JP)

(72) Inventor: Masato Kimishima, Tokyo (JP)

(73) Assignee: SONY CORPORATION, Tokyo (JP)

( * ) Notice: Subject to any disclaimer, the term of this patent is extended or adjusted under 35 U.S.C. 154(b) by 106 days.

(21) Appl. No.: 16/097,415

(22) PCT Filed: Apr. 21, 2017

(86) PCT No.: PCT/JP2017/015965  
§ 371 (c)(1),  
(2) Date: Oct. 29, 2018

(87) PCT Pub. No.: WO2017/191762  
PCT Pub. Date: Nov. 9, 2017

(65) Prior Publication Data  
US 2019/0156424 A1    May 23, 2019

(30) Foreign Application Priority Data

May 6, 2016    (JP) .................................. 2016-093236

(51) Int. Cl.  
*G06Q 10/10* (2012.01)  
*G06Q 40/08* (2012.01)  
*G06Q 20/10* (2012.01)

(52) U.S. Cl.  
CPC ............ *G06Q 40/08* (2013.01); *G06Q 20/10* (2013.01)

(58) Field of Classification Search  
CPC ............................... G06Q 40/08; G06Q 20/10  
USPC .......................................................... 705/4  
See application file for complete search history.

(56) References Cited

U.S. PATENT DOCUMENTS

2012/0197669 A1*  8/2012  Kote ..................... G06Q 40/08  
                                                    705/4  
2016/0217531 A1*  7/2016  Ishikawa ............... G06Q 40/08

FOREIGN PATENT DOCUMENTS

| EP | 2668630 A2 | 12/2013 |
| JP | 2002-304530 A | 10/2002 |
| JP | 2004-102801 A | 4/2004 |
| JP | 2008-021204 A | 1/2008 |
| JP | 2016-103275 A | 6/2016 |
| WO | 03/065261 A1 | 8/2003 |

(Continued)

OTHER PUBLICATIONS

International Search Report and Written Opinion of PCT Application No. PCT/JP2017/015965, dated Jul. 4, 2017, 11 pages of ISRWO.

*Primary Examiner* — Hai Tran  
(74) *Attorney, Agent, or Firm* — Chip Law Group

(57) ABSTRACT

The present technology relates to an information processing apparatus a method for enabling obtainment of a more appropriate compensation for a service. An information processing apparatus includes a reception unit that receives health state information regarding a health state of a user, a calculation unit that calculates a compensation for a service on the basis of the health state information before getting-in to a vehicle by the user or before presenting the compensation for the service regarding the getting-in to a vehicle to the user, and a transmission unit that transmits information indicating the compensation for the service. The present technology can be applied to automobile insurance services.

10 Claims, 42 Drawing Sheets

(56) References Cited

FOREIGN PATENT DOCUMENTS

WO       2003/065261 A1    8/2003
WO       2012/103306 A2    8/2012

\* cited by examiner

INFORMATION PROCESSING APPARATUS AND METHOD

CROSS REFERENCE TO RELATED APPLICATIONS

This application is a U.S. National Phase of International Patent Application No. PCT/JP2017/015965 filed on Apr. 21, 2017, which claims priority benefit of Japanese Patent Application No. JP 2016-093236 filed in the Japan Patent Office on May 6, 2016. Each of the above-referenced applications is hereby incorporated herein by reference in its entirety.

TECHNICAL FIELD

The present technology relates to an information processing apparatus, a method, and a program, and in particular to an information processing apparatus, a method, and a program for enabling obtainment of a more appropriate compensation for a service.

BACKGROUND ART

Conventionally, in automobile insurance, a technology to determine an insurance premium to be paid by a user who is an insured person according to a traffic violation history, an accident history, or the like of the user has been proposed (for example, see Patent Document 1).

In such a technology, at the time of subscription for automobile insurance, an insurance service provider makes an inquiry to a user individual about a traffic violation history, an accident history, a continuous seat load time, an average daily travel distance, an average daily sleep time, and an average daily seat load time. Then, the insurance service provider determines an insurance premium according to the answer to the inquiry input by the user.

If the insurance premium is determined for each user in this manner, the insurance premium of the user with a low accident rate can be preferentially treated and the burden on the user can be reduced.

CITATION LIST

Patent Document

Patent Document 1: Japanese Patent Application Laid-Open No. 2002-304530

SUMMARY OF THE INVENTION

Problems to be Solved by the Invention

However, it has been difficult to more appropriately obtain the insurance premium that is a compensation for the service as automobile insurance by the above-described technology.

For example, the average daily sleep time answered by the user is information regarding a health state of the user, and the user who lives a healthy life should have a low accident rate. Therefore, it is conceivable to make the insurance premium cheap for the user who has a long average daily sleep time.

However, since the average daily sleep time input by the user is self-reported information, the information is not accurate. Therefore, it cannot be said that sufficiently appropriate insurance premiums have been determined for the users from such information.

The present technology has been made in view of the foregoing, and enables obtainment of a more appropriate compensation for services.

Solutions to Problems

An information processing apparatus according to a first aspect of the present technology includes a reception unit configured to receive health state information regarding a health state of a user, a calculation unit configured to calculate a compensation for a service on the basis of the health state information before getting-in to a vehicle by the user or before presenting the compensation for the service regarding the getting-in to a vehicle to the user, and a transmission unit configured to transmit information indicating the compensation for the service.

The health state information can be information regarding behavior of the user.

The health state information can be information regarding a biological state of the user.

The compensation for the service can be an insurance premium of automobile insurance.

The calculation unit can calculate the compensation for the service on the basis of the health state information and information regarding getting-in by the user.

An information processing method or a program according to a first aspect of the present technology includes steps of receiving health state information regarding a health state of a user, calculating a compensation for a service on the basis of the health state information before getting-in to a vehicle by the user or before presenting the compensation for the service regarding the getting-in to a vehicle to the user, and transmitting information indicating the compensation for the service.

In the first aspect of the present technology, the health state information regarding a health state of a user is received, the compensation for a service on the basis of the health state information before getting-in to a vehicle by the user or before presenting the compensation for the service regarding the getting-in to a vehicle to the user is calculated, and the information indicating the compensation for the service is transmitted.

An information processing apparatus according to a second aspect of the present technology includes a recording unit configured to record health state information regarding a health state of a user, a communication unit configured to transmit the health state information for calculating a compensation for a service regarding getting-in to a vehicle by the user, and receive information indicating the compensation for the service, and a display control unit configured to control display of the information regarding the compensation for the service.

The health state information can be information regarding behavior of the user.

The health state information can be information regarding a biological state of the user.

The compensation for the service can be an insurance premium of automobile insurance.

The information processing apparatus further includes a driving determination processing unit configured to determine whether or not the user is driving the vehicle, in which the communication unit can transmit the health state information in a predetermined period immediately before the user drives the vehicle.

An information processing method or a program according to the second aspect of the present technology includes steps of recording health state information regarding a health state of a user, transmitting the health state information for calculating a compensation for a service regarding getting-in to a vehicle by the user, and receiving information indicating the compensation for the service, and controlling display of the information regarding the compensation for the service.

In the second aspect of the present technology, the recording health state information regarding a health state of a user is recorded, the health state information for calculating a compensation for a service regarding getting-in to a vehicle by the user is transmitted and the information indicating the compensation for the service is received, and the display of the information regarding the compensation for the service is controlled.

An information processing apparatus according to a third aspect of the present technology includes an authentication processing unit configured to authenticate a user who has got into a vehicle, a health state information acquisition unit configured to acquire health state information regarding a health state of the authenticated user, and a communication unit configured to transmit the health state information for calculating a compensation for a service regarding getting-in to the vehicle by the user, and receive information indicating the compensation for the service.

The information processing apparatus according can further include a display control unit configured to control display of the information indicating the compensation for the service.

The communication unit can transmit the information regarding the compensation for the service to a terminal device of the user.

The compensation for the service can be an insurance premium of automobile insurance.

An information processing method or a program according to the third aspect of the present technology includes steps of authenticating a user who has got into a vehicle, acquiring health state information regarding a health state of the authenticated user, and transmitting the health state information for calculating a compensation for a service regarding getting-in to the vehicle by the user, and receiving information indicating the compensation for the service.

In the third aspect of the present technology, the user who has got into a vehicle is authenticated, the health state information regarding a health state of the authenticated user is acquired, and the health state information for calculating a compensation for a service regarding getting-in to the vehicle by the user is transmitted and the information indicating the compensation for the service is received.

Effects of the Invention

According to the first to third aspects of the present technology, a more appropriate compensation for services can be obtained.

Note that the effects described here are not necessarily limited, and any of effects described in the present disclosure may be exhibited.

MODE FOR CARRYING OUT THE INVENTION

Hereinafter, embodiments to which the present technology is applied will be described with reference to the drawings.

First Embodiment

<Configuration Example of Automobile Insurance System>

The present technology is to obtain a more appropriate compensation borne by a user for a service regarding a vehicle such as automobile insurance on the basis of time series information regarding a health state of the user and information regarding getting-in to the vehicle by the user.

Note that the service regarding a vehicle can be any service as long as the service is a service regarding getting-in to a vehicle, such as automobile insurance, a transportation service by taxis or the like, a service regarding use of means of transportation such as a bus and a train, a content viewing service at the time of getting into a vehicle, or the like. Hereinafter, the automobile insurance will be mainly described as a specific example. In this case, the service regarding getting-in to a vehicle is the automobile insurance, and the compensation for the service is an insurance premium.

For example, since a user who lives a healthy life should have a low accident rate, if such a user is preferentially treated and a discount amount of the insurance premium is made large, the burden on the user with the low accident rate can be reduced.

Further, by preferentially treating the user with a low accident rate, not only a large number of users with a low accident rate subscribe the automobile insurance but also users who have subscribed the automobile insurance refrain from everyday behavior leading to an increase in the accident rate in order to get a large discount amount. Then, not only occurrence of an accident can be suppressed but also insurance money paid by an insurance company can be reduced.

In the present technology, a safe driving degree of a user is calculated on the basis of health state time series data indicating a health state of the user, which is obtained from behavior information, biological information, and the like at the time of non-driving of the user, and driving determination information indicating whether or not the user is driving, and the insurance premium is determined on the basis of the safe driving degree. In this way, by use of the health state time series data at the time of non-driving, which is not the self-reported information of the user, a more appropriate and highly accurate insurance premium can be calculated.

Hereinafter, more specific embodiments will be described.

Figure 1:
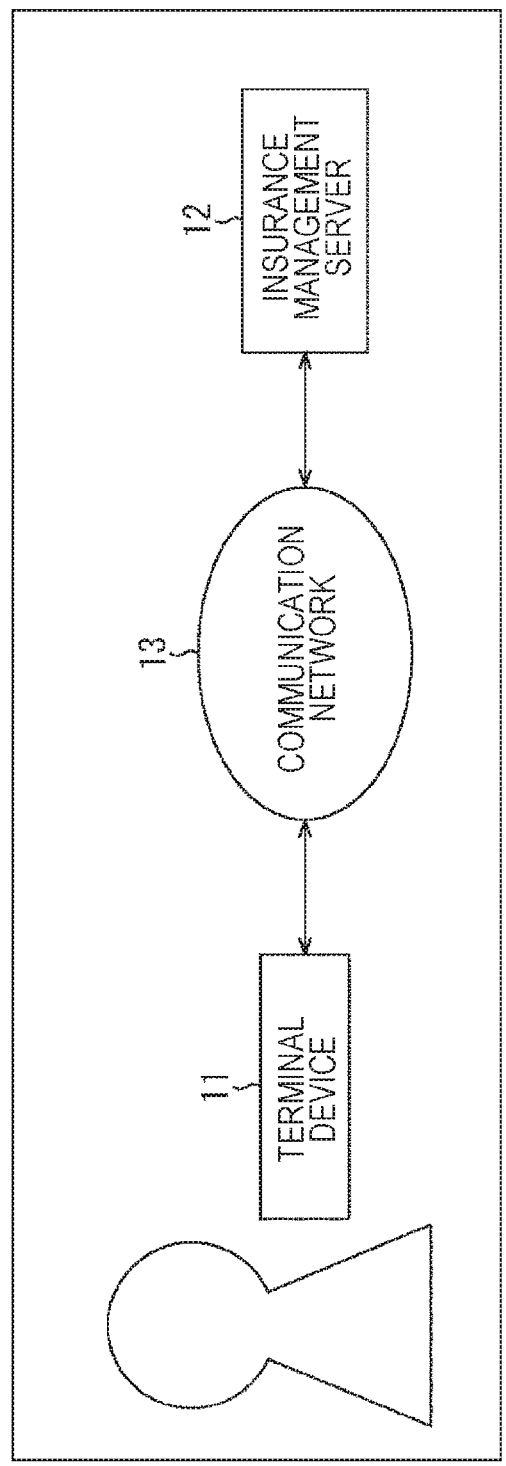
FIG. 1 is a diagram illustrating a configuration example of an automobile insurance system.

FIG. 1 is a diagram illustrating a configuration example of an embodiment of an automobile insurance system to which the present technology is applied.

The automobile insurance system illustrated in FIG. 1 includes a terminal device 11 possessed by a user who is an insured person of automobile insurance, and an insurance management server 12 managed by an insurance company that provides an automobile insurance service. The terminal device 11 and the insurance management server 12 are mutually connected via a communication network 13.

The terminal device 11 can be, for example, a portable terminal device such as a smartphone, a wearable device that can be worn on an arm or the like of the user, or the like.

The terminal device 11 acquires health state time series data that is time series data regarding a health state of the user, that is, data at each time, and determines whether or not the user is driving a vehicle and generates driving determination information indicating a determination result.

Further, the terminal device 11 transmits the driving determination information and the health state time series data to the insurance management server 12 via the communication network 13 at timing when the user starts driving. At this time, the terminal device 11, for example, transmits the health state time series data in a predetermined time range immediately before the user starts driving, specifically, for example, the health state time series data of most recent one day to the insurance management server 12.

The insurance management server 12 receives the health state time series data and the driving determination information transmitted from the terminal device 11 and calculates a safe driving degree indicating the degree of safe driving of the user on the basis of the health state time series data.

Further, the insurance management server 12 calculates an insurance premium of the user on the basis of the safe driving degree, and generates insurance premium amount information that is information regarding the calculated insurance premium. In this way, by calculating the insurance premium on the basis of the health state time series data of up to immediately before the user starts driving, a more appropriate insurance premium can be calculated. Furthermore, the health state time series data is data acquired by the terminal device 11, not self-reported data by the user, and is thus more reliable data. Therefore, by use of such health state time series data, a more appropriate insurance premium can be determined.

Further, the insurance management server 12 transmits the generated insurance premium amount information to the terminal device 11 via the communication network 13. When receiving the insurance premium amount information from the insurance management server 12, the terminal device 11 displays the insurance premium amount information. With the display, the user can confirm his/her own insurance premium and the like.

Note that the insurance management server 12 has been described as a server managed by the insurance company. However, calculation of the insurance premium may be performed by a server of another company that is entrusted by the insurance company. Further, the insurance management server 12 may be a server that manages information regarding insured persons of the automobile insurance, or may be another server connected with such a server.

<Configuration Example of Terminal Device>

Next, more specific configuration examples of the terminal device 11 and the insurance management server 12 illustrated in FIG. 1 will be described.

Figure 2:
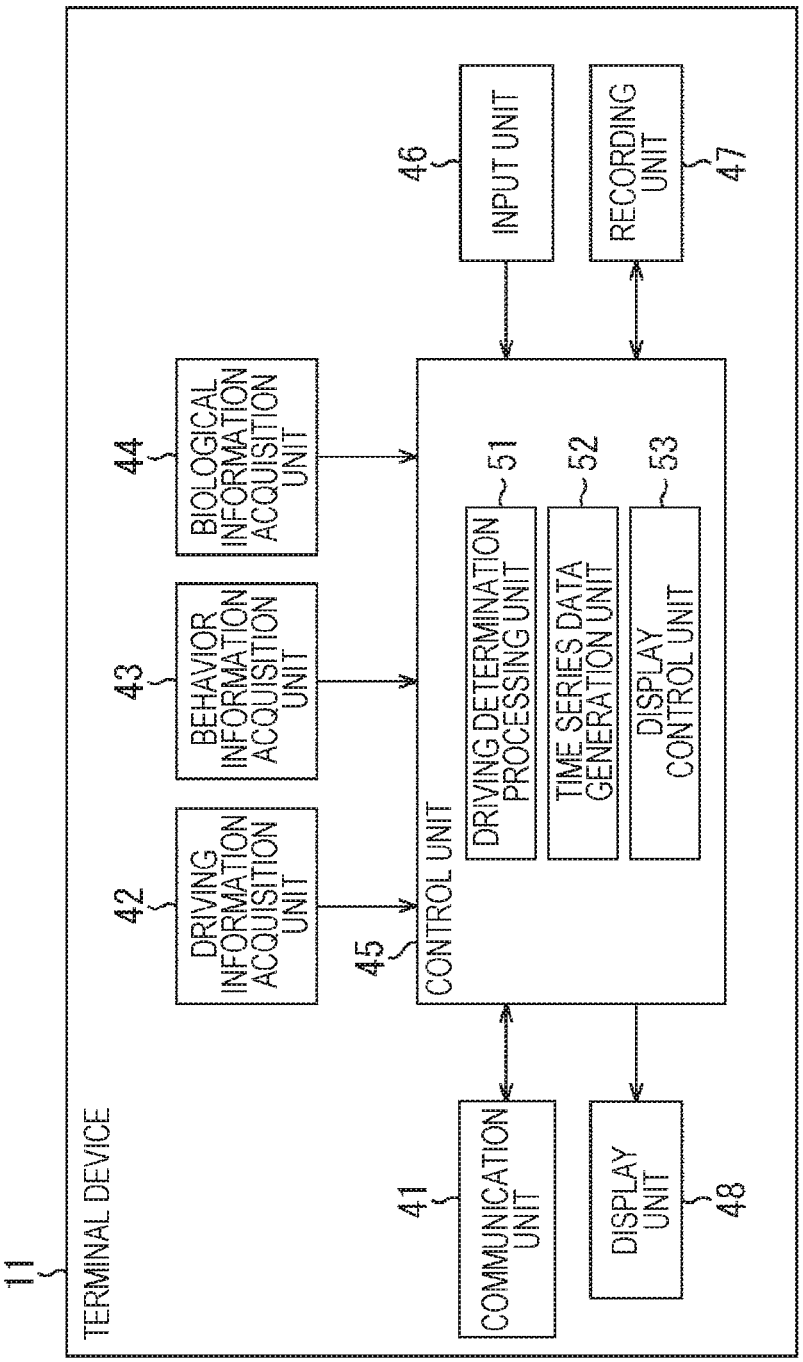
FIG. 2 is a diagram illustrating a configuration example of a terminal device.

The terminal device 11 is configured, for example, as illustrated in FIG. 2.

The terminal device 11 includes a communication unit 41, a driving information acquisition unit 42, a behavior information acquisition unit 43, a biological information acquisition unit 44, a control unit 45, an input unit 46, a recording unit 47, and a display unit 48.

The communication unit 41 transmits information supplied from the control unit 45 to the insurance management server 12 via the communication network 13, and receives information transmitted from the insurance management server 12 and supplies the information to the control unit 45 via the communication network 13.

The driving information acquisition unit 42 includes, for example, a position measuring unit that measures its own position, such as a satellite positioning system typified by a global positioning system (GPS), an acceleration sensor, and the like, and acquires driving information for determining driving of the vehicle by the user and supplies the driving information to the control unit 45.

The behavior information acquisition unit 43 includes, for example, a position measuring unit such as a satellite positioning system, an acceleration sensor, and the like, and acquires behavior information for obtaining a behavior state of the user and supplies the behavior information to the control unit 45.

Note that one position measuring unit and one acceleration sensor may function as the driving information acquisition unit 42 and also function as the behavior information acquisition unit 43, or the position measuring unit and the acceleration sensor may be provided as the driving information acquisition unit 42 and the behavior information acquisition unit 43 for each piece of information of acquisition purpose.

The biological information acquisition unit 44 includes a biological sensor, a blood pressure monitor, and the like for measuring a heart rate, a blood pressure, and a respiratory rate of the user, for example, and acquires biological information indicating a biological state such as the blood pressure, the heart rate, and the respiratory rate of the user and supplies the biological information to the control unit 45. For example, the biological sensor irradiates a predetermined portion of the user with light, receives reflection light, which is obtained as the light is reflected inside the user such as a blood vessel, and calculates the blood pressure, the heart rate, and the like as the biological information on the basis of an amount of received light of the reflection light.

The control unit 45 controls operation of the entire terminal device 11. The control unit 45 includes a driving determination processing unit 51, a time series data generation unit 52, and a display control unit 53.

The driving determination processing unit 51 determines whether or not the user is driving the vehicle, that is, whether or not the user starts driving, on the basis of the driving information supplied from the driving information acquisition unit 42, and generates driving determination information indicating a determination result.

The time series data generation unit 52 generates health state time series data on the basis of the behavior information supplied from the behavior information acquisition unit 43 and the biological information supplied from the biological information acquisition unit 44, and causes the recording unit 47 to record the health state time series data. Note that the health state time series data may be generated using at least one of the behavior information and the biological information.

The display control unit 53 controls display of various kinds of information and images on the display unit 48.

The input unit 46 includes, for example, a touch panel, a button, a switch, and the like provided superimposed on the display unit 48, and supplies a signal corresponding to an operation of the user to the control unit 45. The recording unit 47 includes a nonvolatile recording medium, and records various kinds of information supplied from the control unit 45 and supplies the recorded information to the control unit 45 as necessary.

The display unit 48 includes, for example, a liquid crystal display panel and the like, and displays various kinds of information and images under the control of the display control unit 53.

<Configuration Example of Insurance Management Server>

Figure 3:
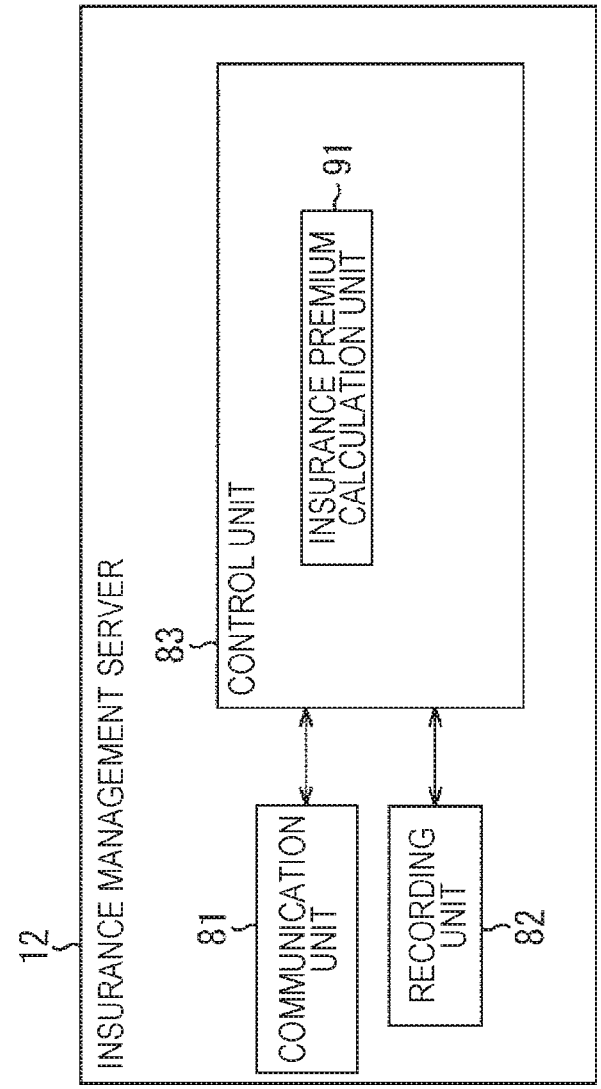
FIG. 3 is a diagram illustrating a configuration example of an insurance management server.

Further, the insurance management server 12 is configured as illustrated in FIG. 3, for example.

The insurance management server 12 includes a communication unit 81, a recording unit 82, and a control unit 83.

The communication unit 81 transmits information supplied from the control unit 83 to the terminal device 11 via the communication network 13, and receives information transmitted from the terminal device 11 and supplies the information to the control unit 83 via the communication network 13.

The recording unit 82 includes, for example, a nonvolatile recording medium, and records various kinds of information such as information regarding registration of each user who is an insured person of the automobile insurance, information used for calculation of the insurance premium, and the health state time series data. Further, the recording unit 82 supplies the recorded information to the control unit 83 as necessary.

The control unit 83 controls the operation of the entire insurance management server 12. The control unit 83 includes an insurance premium calculation unit 91. The insurance premium calculation unit 91 calculates the safe driving degree and the insurance premium and generates insurance premium amount information on the basis of the health state time series data and the information recorded in the recording unit 82.

<Description of Driving Determination Information Transmission Processing and Insurance Premium Calculation Processing>

Next, operation of the terminal device 11 and the insurance management server 12 will be described. That is, driving determination information transmission processing by the terminal device 11 and insurance premium calculation processing by the insurance management server 12 will be described with reference to the flowchart in FIG. 4.

In step S11, the driving determination processing unit 51 of the terminal device 11 performs driving determination processing on the basis of the driving information supplied from the driving information acquisition unit 42. This driving determination processing is performed every fixed period, for example.

Specifically, the driving information is supplied every fixed period from the driving information acquisition unit 42 to the control unit 45. For example, in the case where an acceleration at each time measured by the acceleration sensor is supplied as the driving information, the driving determination processing unit 51 determines whether or not the user who possesses the terminal device 11 is driving on the basis of a driving dictionary recorded in advance and the acceleration supplied as the driving information.

In this case, the driving determination processing unit 51 records data indicating change of acceleration when the user is driving, that is, data of acceleration arranged in time series that would be measured at the time of driving, which has been obtained through learning, as the driving dictionary. The driving determination processing unit 51 compares the time series acceleration as the driving dictionary and the time series acceleration obtained as the driving information to calculate the degree of similarity of the time series acceleration, and determines that the user is driving in a case where the degree of similarity is a threshold or more.

Note that the driving dictionary may be acquired from outside and prepared in advance, or may be generated through learning from the driving information obtained when the user is actually driving.

Further, for example, in the case where user position information indicating the position of the terminal device 11 obtained by the position measuring unit such as the satellite positioning system, that is, the position of the user who possesses the terminal device 11, is supplied as the driving information, a moving speed of the user can be grasped from the user position information at each time. In such a case, the driving determination processing unit 51 determines that the user is driving when the moving speed of the user obtained from the driving information is a speed of a predetermined threshold or more.

In the case of performing the driving determination processing using an output of the position measuring unit such as the satellite positioning system, whether driving can be accurately specified.

Further, the driving determination processing unit 51 may obtain a final determination result on the basis of the determination result of the driving determination processing using the driving dictionary and the determination result of the driving determination processing using the user position information. In this case, the user can be determined to be driving when both the determination results show the user is driving, for example.

In step S12, the driving determination processing unit 51 determines whether or not the user is driving, as a result of the driving determination processing in step S11.

In the case where the user is determined not to be driving in step S12, the time series data generation unit 52 generates the health state time series data on the basis of the behavior information supplied from the behavior information acquisition unit 43 and the biological information supplied from the biological information acquisition unit 44 in step S13.

The behavior information is output from the behavior information acquisition unit 43 to the control unit 45 continuously or at a fixed time interval, and the biological information is output from the biological information acquisition unit 44 to the control unit 45 continuously or at a fixed time interval.

For example, in the case where the acceleration at each time measured by the acceleration sensor is supplied as the behavior information, the time series data generation unit 52 determines whether or not the user who possesses the terminal device 11 is sleeping on the basis of a sleeping dictionary recorded in advance and the acceleration supplied as the behavior information.

In this case, the time series data generation unit 52 records data indicating change of acceleration when the user is sleeping, that is, data of acceleration arranged in time series that would be measured at the time of sleeping, which has been obtained through learning, as the sleeping dictionary. The time series data generation unit 52 compares the time series acceleration as the sleeping dictionary and the time series acceleration obtained as the behavior information to calculate the degree of similarity of the time series acceleration, and determines that the user is sleeping in a case where the degree of similarity is a threshold or more. Further, the time series data generation unit 52 determines a behavior state such as whether the user is resting, using a similar dictionary to the sleeping dictionary.

Further, for example, in the case where the user position information indicating the position of the terminal device 11 obtained by the position measuring unit such as the satellite positioning system, that is, the position of the user who possesses the terminal device 11, is supplied as the behavior information, the time series data generation unit 52 recognizes the behavior of the user from the user position information at each time.

Specifically, for example, the time series data generation unit 52 holds registered position information such as a location of a workplace and a location of a home of the user registered in advance. The time series data generation unit 52 compares the registered position information and the user position information at each time supplied as the behavior information, and recognizes the behavior such as whether the user is at work or at home. In this case, for example, while the user position information shows the vicinity of the work place of the user indicated by the registered position information, the user is considered to be at work.

The time series data generation unit 52 generates behavior recognition time series data indicating a behavior of the user at each time based on the determination result as to whether the user is sleeping, the determination result as to whether the user is resting, the recognition result of the behavior on the basis of the user position information and the registered position information, and the like obtains as described above.

For example, the behavior recognition time series data is data in which time information indicating date and time and information indicating the behavior of the user at the date and time are associated and arranged in time order, that is, in time series, or the like. By referring to the behavior recognition time series data, the behavior of the user, such as working hours or a sleep time of the user, that is, a time zone in which the user has been at work, a time zone in which the user has been sleeping, or the time zone in which the user has been resting can be grasped.

Note that the behavior recognition time series data may be any data as long as the data is information regarding the behavior of the user. The behavior recognition time series data is, for example, information indicating the behavior of the user at each time including at least sleep or labor, and the like.

Further, the time series data generation unit 52 generates biological recognition time series data on the basis of the biological information itself such as the blood pressure, the heart rate, and the respiratory rate at each time of the user, which has been supplied from the biological information acquisition unit 44, and information indicating another body state of the user himself/herself obtained from the biological information. For example, the biological recognition time series data is data in which time information indicating date and time and information indicating the state of the user himself/herself such as the blood pressure and the heart rate at the date and time, that is, information indicating a biological state, are associated and arranged in time order, or the like.

Further, for example, in the case where an image including the face of the user is acquired from a camera as the biological information acquisition unit 44 as the biological information, the time series data generation unit 52 may estimate the degree of fatigue of the user by image recognition or the like for the image obtained as the biological information, and generate the biological recognition time series data indicating an estimation result, that is, the degree of fatigue of the user.

Note that the biological recognition time series data may be any data as long as the data is information regarding the biological state of the user. The biological recognition time series data is, for example, information indicating the biological state of the user at each time including at least one of the blood pressure, the heart rate, the respiratory rate, and the degree of fatigue, and the like.

The time series data generation unit 52 sets data including the behavior recognition time series data and the biological recognition time series data obtained as described above, as the health state time series data. Note that, in the present embodiment, the health state time series data includes at least the behavior recognition time series data. However, the health state time series data may be any data as long as the data is data regarding the health state of the user.

The time series data generation unit 52 supplies the generated health state time series data to the recording unit 47 and instructs recording.

In step S14, the recording unit 47 records the health state time series data supplied from the time series data generation unit 52, and thereafter the processing returns to step S11.

In this way, the health state time series data is generated and recorded in the recording unit 47 continuously or at a fixed time interval in the state where the user is not driving the vehicle, that is, in a non-driving state. Note that, here, the example in which the health state time series data is generated only at the time of non-driving has been described. However, the health state time series data may be generated and recorded in the recording unit 47 when the user is driving.

Further, in step S12, in the case where the user is determined to be driving, that is, in the case where the user has got into the vehicle and has started driving, the driving determination processing unit 51 generates the driving determination information indicating that the user is driving, and the processing proceeds to step S15. Here, the driving determination information includes information indicating a time (date and time) when the user has started driving. That is, what time the user has started driving the vehicle can be grasped by referring to the driving determination information.

Further, the control unit 45 reads the health state time series data from the recording unit 47, and supplies the read health state time series data and the generated driving determination information to the communication unit 41.

At this time, the health state time series data read from the recording unit 47 is data in a predetermined time range up to the time determined to be driving in step S12, specifically, data of most recent one day or the like, for example. In this case, in particular, the health state time series data of when the user is not driving, that is, in the non-driving state, at a time before the time determined to be driving in step S12, is read. Note that the health state time series data of all the times that haven't been transmitted to the insurance management server 12 may be read.

In step S15, the communication unit 41 transmits the driving determination information and the health state time series data supplied from the control unit 45 to the insurance management server 12. With the transmission, the health state time series data is transmitted from the terminal device 11 to the insurance management server 12 before the user gets into the vehicle, that is, before the start of driving the vehicle.

When the driving determination information and the health state time series data are transmitted, the communication unit 81 of the insurance management server 12 receives the driving determination information and the health state time series data transmitted from the terminal device 11 and supplies the driving determination information and the health state time series data to the control unit 83 in step S21. The driving determination information and the health state time series data received in this way are supplied to and recorded in the recording unit 82 as appropriate.

In step S22, the insurance premium calculation unit 91 calculates the safe driving degree on the basis of the health state time series data supplied from the communication unit 81. At this time, the insurance premium calculation unit 91 may calculate the safe driving degree by reference to a driving start time indicated by the driving determination information received in step S21, past health state time series data recorded in the recording unit 82, information regarding registration such as an age and an accident history of the user recorded in the recording unit 82, and the like.

Here, the safe driving degree indicates that the possibility of safe driving by the user at this driving is higher, that is, the possibility of occurrence of an accident is lower, as a value (score) of the safe driving degree is higher.

For example, basically, the score of the safe driving degree is set to be high when the sleep time a day before driving indicated by the health state time series data is long, and the score of the safe driving degree is set to be high when working hours before driving or a day before driving indicated by the health state time series data are short.

More specifically, for example, the insurance premium calculation unit 91 sets the score of the safe driving degree to be low in the case where the user drives after long working hours even in the case where the sleep time a day before driving of the user is sufficiently long. Further, for example, the insurance premium calculation unit 91 sets the score of the safe driving degree to be low in the case where the sleep time a day before driving is short even in the case where the working hours a day before driving is short.

Information regarding the current degree of fatigue of the user, such as the working hours and the sleep time immediately before driving is information indicating the health state of the user having a strong correlation with a probability of safe driving by the user. Therefore, by use of such information indicating the health state, the safe driving degree can be calculated with higher accuracy.

Further, for example, the safe driving degree may be calculated in combination of the behavior recognition time series data with the biological recognition time series data included in the health state time series data.

Specifically, for example, the insurance premium calculation unit 91 sets the score of the safe driving degree to be low in the case where a value of the heart rate, the blood pressure, the respiratory rate, or the like which is the biological state of the user, deviates from a value at rest, even though the user is in a resting state before driving. In other words, in the case where the biological state of the user indicated by the health state time series data is an unhealthy state even though the user is resting, the safe driving degree becomes small when the user starts driving the vehicle within a fixed time from such a state. In this manner, the safe driving degree may be calculated by using the relevance between the usual behavior and the state of the biological state of the user.

In step S23, the insurance premium calculation unit 91 calculates the insurance premium of the user on the basis of the safe driving degree calculated in step S22 and information regarding insurance and the vehicle of the user at the time of application for the automobile insurance recorded in the recording unit 82, and generates insurance premium amount information.

For example, the insurance premium calculation unit 91 calculates the insurance premium of the automobile insurance of the user on the basis of the calculated safety degree, and other pieces of information necessary for calculating the insurance premium, such as a travel distance and a seat load time of the vehicle, an accident history of the user, the type of the vehicle, and the time when the driving is performed.

In calculating the insurance premium of the user, at least information regarding getting-in to the vehicle by the user that is at least one of the driving determination information, the type of the vehicle driven by the user, the travel distance, the seat load time of the vehicle, and the like, and the health state time series data can be used.

Here, the health state time series data is used when obtaining the safe driving degree used for calculating the insurance premium. Further, the time when the user starts driving indicated by the driving determination information as the information regarding getting-in to the vehicle is used for selecting the health state time series data to be used for calculating the safety degree, for example.

The insurance premium calculation unit 91 generates information indicating the amount of the calculated insurance premium, a discount amount of the insurance premium of the user, and the like as insurance premium amount information, and supplies the insurance premium amount information to the recording unit 82 to record the insurance premium amount information and also supplies the insurance premium amount information to the communication unit 81.

In step S24, the communication unit 81 transmits the insurance premium amount information supplied from the insurance premium calculation unit 91 to the terminal device 11, and the insurance premium calculation processing is terminated.

When the insurance premium amount information is transmitted from the insurance management server 12, the communication unit 41 of the terminal device 11 receives the insurance premium amount information transmitted from the insurance management server 12 and supplies the insurance premium amount information to the control unit 45 in step S16.

In step S17, the display control unit 53 supplies the insurance premium amount information supplied from the communication unit 41 to the display unit 48 to display the insurance premium amount information, and the driving determination information transmission processing is terminated. When the insurance premium amount information is displayed by the display unit 48, the user can confirm information regarding contents of the automobile insurance, such as his/her own insurance premium, and the discount amount of the insurance premium.

As described above, the terminal device 11 generates and records the health state time series data when the user is not driving, and transmits the health state time series data generated so far and the driving determination information when the user starts driving. Further, the insurance management server 12 receives the health state time series data and the driving determination information from the terminal device 11, and calculates the insurance premium on the basis of the health state time series data.

As described above, the insurance premium is calculated at the time of the start of driving, that is, at the time of getting into the vehicle by the user, using the health state time series data of a predetermined period of when the user is not driving and before the user drives, whereby a more appropriate insurance premium of the automobile insurance can be calculated.

In particular, the health state time series data is information unknown from the time of driving by the user but is information regarding the health state having a strong correlation with the probability of occurrence of an accident. Therefore, by use of such information, a more appropriate insurance premium can be determined with higher accuracy. Further, since the health state time series data is time series data, a more appropriate insurance premium can be determined with higher accuracy.

Second Embodiment

<Configuration Example of In-Vehicle Terminal Device>

In addition, in the above description, the example in which whether or not the user is driving is determined in the terminal device 11 possessed by the user has been described. However, whether the user is driving may be determined by, for example, a car navigation device attached to a vehicle driven by the user.

In such a case, an automobile insurance system is configured by a terminal device 11 and an insurance management server 12 described above, and an in-vehicle terminal device attached to a vehicle, for example. The in-vehicle terminal device may be a terminal device attached to a vehicle such as a car navigation device, or may be a device provided in the vehicle, for example.

Figure 5:
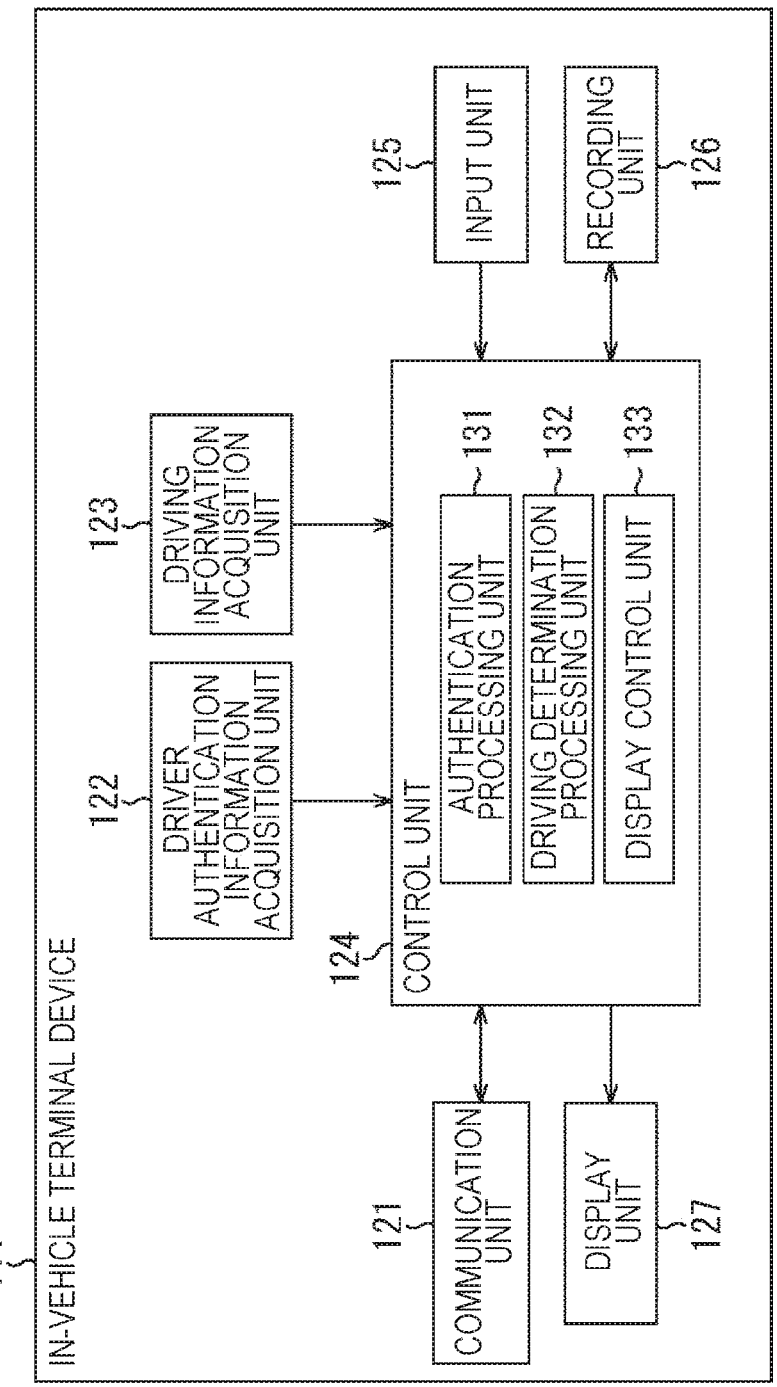
FIG. 5 is a diagram illustrating a configuration example of an in-vehicle terminal device.

For example, the in-vehicle terminal device configuring the automobile insurance system is configured as illustrated in FIG. 5.

The in-vehicle terminal device 111 illustrated in FIG. 5 includes a communication unit 121, a driver authentication information acquisition unit 122, a driving information acquisition unit 123, a control unit 124, an input unit 125, a recording unit 126, and a display unit 127.

The communication unit 121 transmits information supplied from the control unit 124 to the terminal device 11 and the insurance management server 12 via a communication network 13, and receives information transmitted from the terminal device 11 and the insurance management server 12 and supplies the information to the control unit 124 via the communication network 13.

Note that the terminal device 11 may be connected to the in-vehicle terminal device 111, and the communication unit 121 may directly transmit/receive information to/from the terminal device 11.

The driver authentication information acquisition unit 122 includes, for example, a camera, a biometric sensor, and the like, and acquires driver authentication information for authenticating a user who is a driver and supplies the driver authentication information to the control unit 124.

For example, the driver authentication information is, for example, an image used for face recognition, fingerprint recognition, retina recognition, vein recognition, or the like, or sensing information using light irradiation and light reception of reflected light.

The driving information acquisition unit 123 corresponds to the driving information acquisition unit 42 of the terminal device 11 illustrated in FIG. 2. That is, the driving information acquisition unit 123 includes, for example, a position measuring unit that measures its own position, such as a satellite positioning system, an acceleration sensor, and the like, and acquires driving information for determining driving of the vehicle by the user and supplies the driving information to the control unit 124.

Note that, in the case where the in-vehicle terminal device 111 is electrically connectable to the vehicle or in the case where the in-vehicle terminal device 111 is a device provided in the vehicle itself, a vehicle speed pulse indicating a traveling state of the vehicle may be acquired as the driving information. By use of the vehicle speed pulse, whether or not the vehicle is being driven, that is, whether or not the vehicle is traveling can be accurately determined.

The control unit 124 controls operation of the entire in-vehicle terminal device 111. The control unit 124 includes an authentication processing unit 131, a driving determination processing unit 132, and a display control unit 133.

The authentication processing unit 131 authenticates the user by face recognition, fingerprint recognition, retina recognition, vein recognition, or the like on the basis of the driver authentication information supplied from the driver authentication information acquisition unit 122.

The driving determination processing unit 132 corresponds to the driving determination processing unit 51 of the terminal device 11 illustrated in FIG. 2, and performs driving determination processing on the basis of the driving information supplied from the driving information acquisition unit 123.

The display control unit 133 controls display of various kinds of information and images on the display unit 127.

The input unit 125 includes, for example, a touch panel, a button, a switch, and the like provided superimposed on the display unit 127, and supplies a signal corresponding to an operation of the user to the control unit 124. The recording unit 126 includes a nonvolatile recording medium, and records various kinds of information supplied from the control unit 124 and supplies the recorded information to the control unit 124 as necessary.

The display unit 127 includes, for example, a liquid crystal display panel and the like, and displays various kinds of information and images under the control of the display control unit 133.

<Description of Driving Determination Information Transmission Processing, Driving Determination Processing, and Insurance Premium Calculation Processing>

Next, the operation of the terminal device 11, the in-vehicle terminal device 111, and the insurance management server 12 configuring the automobile insurance system will be described. That is, driving determination information transmission processing by the terminal device 11, driving determination processing by the in-vehicle terminal device 111, and insurance premium calculation processing by the insurance management server 12 will be described with reference to the flowchart in FIG. 6.

In the present embodiment, the terminal device 11 can specify whether or not the user is driving the vehicle covered by the automobile insurance by receiving driving determination information from the in-vehicle terminal device 111. The terminal device 11 continuously generates and records health state time series data during non-driving period in which the user is not driving the vehicle covered by the automobile insurance.

Figure 4:
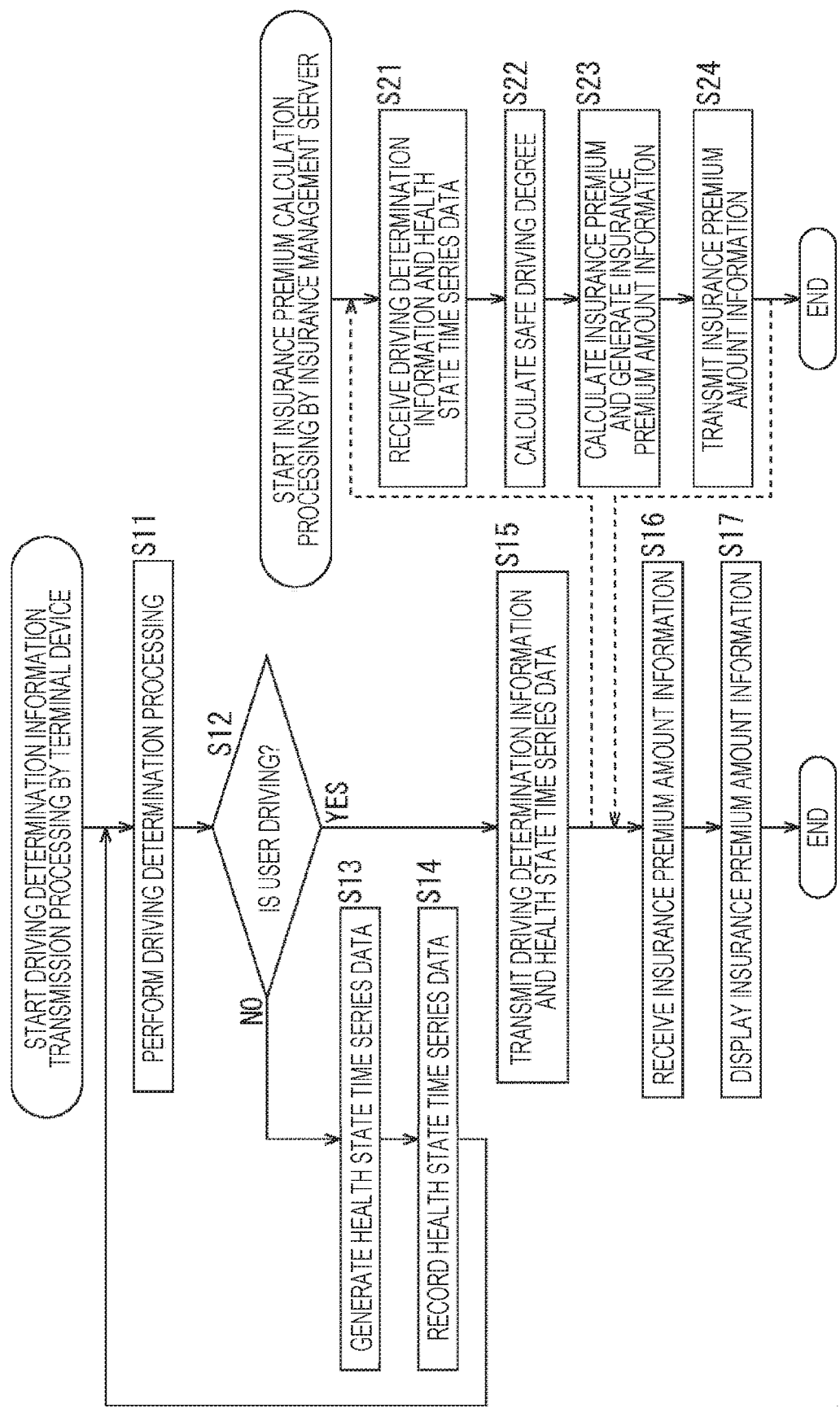
FIG. 4 is a flowchart for describing driving determination information transmission processing and insurance premium calculation processing.

That is, in step S51, the time series data generation unit 52 generates the health state time series data, and in step S52, the recording unit 47 records the health state time series data generated in the processing in step S51. Note that, in steps S51 and S52, similar processing to the processing in steps S13 and S14 in FIG. 4 is performed.

Note that, in step S51, the time series data generation unit 52 may determine whether the user is driving another vehicle different from the vehicle covered by the automobile insurance on the basis of behavior information, and generate behavior recognition time series data using the determination result.

In such a case, the time series data generation unit 52 compares a driving dictionary held in advance and acceleration at each time measured by the acceleration sensor as the behavior information, and specify whether the user is driving another vehicle, for example. Further, for example, the time series data generation unit 52 may obtain a moving speed of the user, using a user position information at each time as the behavior information measured by the position measuring unit such as the satellite positioning system, and compare the moving speed and a threshold, thereby to identify whether the user is driving another vehicle.

Behavior such as the user has been sleeping, the user has been at work, the user has been driving another vehicle, or the user has been resting at each time can be grasped by reference to the behavior recognition time series data obtained in this manner.

On the other hand, the in-vehicle terminal device 111 performs authentication for the user to determine whether the user is driving the vehicle that is covered by the automobile insurance.

That is, in step S71, the driver authentication information acquisition unit 122 of the in-vehicle terminal device 111 acquires the driver authentication information and supplies the driver authentication information to the control unit 124. In step S71, the driver authentication information is acquired for the user sitting behind the steering wheel of the vehicle.

In step S72, the authentication processing unit 131 performs authentication processing of the user, that is, the driver, by face recognition, fingerprint recognition, retina recognition, vein recognition, or the like on the basis of the driver authentication information supplied from the driver authentication information acquisition unit 122.

In step S73, the authentication processing unit 131 determines whether or not the user has been correctly authenticated on the basis of a result of the authentication processing in step S72.

For example, in the case where the user sitting behind the steering wheel of the vehicle is specified as the user who is an insured person of the automobile insurance by the authentication processing in step S72, the user is determined to be correctly authenticated. In the case where the user is authenticated in this way, it is known that the driver of the vehicle is the authenticated user sitting behind the steering wheel when the vehicle is driven thereafter.

In the case where the user is determined not to be correctly authenticated in step S73, the processing returns to step S71 and the above-described processing is repeatedly performed.

On the other hand, in the case where the user is determined to be correctly authenticated in step S73, the driving determination processing unit 132 performs driving determination processing on the basis of the driving information supplied from the driving information acquisition unit 123 in step S74.

Note that, in step S74, similar processing to the processing in step S11 in FIG. 4 is performed. Note that, in the case where the vehicle speed pulse is obtained as the driving information in the driving information acquisition unit 123, the driving determination processing unit 132 performs the driving determination processing on the basis of the vehicle speed pulse obtained as the driving information, for example.

In step S75, the driving determination processing unit 132 determines whether or not the user is driving, as a result of the driving determination processing in step S74.

In the case where the user is determined not to be driving in step S75, the processing returns to step S74 and the above processing is repeatedly performed.

On the other hand, in step S75, in the case where the user is determined to be driving, that is, in the case where the authenticated user has started driving the vehicle, the driving determination processing unit 132 generates the driving determination information indicating that the user is driving and supplies the driving determination information to the communication unit 121, and the processing proceeds to step S76.

In step S76, the communication unit 121 transmits the driving determination information supplied from the driving determination processing unit 132 to the terminal device 11, and the driving determination processing is terminated.

Note that user identification information for identifying the user who is the driver so that which user is driving can be identified and vehicle identification information for identifying the vehicle so that which vehicle is being driven can be identified may be transmitted together with the driving determination information at the time of transmitting the driving determination information.

When the driving determination information is transmitted from the in-vehicle terminal device 111, the communication unit 41 of the terminal device 11 receives the driving determination information transmitted from the in-vehicle terminal device 111 and supplies the driving determination information to the control unit 45 in step S53.

When the driving determination information is received in this way, it is known that the driving has started by the user. Therefore, the time series data generation unit 52 stops generation of the health state time series data. Note that generation and recording of the health state time series data may be continuously performed during driving of the vehicle by the user.

In a state where the driving determination information has not been received for example, the user is not driving the vehicle covered by the automobile insurance. Therefore, behavior of the user driving a vehicle, which is specified from the behavior information, can specify driving of another vehicle other than the vehicle covered by the automobile insurance.

Further, the control unit 45 reads the health state time series data from the recording unit 47, and supplies the read health state time series data and the received driving determination information to the communication unit 41.

The health state time series data read from the recording unit 47 at this time is data in a predetermined time range up to the time when the driving determination information has been received in step S53, that is, the time when the user has started driving, which is indicated by the driving determination information, for example. Note that the health state time series data of all the times that haven't been transmitted to the insurance management server 12 may be read.

When the driving determination information and the health state time series data are supplied to the communication unit 41 in this way, then processing in steps S54 to S56 is performed and the driving determination information transmission processing is terminated. This processing is similar to the processing in steps S15 to S17 in FIG. 4, and thus description is omitted.

Further, when the driving determination information and the health state time series data are transmitted by the communication unit 41 in step S54, the communication unit 81 of the insurance management server 12 receives the driving determination information and the health state time series data transmitted from the terminal device 11 and supplies the driving determination information and the health state time series data to the control unit 83 in step S81.

When the driving determination information and the health state time series data are received, then processing in steps S82 to S84 is performed and the insurance premium calculation processing is terminated. This processing is similar to the processing in steps S22 to S24 in FIG. 4, and thus description is omitted.

Note that, in the present embodiment, the user driving another vehicle can be grasped from the behavior recognition time series data configuring the health state time series data. Therefore, the safety degree can be calculated in consideration of the driving of another vehicle.

For example, in the case where the user finishes work and goes home after driving another vehicle on driving business, and starts driving the vehicle covered by the automobile insurance, the user performs driving operation for a long time. Therefore, in such a case, the insurance premium calculation unit 91 may calculate the safe driving degree to be low, and the like, in consideration of the driving time of the other vehicle in step S82.

As described above, the terminal device 11 generates and records the health state time series data when the user is not driving, and transmits the health state time series data generated so far and the driving determination information when the user starts driving and the terminal device 11 has received the driving determination information. Further, the insurance management server 12 receives the health state time series data and the driving determination information from the terminal device 11, and calculates the insurance premium on the basis of the health state time series data.

As described above, the insurance premium is calculated at the time of the start of driving, that is, at the time of getting into the vehicle by the user, using the health state time series data of a predetermined period of when the user is not driving and before the user drives, whereby a more appropriate insurance premium of the automobile insurance can be calculated. In particular, in the present embodiment, the user authentication and the driving determination processing are performed by the in-vehicle terminal device 111 installed on the vehicle side. Therefore, the start of driving can be detected with higher accuracy and the insurance premium can be calculated.

Note that, in the present embodiment, the case in which the driving determination information is transmitted from the in-vehicle terminal device 111 to the terminal device 11 has been described. However, the in-vehicle terminal device 111 may acquire the health state time series data from the terminal device 11 and transmit the health state time series data and the driving determination information to the insurance management server 12. Further, reception and display of the insurance premium amount information may be performed by the in-vehicle terminal device 111.

Further, the in-vehicle terminal device 111 may transmit the driving determination information to the insurance management server 12, and the insurance management server 12 that has received the driving determination information may request the terminal device 11 to transmit the health state time series data and receive the health state time series data.

Third Embodiment

<Description of Application Processing and Acceptance Processing>

Further, in a case where an automobile insurance system includes a terminal device 11, an in-vehicle terminal device 111, and an insurance management server 12, a vehicle covered by automobile insurance can be a vehicle of a car sharing service, and the automobile insurance can be, for example, insurance with no refund payment and the like.

Hereinafter, processing performed in the automobile insurance system in such a case will be described. First, processing performed when a user operates the terminal device 11 to apply for automobile insurance will be described. That is, hereinafter, application processing by the terminal device 11 and acceptance processing by the insurance management server 12 will be described with reference to the flowchart in FIG. 7.

In step S111, a time series data generation unit 52 generates health state time series data, and in step S112, a recording unit 47 records the health state time series data generated in the processing in step S111.

Figure 6:
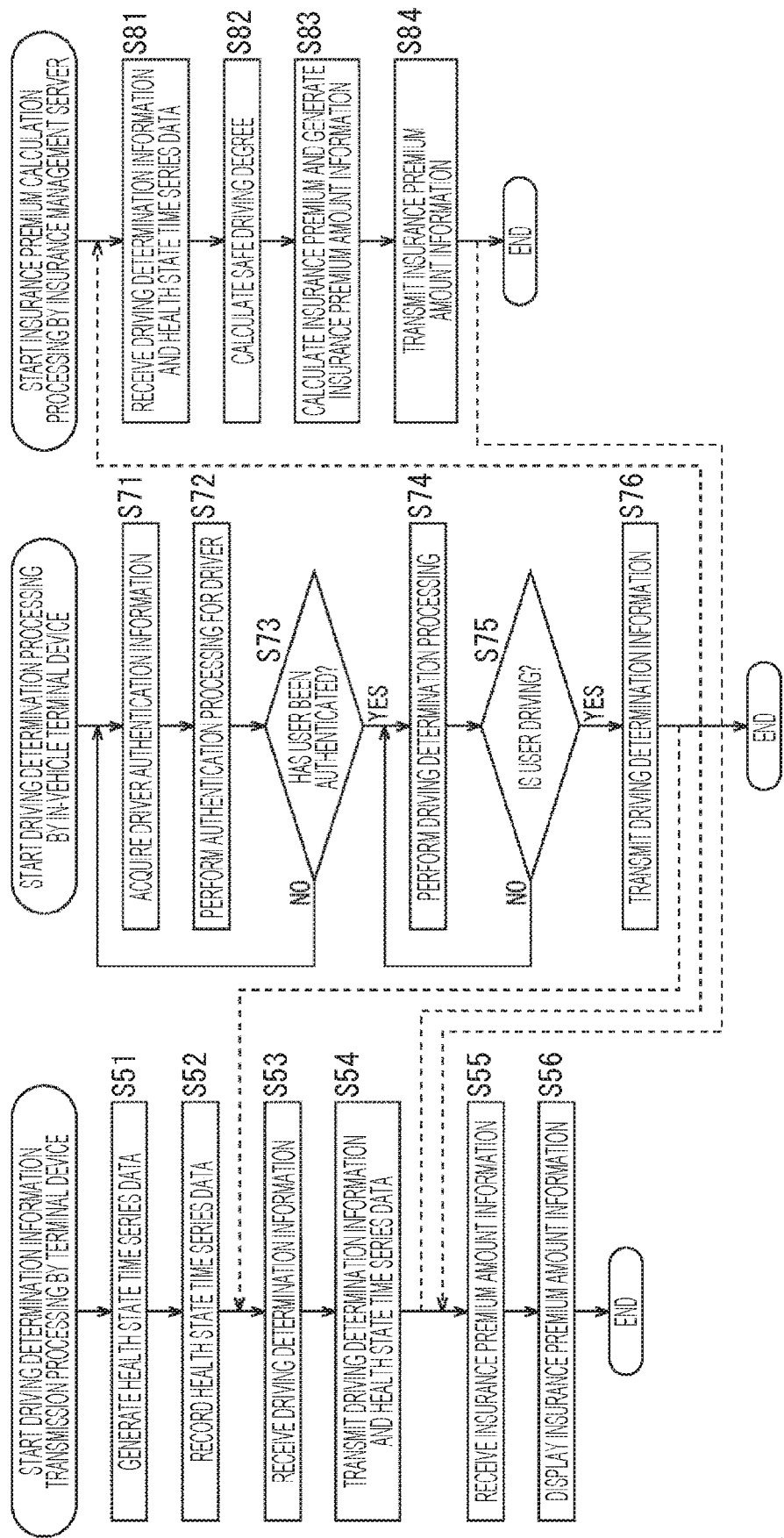
FIG. 6 is a flowchart for describing driving determination information transmission processing, driving determination processing, and insurance premium calculation processing.

Note that, in steps S111 and S112, similar processing to the processing in steps S51 and S52 in FIG. 6 is performed. Further, in the present embodiment, generation and recording of the health state time series data are continuously and constantly performed.

In step S113, a control unit 45 generates insurance application information for applying for automobile insurance.

That is, the user operates an input unit 46 and inputs necessary information for application for the automobile insurance with no refund payment. Here, the necessary information is, for example, information of date and time of use of a vehicle that can specify a driving start time and the like, a member number registered by the user in the car sharing service, a license number, a vehicle type desired in the car sharing service, and the like.

The control unit 45 generates information indicating that the user wishes to apply for the automobile insurance, including the information of the member number, the license number, the desired vehicle type, the date and time of use of a vehicle, and the like input by the user, as the insurance application information, on the basis of a signal supplied from the input unit 46 according to the operation by the user.

Further, the control unit 45 supplies the generated insurance application information to a communication unit 41. Such generation of the insurance application information is carried out, for example, from several days before to several hours before getting into the vehicle by the car sharing service, or the like.

In step S114, the communication unit 41 transmits the insurance application information supplied from the control unit 45 to the insurance management server 12. Note that the insurance application information is also transmitted to a server managed by a company that provides the car sharing service as needed.

When the insurance application information is transmitted, a communication unit 81 of the insurance management server 12 receives the insurance application information transmitted from the terminal device 11 and supplies the insurance application information to a control unit 83 in step S131.

In step S132, the control unit 83 performs acceptance processing on the basis of the insurance application information supplied from the communication unit 81, and accepts user's subscription to the automobile insurance. In the acceptance processing, processing such as registration necessary for the user to subscribe the automobile insurance is performed.

In step S133, the control unit 83 determines whether or not it is a predetermined time before a scheduled driving time, which is the time when the user is scheduled to start driving the vehicle by the car sharing service. Here, for example, whether it is several hours before or a few minutes before the scheduled driving time is determined.

In step S133, in a case where it is determined not to be the predetermined time before the scheduled driving time, the processing returns to step S133 and the above processing is repeatedly performed.

On the other hand, in step S133, in a case where it is determined to be the predetermined time before the scheduled driving time, the control unit 83 generates a transmission request for requesting transmission of most recent health state time series data and supplies the transmission request to the communication unit 81, and the processing proceeds to step S134.

Such a transmission request requests transmission of the health state time series data of before driving the vehicle by the user, that is, before getting into the vehicle by the user. The transmission request can also be said to request transmission of the health state time series data of before presenting a compensation for the automobile insurance service that is an insurance premium of the automobile insurance to the user.

In step S134, the communication unit 81 transmits the transmission request of the health state time series data supplied from the control unit 83 to the terminal device 11.

Then, in step S115, the communication unit 41 of the terminal device 11 receives the transmission request transmitted from the insurance management server 12 and supplies the transmission request to the control unit 45. When the transmission request is supplied, the control unit 45 reads the health state time series data obtained within a most recent predetermined period from the recording unit 47 and supplies the health state time series data to the communication unit 41, in response to the transmission request. Here, for example, the health state time series data of most recent one day is read or the like.

In step S116, the communication unit 41 transmits the health state time series data supplied from the control unit 45 to the insurance management server 12.

Then, in step S135, the communication unit 81 receives the health state time series data transmitted from the terminal device 11 and supplies the health state time series data to the control unit 83.

When the health state time series data is received, then processing in steps S136 to S138 is performed and the acceptance processing is terminated. This processing is similar to the processing in steps S22 to S24 in FIG. 4, and thus description is omitted.

Note that, in step S136, the driving start time of the user can be specified from the insurance application information received in step S131. Therefore, a safe driving degree is calculated using the health state time series data in a time range according to the specified driving start time, more specifically, the scheduled driving time, and the like.

Further, similarly to the second embodiment, behavior recognition time series data configuring the health state time series data may include information indicating behavior of driving another vehicle, and a driving state of the other vehicle by the user may be used at the time of calculating the safe driving degree.

When insurance premium amount information is generated and transmitted to the terminal device 11 in this manner, the terminal device 11 performs processing in step S117 and S118 and terminates the application processing. This processing is similar to the processing in steps S16 and S17 in FIG. 4, and thus description is omitted.

In this case, the insurance premium amount information indicating the insurance premium of the automobile insurance and the like are displayed on a display unit 48 of the terminal device 11 immediately before the user starts driving of the vehicle in the car sharing service. At this time, for example, display illustrated in FIG. 8 is performed.

Figure 8:
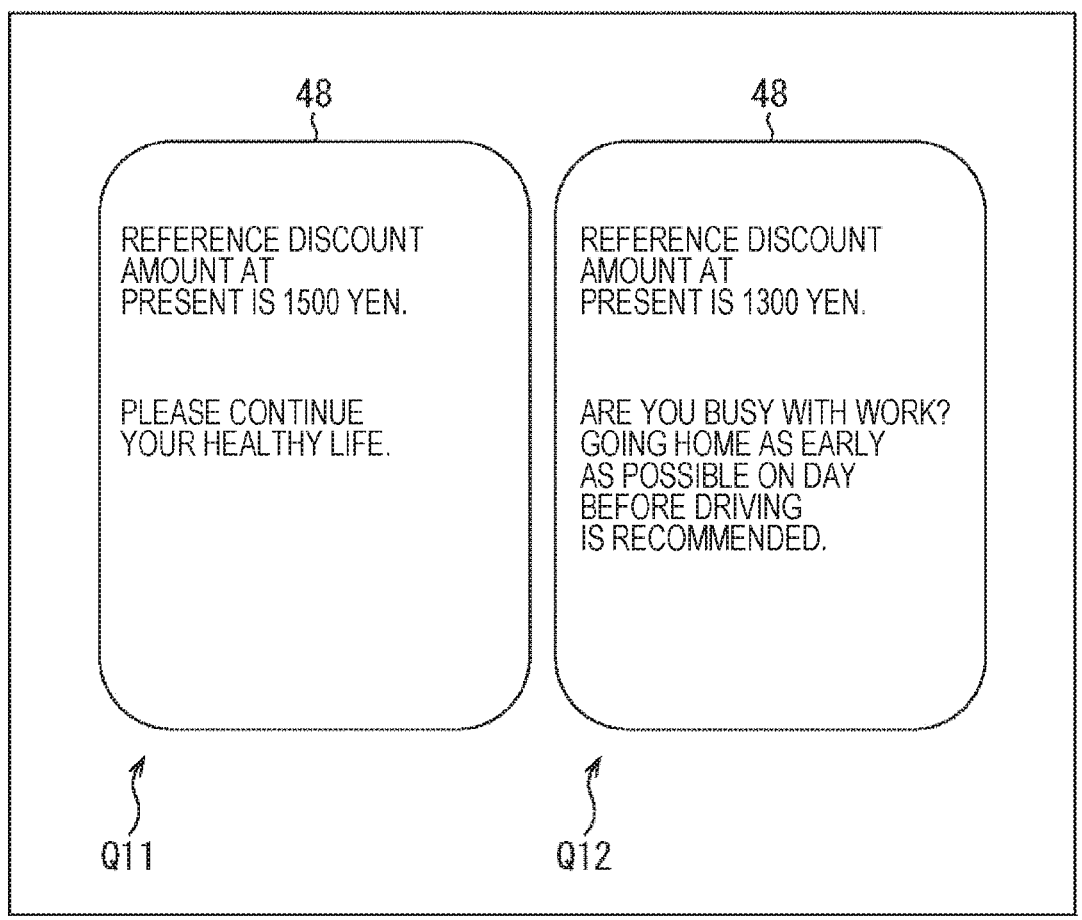
FIG. 8 is a diagram illustrating an example of insurance premium amount information.

In the example illustrated by the arrow Q11 in FIG. 8, character information "The reference discount amount at the present time is 1500 yen.", which indicates a discount amount of the insurance premium as the insurance premium amount information, and character information "Please continue your healthy life.", which indicates an advice regarding the discount amount and safe driving, are displayed on the display unit 48.

In the present example, the displayed discount amount of the insurance premium is a provisional discount amount calculated from a sleep time, working hours, and the like of the user at the present time. In the case of displaying a provisional insurance premium and discount amount as the insurance premium amount information, the insurance premium amount information may be presented at the application for the automobile insurance, rather than immediately before the user starting driving. In such a case, the processing in steps S134 to S138 is performed immediately after step S132 is performed.

Further, in the example illustrated by the arrow Q11, the character information indicating an advice is also displayed. In this example, the user being in a health state in which the user has had sufficient sleep and the working hours is not too long and thus the user can safely drive can be presented to the user to prompt the user to keep such pace. Further, in this example, it can also be presented to the user that the user has got a large discount amount.

Note that whether or not to display the character information indicating an advice as the insurance premium amount information can be set by the user himself/herself.

In contrast, in the example illustrated by the arrow Q12, character information "The reference discount amount at the present time is 1300 yen.", which indicates the discount amount of the insurance premium as the insurance premium amount information, and character information "Are you busy with work? Going home as early as possible a day before driving is recommended.", which indicates an advice regarding the discount amount and safe driving, are displayed on the display unit 48.

If such display is made, the provisional discount amount at the present time can be presented to the user. Further, attention not to work hard and to have enough sleep a day before driving can be drawn to the user for safe driving and obtainment of a larger discount amount. That is, a relationship between the compensation for the service as the insurance premium and the behavior of the user such as sleep and labor can be presented (notified) to the user.

As described above, the terminal device 11 generates and records the health state time series data of the user on a routine basis and transmits the health state time series data generated so far when a request is given from the insurance management server 12 in response to the application for the automobile insurance. Further, the insurance management server 12 receives the health state time series data from the terminal device 11 and calculates the insurance premium.

As described above, the insurance premium is calculated using the health state time series data of a predetermined period of when the user is not driving and before the user drives, whereby a more appropriate insurance premium of the automobile insurance can be calculated.

<Description of Driving Determination Processing, Insurance Premium Amount Information Transmission Processing, and Insurance Premium Amount Information Reception Processing>

Figure 7:
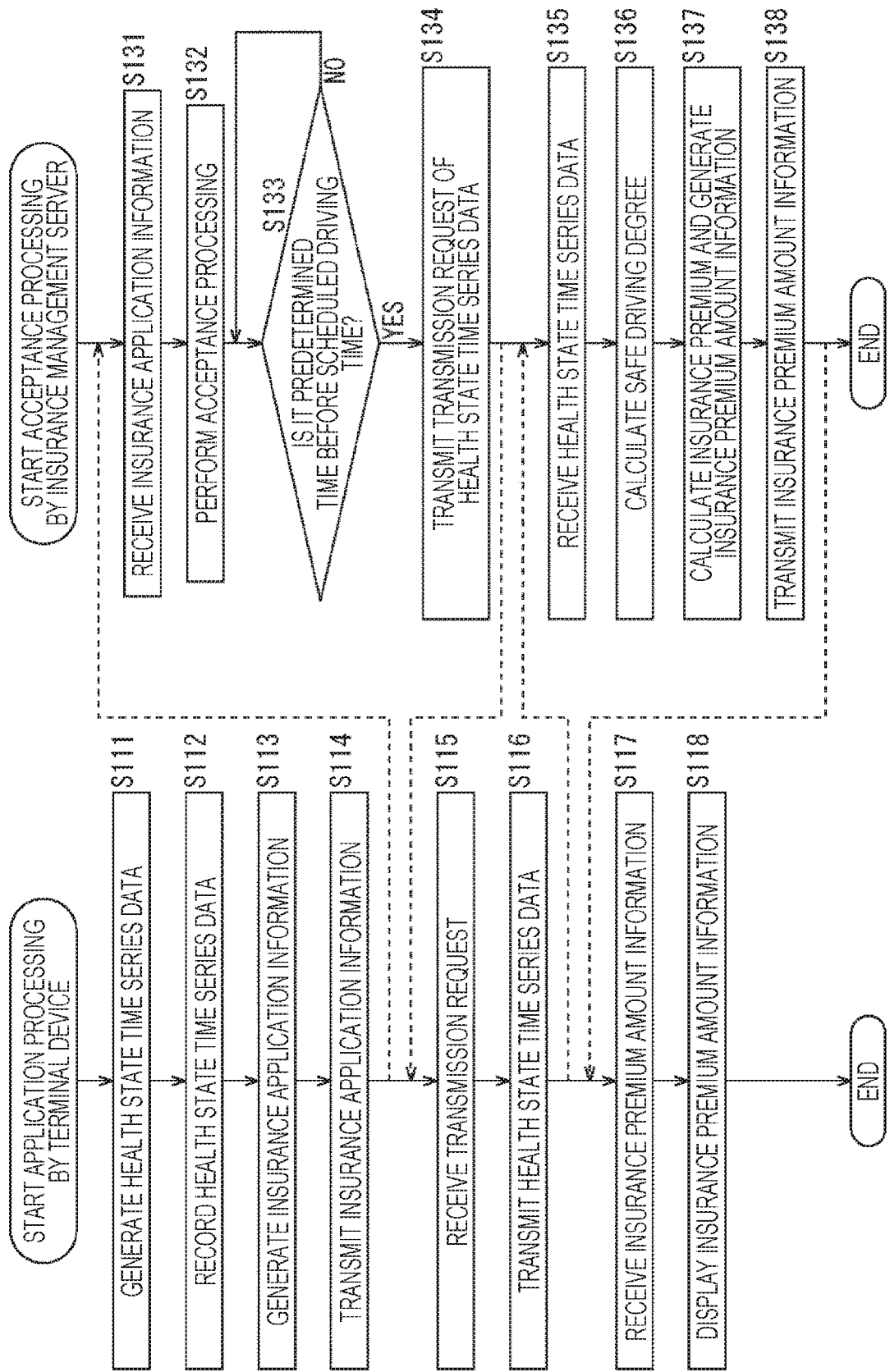
FIG. 7 is a flowchart for describing application processing and acceptance processing.

When the processing described with reference to FIG. 7 is performed and the application and acceptance for the automobile insurance are performed, the user gets into the vehicle of the car sharing service and drives the vehicle. Hereinafter, processing performed when the user drives the vehicle will be described with reference to FIG. 9. That is, driving determination processing by the in-vehicle terminal device 111, insurance premium amount information transmission processing by the insurance management server 12, and the insurance premium amount information reception processing by the terminal device 11 will be described with reference to the flowchart in FIG. 9.

When the driving determination processing by the in-vehicle terminal device 111 is started, processing in steps S161 to S165 is performed, and authentication for the user who has got in the vehicle as a driver and determination as to whether the user starts driving, that is, whether the user is driving are performed. Note that the processing in steps S161 to S165 is similar to the processing in steps S71 to S75 in FIG. 6, and thus description is omitted.

In step S165, when the user is determined to be driving, a driving determination processing unit 132 generates driving determination information indicating that the user is driving and supplies the driving determination information to a communication unit 121, and the processing proceeds to step S166.

In step S166, the communication unit 121 transmits the driving determination information supplied from the driving determination processing unit 132 to the insurance management server 12, and the driving determination processing is terminated.

Note that user identification information for identifying the user who is the driver and vehicle identification information for identifying the vehicle may be transmitted together with the driving determination information at the time of transmitting the driving determination information. Further, here, the example in which the driving determination information is directly transmitted from the in-vehicle terminal device 111 to the insurance management server 12 has been described. However, the driving determination information may be transmitted from the in-vehicle terminal device 111 to the terminal device 11, and the terminal device 11 may further transmit the driving determination information to the insurance management server 12.

When the driving determination information is transmitted from the in-vehicle terminal device 111, the communication unit 81 of the insurance management server 12 receives the driving determination information transmitted from the in-vehicle terminal device 111 and supplies the driving determination information to the control unit 83 in step S171.

In step S172, an insurance premium calculation unit 91 determines the insurance premium of the automobile insurance of the user. Normally, a time from the time when the health state time series data is received in step S134 in FIG. 7, that is, the predetermined time before the initial scheduled driving time, to the time when the driving determination information is received in step S171, that is, the time when driving is actually started, is short. Therefore, change is not caused in the insurance premium calculated in step S137 in FIG. 7. Therefore, in step S172, the insurance premium calculation unit 91 generates final insurance premium amount information, using the insurance premium calculated in step S137 in FIG. 7 as a finally determined insurance premium.

On the other hand, an actual driving start time may be greatly different from the scheduled driving time at the application due to some circumstances. In such a case, for example, after the driving determination information is received in step S171, the final insurance premium may just be recalculated by performing similar processing to the processing in steps S134 to S137 in FIG. 7.

When the final insurance premium amount information is generated, the insurance premium calculation unit 91 supplies the insurance premium amount information to the communication unit 81.

In step S173, the communication unit 81 transmits the insurance premium amount information supplied from the insurance premium calculation unit 91 to the terminal device 11, and the insurance premium amount information transmission processing is terminated.

In addition, when the insurance premium amount information is transmitted, the terminal device 11 performs processing in step S181 and S182 and terminates the insurance premium amount information reception processing. This processing is similar to the processing in steps S16 and S17 in FIG. 4, and thus description is omitted.

Figure 10:
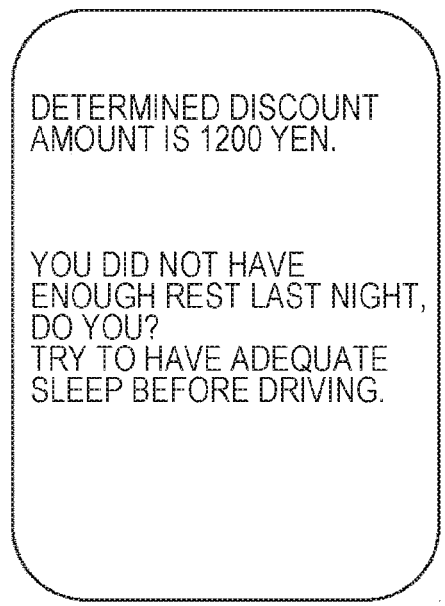
FIG. 10 is a diagram illustrating an example of insurance premium amount information.

In this case, for example, the insurance premium amount information illustrated in FIG. 10 is displayed on the display unit 48.

In the example, character information "The determined discount amount is 1200 yen.", which indicates a determined discount amount of the insurance premium as the insurance premium amount information, and character information "You did not have enough rest last night, do you? Try to have adequate sleep before driving.", which indicates an advice regarding the discount amount and safe driving, are displayed on the display unit 48.

If such display is made, the finally determined discount amount can be presented to the user. Further, attention not to work hard and to have enough sleep a day before driving can be drawn to the user for safe driving and obtainment of a larger discount amount. Note that, even in the example illustrated in FIG. 10, whether or not to display the character information indicating an advice as the insurance premium amount information can be set by the user himself/herself.

Note that, here, the example in which the final insurance premium amount information is transmitted to the terminal device 11 has been described. However, the final insurance premium amount information may be transmitted to the in-vehicle terminal device 111. In such a case, the communication unit 121 of the in-vehicle terminal device 111 receives the insurance premium amount information, and a display control unit 133 supplies the insurance premium amount information to the display unit 127 to display the insurance premium amount information.

As described above, when the user starts driving, the in-vehicle terminal device 111 generates the driving determination information and transmits the driving determination information to the insurance management server 12. Further, when receiving the driving determination information, the insurance management server 12 determines the insurance premium, generates the final insurance premium amount information, and transmits the final insurance premium amount information to the terminal device 11. With the transmission, the user knows the finally determined insurance premium.

Fourth Embodiment

<Description of Time Series Data Transmission Processing and Time Series Data Reception Processing>

Note that, in the above description, the case in which the health state time series data is generated in the terminal device 11 at the time of non-driving, and the health state time series data is transmitted to the insurance management server 12 at timing when the driving is started or the like has been described. However, transmission to the insurance management server 12 may be performed at the obtainment of a fixed amount of health state time series data.

Hereinafter, processing performed in such a case will be described with reference to FIG. 11. That is, time series data transmission processing by the terminal device 11 and time series data reception processing by the insurance management server 12 will be described with reference to the flowchart in FIG. 11.

In step S211, a behavior information acquisition unit 43 and a biological information acquisition unit 44 respectively acquire behavior information and biological information and supply the behavior information and the biological information to a control unit 45. Note that, in generating health state time series data, the biological information is not necessarily obtained.

In step S212, a time series data generation unit 52 generates health state time series data on the basis of the behavior information supplied from the behavior information acquisition unit 43 and the biological information supplied from the biological information acquisition unit 44. Note that, in step S212, similar processing to the processing in step S13 in FIG. 4 is performed.

In step S213, the time series data generation unit 52 encrypts and compresses the health state time series data generated in step S212.

Security can be improved by encrypting the health state time series data by a predetermined method. Further, the amount of data can be reduced and communication cost required for transmitting/receiving the health state time series data can be reduced by compressing the health state time series data in a predetermined method. In particular, in this example, the health state time series data obtained from the behavior information and the biological information is transmitted, rather than the behavior information and the biological information. Therefore, the amount of data can be small and the communication cost can be suppressed to be low.

In step S214, the time series data generation unit 52 determines whether or not the health state time series data has been obtained by a fixed amount.

In step S214, in a case where it is determined that the health state time series data has not been obtained by the fixed amount, processing returns to step S211 and the above processing is repeatedly performed.

On the other hand, in step S214, in a case where it is determined that the health state time series data has been obtained by the fixed amount, the time series data generation unit 52 supplies the health state time series data generated, encrypted, and compressed so far to a communication unit 41, and the processing proceeds to step S215.

Note that even after the fixed amount of the health state time series data has been obtained, the processing of generating the health state time series data is continuously performed. Note that the health state time series data may be constantly performed. However, basically, the health state time series data is not generated while the user is driving a vehicle.

In step S215, the communication unit 41 transmits the health state time series data supplied from the time series data generation unit 52 to the insurance management server 12. At this time, for example, user identification information for identifying the user may be transmitted together with the health state time series data.

Then, in step S221, a communication unit 81 of the insurance management server 12 receives the health state time series data transmitted from the terminal device 11 and supplies the health state time series data to a control unit 83.

In step S222, the control unit 83 supplies the health state time series data supplied from the communication unit 81 to a recording unit 82 to record the health state time series data. At this time, the recording unit 82 performs recording such that which user's health state time series data can be identified.

In step S223, an insurance premium calculation unit 91 generates insurance reference insurance premium information on the basis of the health state time series data recorded in the recording unit 82.

Here, the reference insurance premium information includes information indicating current insurance premiums and discount amount of automobile insurance, information indicating advices on the insurance premium and the health state, and the like. For example, as an advice, information indicating a specific target amount of the insurance premium, that is, a target amount of discount, user's behavior required to achieve the target amount, and the like can be included.

In generating the reference insurance premium information, not only the most recent health state time series data received in step S221 but also past health state time series data already recorded in the recording unit 82, information regarding insurance of the user and the vehicle at the application for the automobile insurance, and the like are used as needed.

Further, the control unit 83 reads the health state time series data recorded in the recording unit 82, and supplies the read health state time series data and the reference insurance premium information generated in step S223 to the communication unit 81.

In step S224, the communication unit 81 transmits the health state time series data and the reference insurance premium information supplied from the control unit 83 to the terminal device 11, and the time series data reception processing is terminated.

Note that, in more detail, transmission of the health state time series data and the reference insurance premium information may be performed at a specific frequency such as once a day, for example. At that time, the health state time series data may be read by the amount not transmitted yet and transmitted.

When the health state time series data and the reference insurance premium information are transmitted, the communication unit 41 of the terminal device 11 receives the health state time series data and the reference insurance premium information transmitted from the insurance management server 12 and supplies the health state time series data and the reference insurance premium information to the control unit 45 in step S216.

In step S217, the control unit 45 supplies the health state time series data supplied from the communication unit 41 to a recording unit 47 to record the health state time series data. Note that the reference insurance premium information may be recorded.

In step S218, a display control unit 53 supplies the health state time series data and the reference insurance premium information received in step S216 to a display unit 48 to display the health state time series data and the reference insurance premium information, and the time series data transmission processing is terminated.

Note that timing to display the health state time series data and the reference insurance premium information may be simultaneous or different. For example, the timing to display the reference insurance premium information may be set immediately before the user drives the vehicle, or the like.

Figure 12:
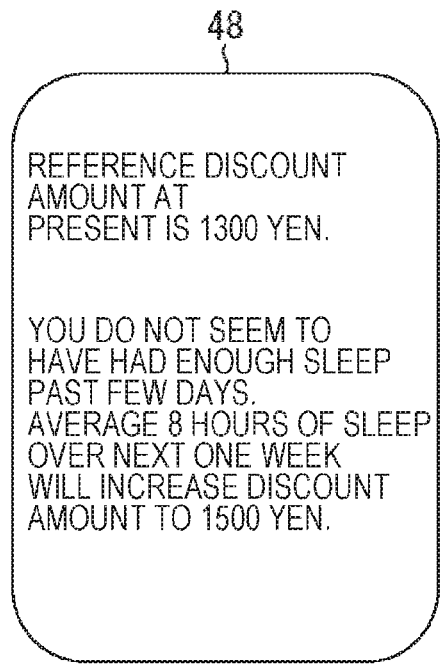
FIG. 12 is a diagram illustrating an example of reference insurance premium information.

When the processing in step S218 is performed, the reference insurance premium information illustrated in FIG. 12 is displayed on the display unit 48, for example. In this example, character information "The reference discount amount at the present time is 1300 yen.", which indicates a discount amount of the insurance premium at the present time as the reference insurance premium information, and character information "You do not seem to have enough sleep past few days. An average 8 hours of sleep over the next one week will increase the discount amount to 1500 yen.", which indicates an advice regarding the discount amount and safe driving, are displayed on the display unit 48.

If such display is made, the discount amount at the present time can be presented to the user. Further, attention to have enough sleep can be drawn to the user for safe driving and obtainment of a larger discount amount. Moreover, in this example, the target discount amount of 1500 yen and the average of 8 hours of sleep in one week, which is the behavior the user should perform to receive the discount, are specifically presented. The healthy life of the user can be facilitated and the motivation of the user can be improved.

In this way, in the display of the reference insurance premium information illustrated in FIG. 12, the information indicating the relationship between the behavior of the user such as sleep and labor and the discount amount, that is, the compensation for the service as the insurance premium is notified from the insurance management server 12 to the terminal device 11.

Note that, even in the example illustrated in FIG. 12, whether or not to display the character information indicating an advice as the reference insurance premium information can be set by the user himself/herself.

Further, in the reference insurance premium information, a warning to prompt the user to have enough sleep, to refrain from driving after long working hours, or the like can be appropriately displayed as an advice when the user has not had enough sleep or the working hours are long.

Further, in the present embodiment, the health state time series data cannot be generated in a state where the power of the terminal device 11 is off. Therefore, if the state in which the power of the terminal device 11 is off is long, the insurance premium cannot be accurately calculated in some cases.

Figure 13:
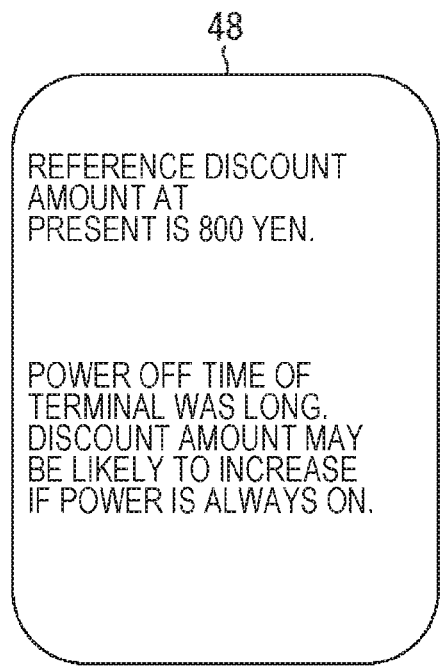
FIG. 13 is a diagram illustrating an example of the reference insurance premium information.

Therefore, in the case where the amount of the health state time series data received from the terminal device 11 is small, that is, in the case where the period in which the power of the terminal device 11 is off is long, the reference insurance premium information including an advice (message) to prompt the user to keep the power on of the terminal device 11 may be generated in step S223. In such a case, in step S218, for example, the reference insurance premium information illustrated in FIG. 13 is displayed.

In this example, character information "The reference discount amount at the present time is 800 yen.", which indicates a discount amount of the insurance premium at the present time as the reference insurance premium information, and character information "The power off time of the terminal seems long. A discount amount may be likely to increase if the power is always on.", an advice which prompts the user to keep the power ON of the terminal device 11, are displayed on the display unit 48.

If such display is made, the discount amount at the present time can be presented to the user. For example, in the case where the time to keep the terminal device 11 off is a predetermined time or more, the insurance premium calculation unit 91 can set the discount amount to the user to the amount same as the amount when the user lives an unhealthy life, that is, to the lowest discount amount, for example. In other words, a score of a safe driving degree can be set to the lowest score, or the like.

Further, presenting a message notifying the fact that the time to keep the power off is long and the possibility of an increase in the discount amount if the power is on to the user can prompt the user to keep the power on of the terminal device 11 as much as possible. Further, the user can specifically grasp how the discount amount increases by how the user behaves.

For example, display of the reference insurance premium information illustrated in FIG. 13 is performed in a case where the state where the health state time series data cannot be obtained continues for a predetermined period or more, or when the state where the health state time series data cannot be obtained occurs a predetermined number of times or more, for example.

As described above, the terminal device 11 transmits the health state time series data to the insurance management server 12 every time a fixed amount of the health state time series data is obtained. Further, the insurance management server 12 receives and records the health state time series data, and periodically generates the reference insurance premium information and transmits the reference insurance premium information to the terminal device 11. The communication cost can be suppressed to be low by transmitting the health state time series data to the insurance management server 12 by a fixed amount at a time.

<Description of Driving Determination Information Transmission Processing and Insurance Premium Calculation Processing>

Figure 14:
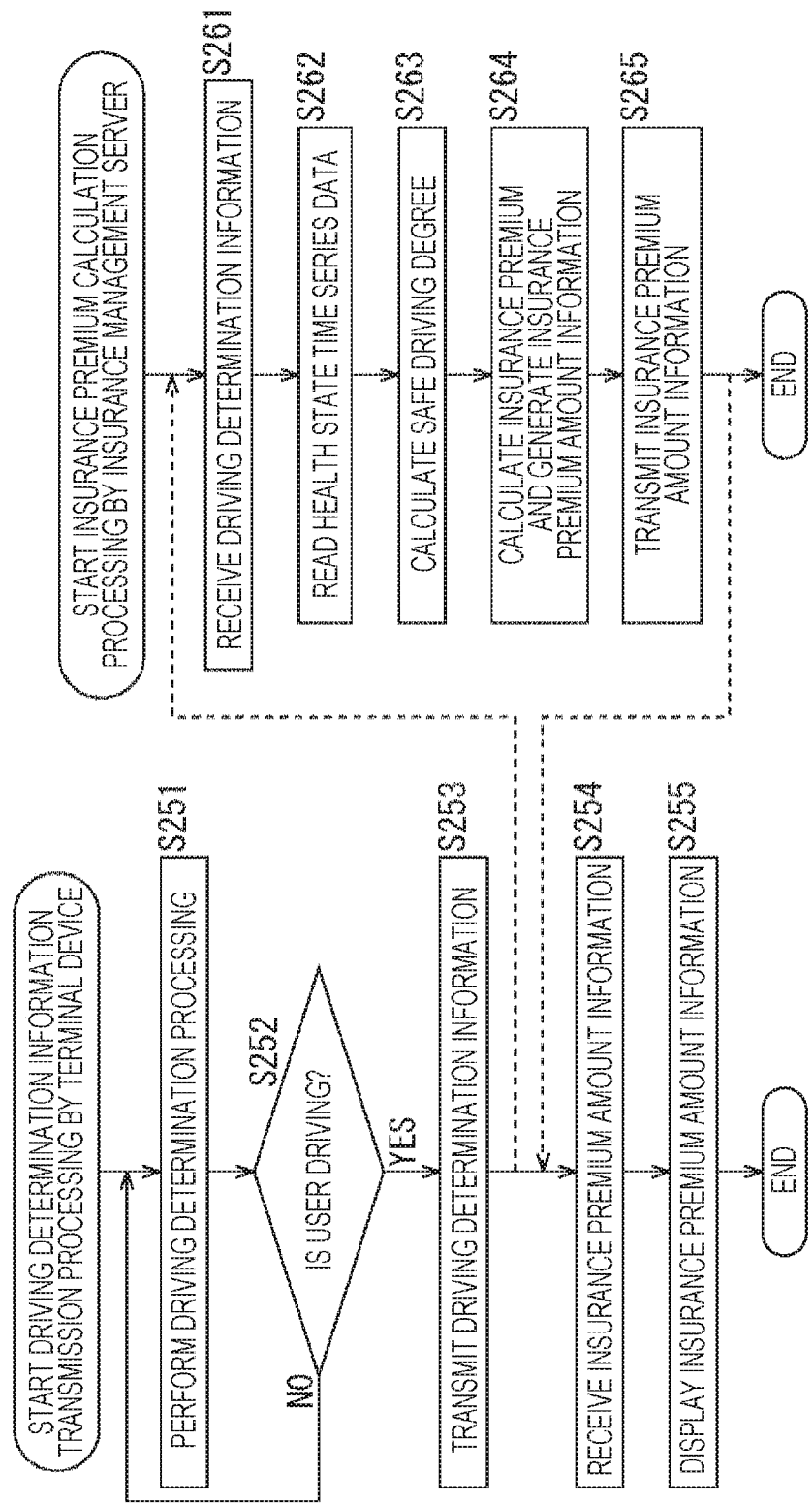
FIG. 14 is a flowchart for describing driving determination information transmission processing and insurance premium calculation processing.

Further, in the case where the health state time series data is transmitted to the insurance management server 12 by a fixed amount at a time, as described with reference to FIG. 11, when driving determination processing is performed in the terminal device 11 as in the first embodiment, processing illustrated in FIG. 14 is performed. That is, hereinafter, driving determination information transmission processing by the terminal device 11 and insurance premium calculation processing by the insurance management server 12 will be described with reference to the flowchart in FIG. 14.

When the driving determination information transmission processing is started, processing in steps S251 and S252 is performed and determination as to whether the user is driving is performed. This processing is similar to the processing in steps S11 and S12 in FIG. 4, and thus description is omitted.

Note that, in the case where the user is determined not to be driving in step S252, the processing returns to step S251 and the above processing is repeatedly performed.

On the other hand, in step S252, in the case where the user is determined to be driving, that is, in the case where the user has started driving the vehicle, the driving determination processing unit 51 generates the driving determination information indicating that the user is driving and supplies the driving determination information to the communication unit 41, and the processing proceeds to step S253.

In step S253, the communication unit 41 transmits the driving determination information supplied from the driving determination processing unit 51 to the insurance management server 12.

Then, in step S261, the communication unit 81 of the insurance management server 12 receives the driving determination information transmitted from the terminal device 11 and supplies the driving determination information to the control unit 83.

In step S262, the control unit 83 reads the health state time series data of the user from the recording unit 82 on the basis of the driving determination information supplied from the communication unit 81. Specifically, the health state time series data within a predetermined time range from the driving start time of the user indicated in the driving determination information, for example, the health state time series data of most recent one day before the start of driving is read. Note that decryption and decompression processing is performed for the read health state time series data, as needed.

When the health state time series data is read, then processing in steps S263 to S265 is performed and the insurance premium calculation processing is terminated. This processing is similar to the processing in steps S22 to S24 in FIG. 4, and thus description is omitted.

Further, here, the example in which the health state time series data is read from the recording unit 82 has been described. However, the health state time series data may be received together with the driving determination information from the terminal device 11, similarly to the case in FIG. 4.

Further, when the insurance premium amount information is transmitted from the insurance management server 12 to the terminal device 11, the terminal device 11 performs processing in steps S254 to S255 and the driving determination information transmission processing is terminated. Note that the processing in steps S254 to S255 is similar to the processing in steps S16 to S17 in FIG. 4, and thus description is omitted.

When the insurance management server 12 receives the driving determination information from the terminal device 11 as described above, the insurance management server 12 reads the health state time series data received from the terminal device 11 in advance and calculates the insurance premium on the basis of the driving determination information. Even in this case, the insurance premium can be calculated at the time of the start of driving, that is, at the time of getting into the vehicle by the user, using the health state time series data of a predetermined period of when the user is not driving and before the user drives, whereby a more appropriate insurance premium of the automobile insurance can be calculated.

Fifth Embodiment

<Description of Driving Determination Information Transmission Processing, Driving Determination Processing, and Insurance Premium Calculation Processing>

Further, the technique of transmitting the health state time series data to the insurance management server 12 by a fixed amount at a time, as described with reference to FIG. 11, can be applied to the second embodiment.

In such a case, an automobile insurance system is configured by a terminal device 11, an in-vehicle terminal device 111, and an insurance management server 12.

Figure 11:
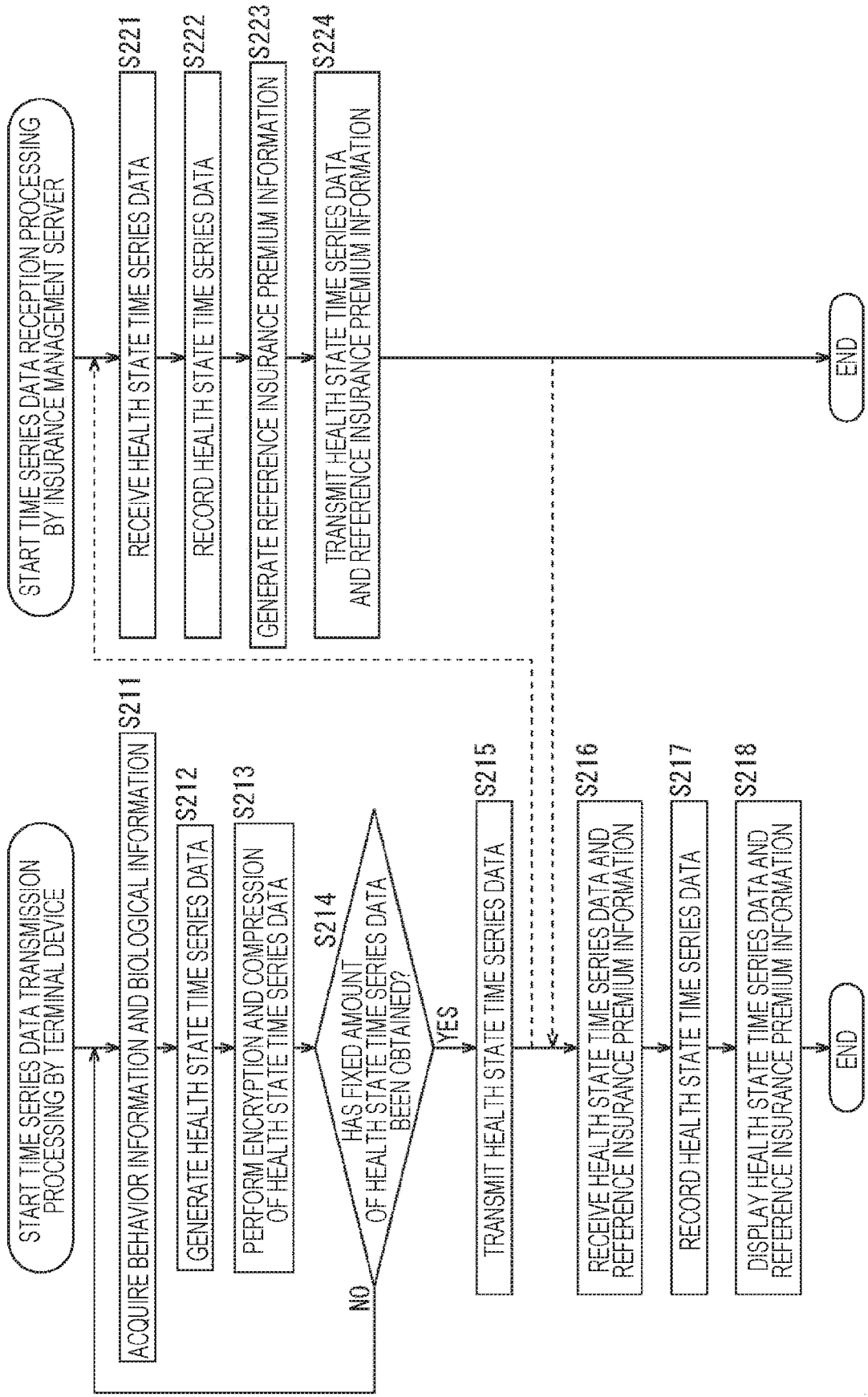
FIG. 11 is a flowchart illustrating time series data transmission processing and time series data reception processing.

In the automobile insurance system, the processing described with reference to FIG. 11 is performed, and health state time series data is transmitted and accumulated from the terminal device 11 to the insurance management server 12 by a fixed amount at a time.

Figure 15:
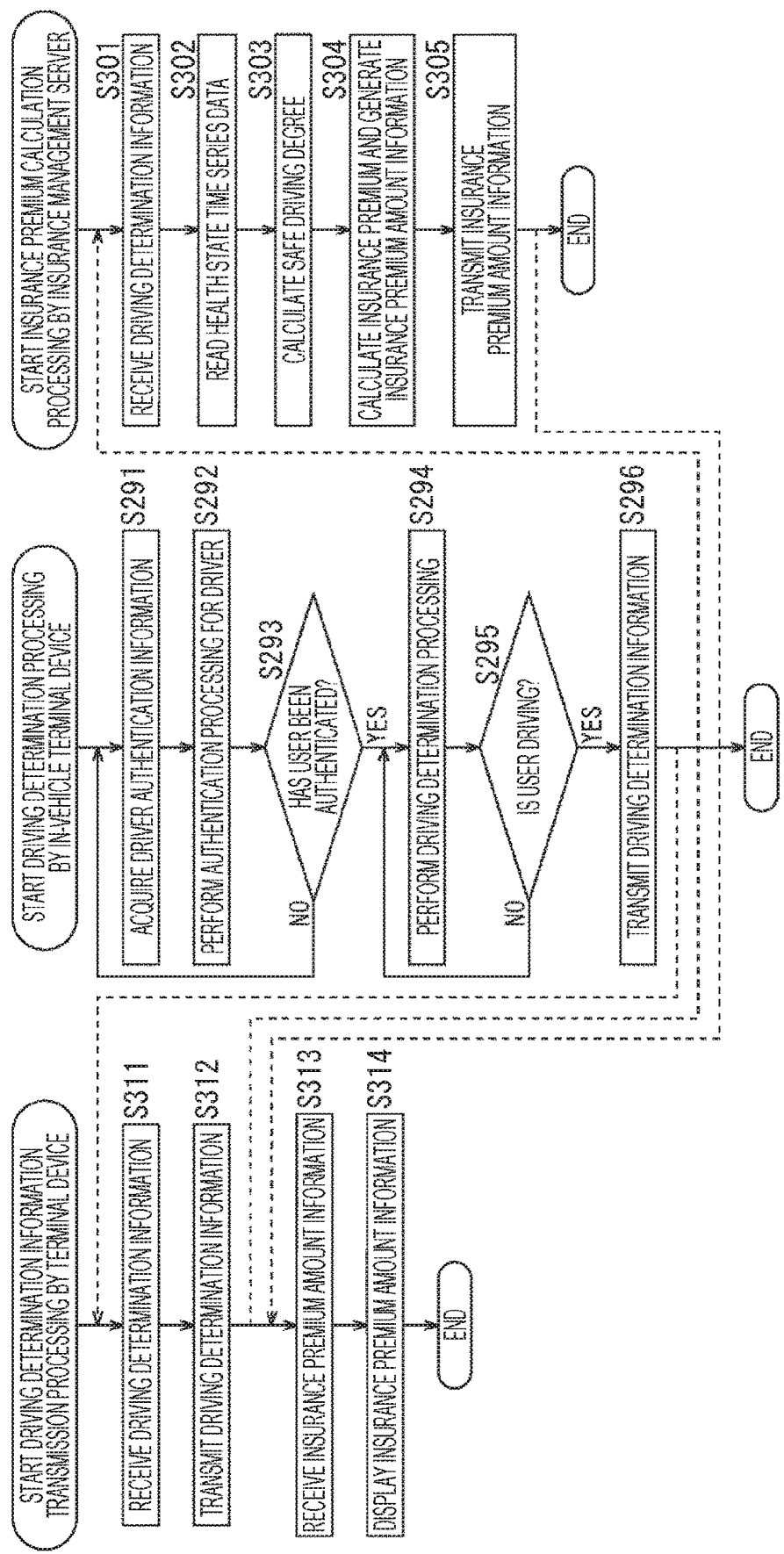
FIG. 15 is a flowchart for describing driving determination information transmission processing, driving determination processing, and insurance premium calculation processing.

Further, processing illustrated in FIG. 15 is performed in the terminal device 11, the in-vehicle terminal device 111, and the insurance management server 12. Hereinafter, driving determination information transmission processing by the terminal device 11, driving determination processing by the in-vehicle terminal device 111, and insurance premium calculation processing by the insurance management server 12 will be described with reference to the flowchart in FIG. 15.

First, in in-vehicle terminal device 111, processing in steps S291 to S296 is performed as the driving determination processing, and when a user starts driving a vehicle, driving determination information is generated and transmitted to the terminal device 11. Note that the processing in steps S291 to S296 is similar to the processing in steps S71 to S76 in FIG. 6, and thus description is omitted.

When the driving determination information is transmitted from the in-vehicle terminal device 111, a communication unit 41 of the terminal device 11 receives the driving determination information transmitted from the in-vehicle terminal device 111 and supplies the driving determination information to a control unit 45 in step S311.

Further, the control unit 45 supplies the received driving determination information to the communication unit 41 and instructs transmission.

In step S312, the communication unit 41 transmits the driving determination information supplied from the control unit 45 to the insurance management server 12.

Then, in step S301, a communication unit 81 of the insurance management server 12 receives the driving determination information transmitted from the terminal device 11 and supplies the driving determination information to a control unit 83.

When the driving determination information is received, then processing in steps S302 to S305 is performed and the insurance premium calculation processing is terminated. This processing is similar to the processing in steps S262 to S265 in FIG. 14, and thus description is omitted.

Further, when insurance premium amount information is transmitted from the insurance management server 12 to the terminal device 11, the terminal device 11 performs processing in steps S313 and S314 and terminates the driving determination information transmission processing. This processing is similar to the processing in steps S254 and S255 in FIG. 14, and thus description is omitted.

Even in the case of performing the driving determination processing in the in-vehicle terminal device 111, a more appropriate insurance premium of the automobile insurance can be calculated using the health state time series data of a predetermined period of when the user is not driving and before the user drives.

Sixth Embodiment

<Description of Application Processing and Acceptance Processing>

Further, the technique of transmitting the health state time series data to the insurance management server 12 by a fixed amount at a time, as described with reference to FIG. 11, can be applied to the third embodiment.

In such a case, an automobile insurance system is configured by a terminal device 11, an in-vehicle terminal device 111, and an insurance management server 12.

In the automobile insurance system, the processing described with reference to FIG. 11 is performed, and health state time series data is transmitted and accumulated from the terminal device 11 to the insurance management server 12 by a fixed amount at a time.

Figure 16:
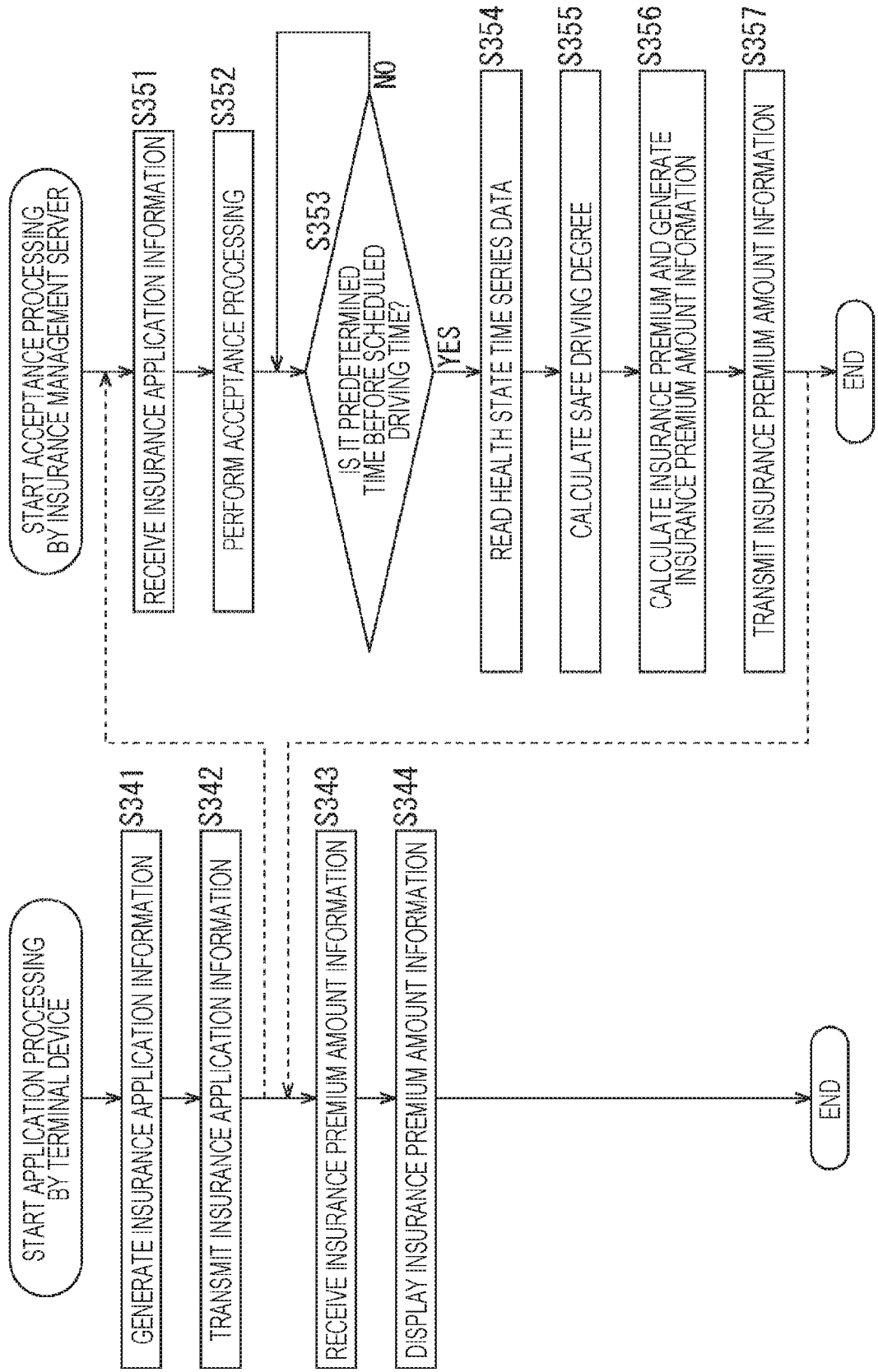
FIG. 16 is a flowchart for describing application processing and acceptance processing.

Further, processing illustrated in FIG. 16 is performed in the terminal device 11 and the insurance management server 12 at the time of applying for automobile insurance with no refund payment for a car sharing service. Hereinafter, application processing by the terminal device 11 and acceptance processing by the insurance management server 12 will be described with reference to the flowchart in FIG. 16.

When the application processing is started, processing in step S341 and step S342 is performed, and insurance application information is transmitted. Note that the processing in steps S341 and S342 is similar to the processing in steps S113 and S114 in FIG. 7, and thus description is omitted.

Further, when the insurance application information is transmitted, the insurance management server 12 performs processing in steps S351 to S353. Note that the processing in steps S351 to S353 is similar to the processing in steps S131 to S133 in FIG. 7, and thus description is omitted.

In step S353, when it is determined to be a predetermined time before a scheduled driving time, a control unit 83 reads health state time series data of a user from a recording unit 82 in step S354. Specifically, the health state time series data within a predetermined time range from the scheduled driving time of the user, for example, the health state time series data of most recent one day before the scheduled driving time is read. At this time, decryption and decompression processing is performed for the read health state time series data, as needed.

When the health state time series data is received, processing in steps S355 to S357 is performed and the acceptance processing is terminated. This processing is similar to the processing in steps S136 to S138 in FIG. 7, and thus description is omitted.

Further, when insurance premium amount information is transmitted from the insurance management server 12 to the terminal device 11, the terminal device 11 performs processing in steps S343 and S344 and terminates the application processing. This processing is similar to the processing in steps S117 and S118 in FIG. 7, and thus description is omitted.

Figure 9:
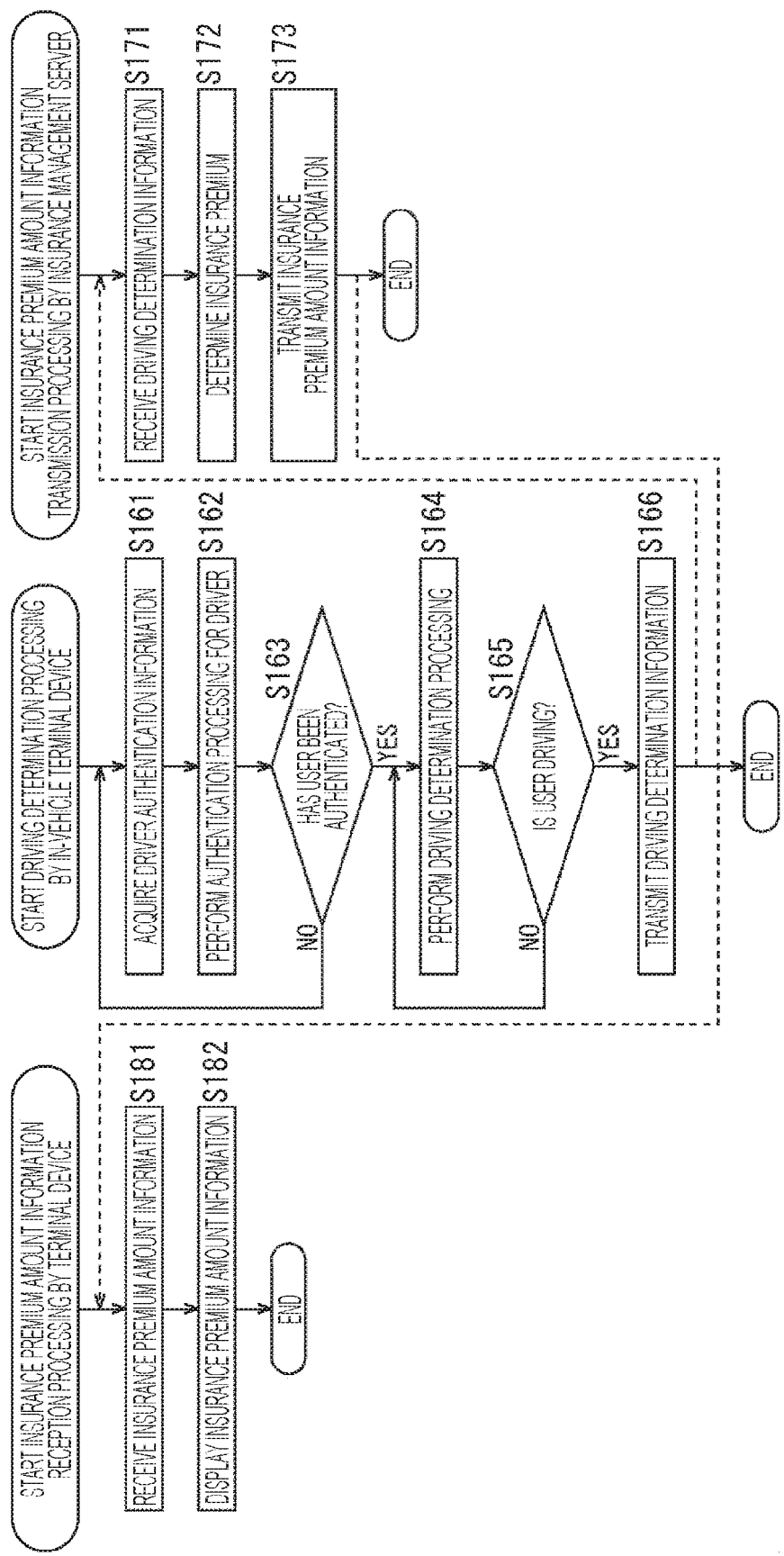
FIG. 9 is a flowchart for describing insurance premium amount information reception processing, driving determination processing, and insurance premium amount information transmission processing.

When the application and acceptance for automobile insurance have been performed as described above, the terminal device 11, the in-vehicle terminal device 111, and the insurance management server 12 perform the insurance premium amount information reception processing, the driving determination processing, and the insurance premium amount information transmission processing described with reference to FIG. 9.

Even in the case of the car sharing service, a more appropriate insurance premium of the automobile insurance can be calculated using the health state time series data of a predetermined period of when the user is not driving and before the user drives.

Seventh Embodiment

<Configuration Example of Insurance Management Server>

Note that, in the fourth embodiment, the health state time series data is transmitted to the insurance management server 12 by a fixed amount at a time. As described above, the health state time series data indicating the result of recognizing the behavior and the biological state of the user has the risk of falsification by the user, and in addition, the calculation cost in the terminal device 11 to obtain the health state time series data is large.

Therefore, to prevent falsification of the health state time series data, behavior information and biological information may be transmitted from a terminal device 11 to an insurance management server 12, and health state time series data may be generated in the insurance management server 12.

Figure 17:
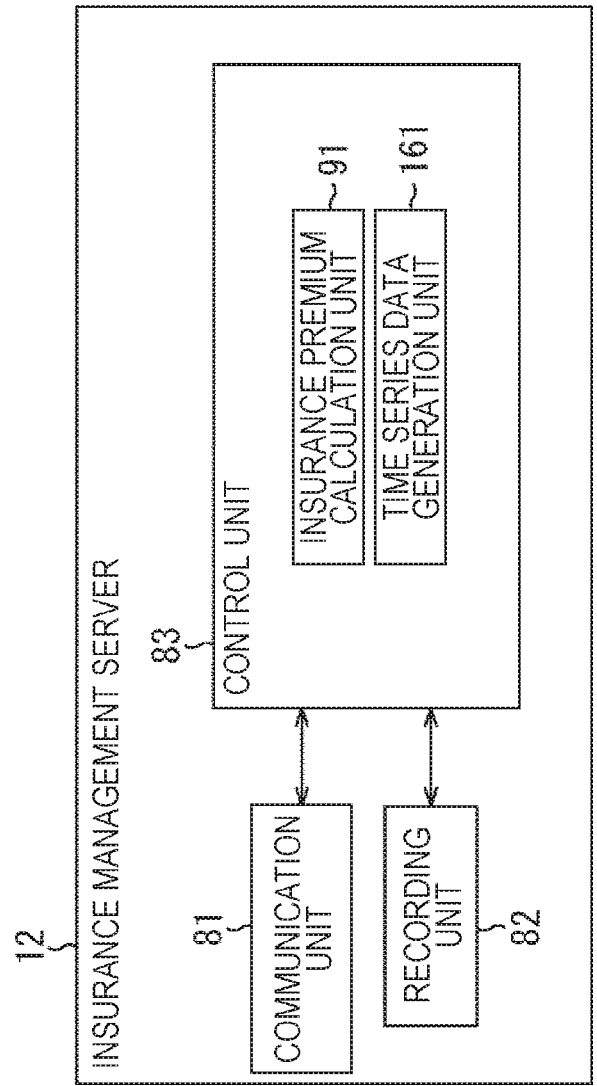
FIG. 17 is a diagram illustrating a configuration example of an insurance management server.

In such a case, the insurance management server 12 is configured as illustrated in FIG. 17, for example. Note that, in FIG. 17, a portion corresponding to the case in FIG. 3 is denoted by the same reference numeral, and description thereof is omitted.

The insurance management server 12 illustrated in FIG. 17 includes a communication unit 81, a recording unit 82, and a control unit 83. The control unit 83 includes an insurance premium calculation unit 91 and a time series data generation unit 161. That is, the configuration of the insurance management server 12 illustrated in FIG. 17 is a configuration provided with the control unit 83 and the time series data generation unit 161 with respect to the configuration of the insurance management server 12 illustrated in FIG. 3, and other configurations are the same as the configurations of the insurance management server 12 in FIG. 3.

The time series data generation unit 161 corresponds to the time series data generation unit 52 of the terminal device 11 in FIG. 2, and generates health state time series data on the basis of the behavior information and the biological information.

<Description of Information Transmission Processing and Information Reception Processing>

Next, processing performed in the terminal device 11 and the insurance management server 12 when the health state time series data is generated in the insurance management server 12 will be described. That is, hereinafter, information transmission processing by the terminal device 11 and information reception processing by the insurance management server 12 will be described with reference to the flowchart in FIG. 18.

When the information transmission processing by the terminal device 11 is started, processing in step S381 is performed, and the behavior information and the biological information are acquired. The processing in step S381 is similar to the processing in step S211 in FIG. 11, and thus description is omitted.

In step S382, a control unit 45 encrypts and compresses the behavior information supplied from a behavior information acquisition unit 43 and the biological information supplied from a biological information acquisition unit 44. That is, the behavior information is encrypted and compressed by a predetermined method and the biological information is encrypted and compressed by a predetermined method.

In step S383, the control unit 45 determines whether or not to transmit the behavior information and the biological information.

For example, if the behavior information and the biological information are transmitted instead of the health state time series data to the insurance management server 12, it is difficult to falsify the behavior information and the biological information in the terminal device 11. Therefore, fraudulence can be prevented and security can be improved.

Meanwhile, since the behavior information and the biological information have a larger amount of data than the health state time series data, the communication cost and the power consumption of the terminal device 11 in the case of transmitting the behavior information and the biological information become larger than those in the case of transmitting the health state time series data.

Therefore, in the present embodiment, transmission of the behavior information and the biological information is determined in step S383 in the terminal device 11, in the case where predetermined communication connection such as Wi-Fi (registered trademark) is made, that is, in the case where communication with a low communication cost for the user becomes possible, or in the case where the terminal device 11 becomes a charging state, for example.

For example, a communication connection method that enables communication with the lowest communication cost for the user is registered in advance, and the transmission processing is performed when the communication is made by the registered communication connection method, whereby transmission can be performed at a low communication cost. Further, if the transmission processing is performed during charging of the terminal device 11, the remaining amount of a battery of the terminal device 11 is not reduced.

Note that, here, the example in which transmission of the behavior information and the biological information is determined when either one of the case where predetermined communication connection is made and the case where the terminal device 11 becomes the charging state is made. However, transmission of the behavior information and the biological information may be determined in the case where the predetermined communication connection is made and in the case where the terminal device 11 becomes the charging state, or transmission of the behavior information and the biological information may be determined only in the case where the predetermined communication connection is made or only in the case where the terminal device 11 becomes the charging state.

In step S383, in the case where the behavior information and the biological information are determined not to be transmitted, the processing returns to step S381 and the above processing is repeatedly performed.

On the other hand, in the case where the behavior information and the biological information are determined to be transmitted in step S383, the control unit 45 supplies the encrypted and compressed behavior information and biological information obtained in step S382 to a communication unit 41, and the processing proceeds to step S384.

In step S384, the communication unit 41 transmits the behavior information and the biological information supplied from the control unit 45 to the insurance management server 12.

Then, in step S391, the communication 81 of the insurance management server 12 receives the behavior information and the biological information transmitted from the terminal device 11 and supplies the behavior information and the biological information to the control unit 83.

In step S392, the time series data generation unit 161 generates the health state time series data on the basis of the behavior information and the biological information supplied from the communication unit 81. Note that, in step S392, after decryption and decompression processing for the behavior information and the biological information is performed as needed, processing similar to the processing in step S212 in FIG. 11 is performed.

When the health state time series data is generated, then processing in steps S393 to S395 is performed and the information reception processing is terminated. This processing is similar to the processing in steps S222 to S224 in FIG. 11, and thus description is omitted.

Further, when the processing in step S395 is performed and the health state time series data and reference insurance premium information are transmitted from the insurance management server 12, the terminal device 11 performs processing in steps S385 to S387 and terminates the information transmission processing. Note that the processing in steps S385 to S387 is similar to the processing in steps S216 to S218 in FIG. 11, and thus description is omitted.

As described above, the terminal device 11 acquires the behavior information and the biological information, and transmits the behavior information and the biological information to the insurance management server 12 at predetermined timing. Further, the insurance management server 12 generates the health state time series data from the received behavior information and biological information.

In doing so, the falsification of the health state time series data can be prevented and the security can be improved while the communication cost and the power consumption in the terminal device 11 are suppressed to be low. Further, the calculation cost in the terminal device 11 can be reduced.

When the health state time series data is recorded in the insurance management server 12 by the above processing, the automobile insurance system thereafter appropriately performs, for example, the processing described with reference to FIG. 14, the processing described with reference to FIG. 15, the processing described with reference to FIG. 16, the processing described with reference to FIG. 9, and the like.

Figure 18:
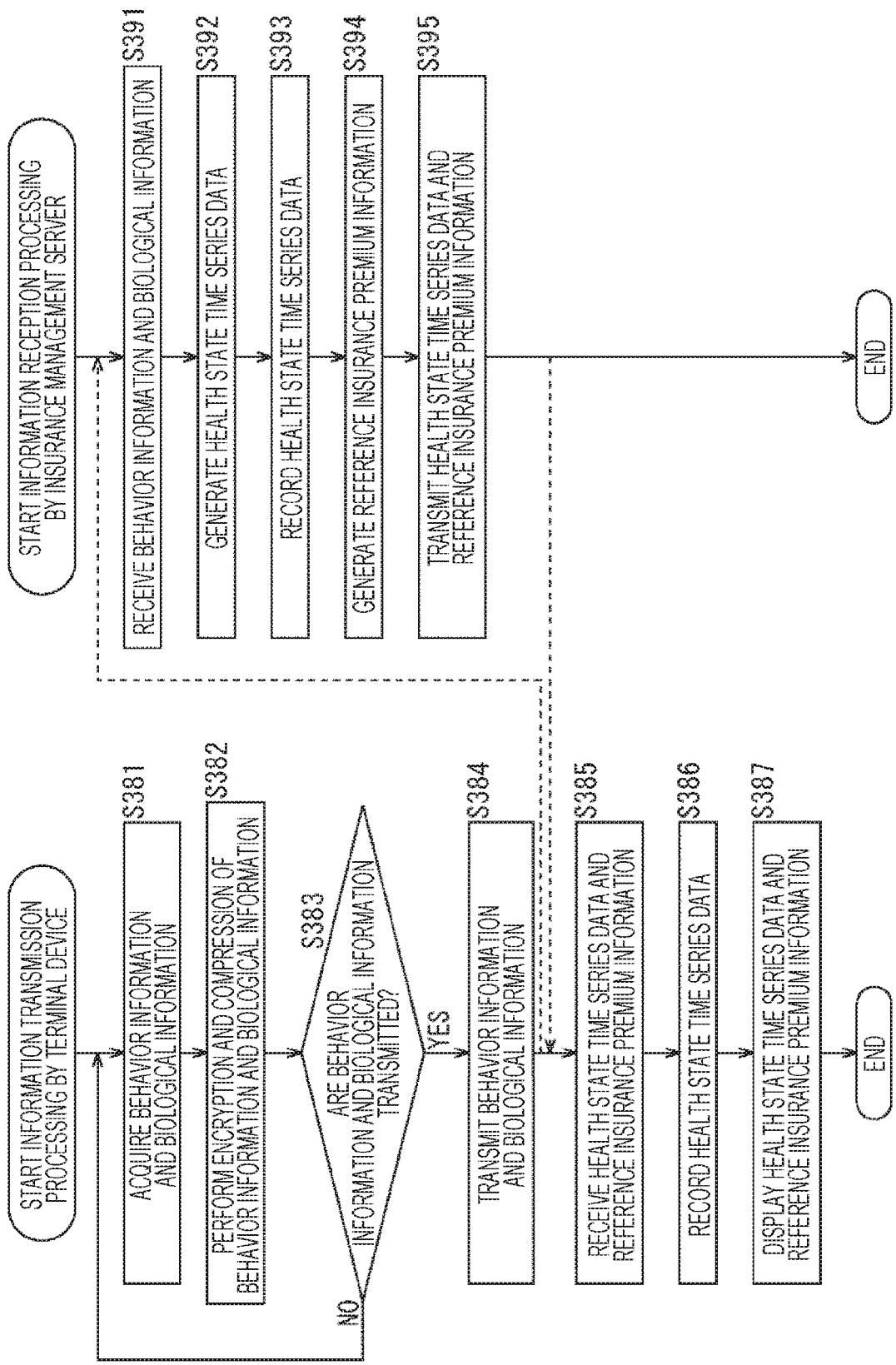
FIG. 18 is a flowchart for describing information transmission processing and information reception processing.

Further, in the information transmission processing described with reference to FIG. 18, the case of transmitting both the behavior information and the biological information has been described. However, whether to transmit only the behavior information or whether to transmit both the behavior information and the biological information can be set by the user.

Figure 19:
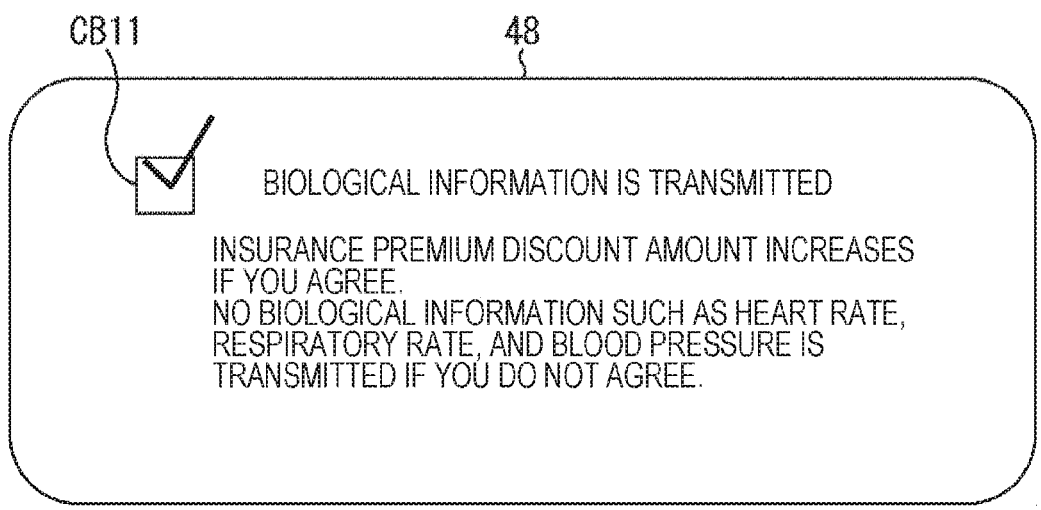
FIG. 19 is a diagram illustrating a display example of a setting screen.

In such a case, the terminal device 11 displays a setting screen illustrated in FIG. 19 on a display unit 48 for setting, for example.

In the example illustrated in FIG. 19, character information "Biological information is transmitted", which indicates that the biological information is to be transmitted, and a check box CB11 are displayed on the setting screen.

Further, character information "The insurance premium discount amount increases if you agree. No biological information such as the heart rate, the respiratory rate, and the blood pressure is transmitted if you do not agree.", which indicates a merit for the user when setting transmission of the biological information, is displayed on the setting screen as a message.

That is, information indicating a relationship between the type and amount of information provided by the user and the insurance premium that is a compensation for the service is displayed as the message. By making such a presentation, the user compares the type and amount of its own information used for the service, that is, a disclosure range of its own information, with the compensation for the service as the discount of the insurance premium, and can make setting suitable for the user himself/herself.

Further, the biological information such as the blood pressure and the heart rate of the user is information greatly affecting the degree of fatigue, that is, the safe driving degree, of the user. Therefore, even for the insurance management server 12 side, the insurance management server 12 can calculate a more appropriate insurance premium with higher accuracy by preferentially treating the user who provides the biological information and making the discount of the insurance premium large to prompt provision of the biological information of the user.

In this example, for example, when the user operates an input unit 46 and a check symbol is displayed in the check box CB11, transmission of the biological information is set. In this case, the control unit 45 generates a transmission flag for transmitting the biological information on the basis of a signal from the input unit 46, and records the transmission flag in a recording unit 47. Then, in the processing in step S384 in FIG. 18, the behavior information and the biological information are transmitted to the insurance management server 12 by reference to the transmission flag.

In contrast, when the check symbol is not displayed in the check box CB11, non-transmission of the biological information is set, for example. In this case, the control unit 45 generates a transmission flag for not transmitting the biological information on the basis of the signal from the input unit 46, and records the transmission flag in the recording unit 47. Then, in the processing in step S384 in FIG. 18, only the behavior information is transmitted to the insurance management server 12 by reference to the transmission flag.

Further, the transmission flag indicating whether or not to transmit the biological information is also transmitted to the insurance management server 12 by the communication unit 41. In this case, the communication unit 81 of the insurance management server 12 receives the transmission flag from the terminal device 11, and the received transmission flag is recorded in the recording unit 82. Further, the transmission flag recorded in the recording unit 82 is referred in calculating the insurance premium by the insurance premium calculation unit 91, and the discount amount of the insurance premium is determined according to the value of the transmission flag, that is, whether or not to transmit the biological information. Specifically, the discount amount in the case of providing the biological information becomes larger than the discount amount in the case of not providing the biological information.

Note that the setting screen as to whether or not to transmit the biological information illustrated in FIG. 19 may be generated in the insurance management server 12 at the time of setting, transmitted to the terminal device 11 by the communication unit 81 of the insurance management server 12, and received by the communication unit 41. In this case, a notification notifying that the discount amount increases by provision of the biological information is sent from the insurance management server 12 to the terminal device 11. Further, there are various types of biological information such as the blood pressure, the heart rate, and the respiratory rate. Therefore, the user may be able to select an arbitrary number of the types as the biological information to be transmitted.

Eighth Embodiment

<Description of Information Transmission Processing and Information Reception Processing>

Further, in the seventh embodiment, the example in which the behavior information and the biological information are transmitted when the predetermined condition is satisfied such as whether the communication connection of the terminal device 11 is made or whether the terminal device 11 becomes the charging state. However, the behavior information and the biological information may be transmitted when only a fixed amount is obtained.

Figure 20:
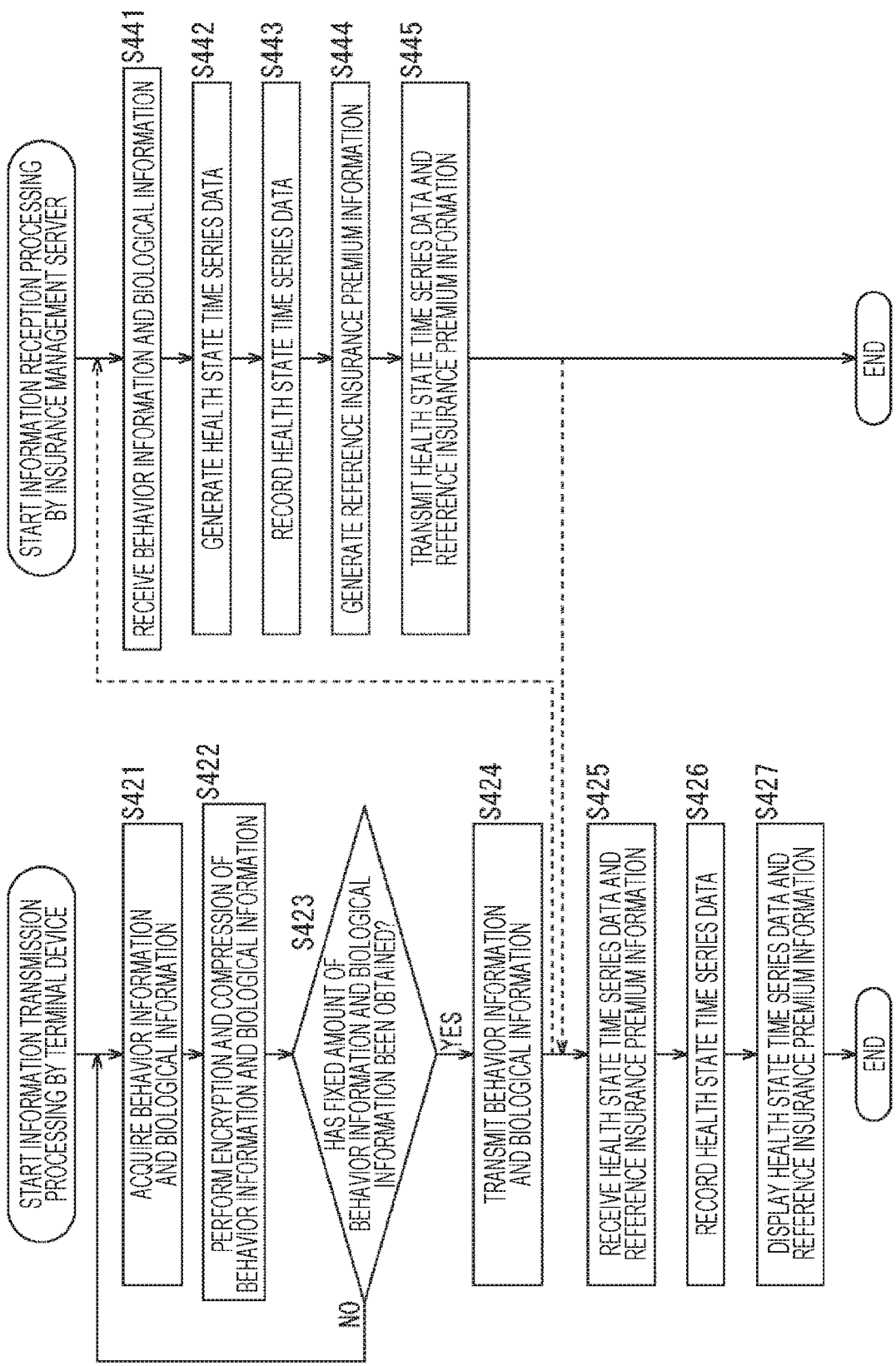
FIG. 20 is a flowchart for describing information transmission processing and information reception processing.

In such a case, an insurance management server 12 configuring an automobile insurance system has a configuration illustrated in FIG. 17, for example. Further, at this time, processing illustrated in FIG. 20 is performed by a terminal device 11 and the insurance management server 12. Hereinafter, information transmission processing performed by the terminal device 11 and information reception processing performed by the insurance management server 12 will be described with reference to the flowchart in FIG. 20.

When the information transmission processing by the terminal device 11 is started, processing in steps S421 and S422 is performed to acquire, encrypt, and compress behavior information and biological information. Note that the processing in steps S421 and S422 is similar to the processing in steps S381 and S382 in FIG. 18, and thus description is omitted.

In step S423, a control unit 45 determines whether or not the behavior information and the biological information have been obtained by a fixed amount.

In step S423, in the case where the behavior information and the biological information are determined not to have been obtained by the fixed amount, the processing returns to step S421 and the above processing is repeatedly performed.

On the other hand, in step S423, in the case where the behavior information and the biological information are determined to have been obtained by the fixed amount, the control unit 45 supplies the encrypted and compressed behavior information and biological information obtained in step S422 to a communication unit 41, and the processing proceeds to step S424.

In step S424, the communication unit 41 transmits the behavior information and the biological information supplied from the control unit 45 to the insurance management server 12.

Then, the insurance management server 12 performs processing in steps S441 to S445 as the information reception processing. Note that the processing in steps S441 to S445 is similar to the processing in steps S391 to S395 in FIG. 18, and thus description is omitted.

Further, when the information reception processing is performed in the insurance management server 12 and health state time series data and reference insurance premium information are transmitted, the terminal device 11 performs processing in steps S425 to S427 and terminates the information transmission processing. Note that the processing in steps S425 to S427 is similar to the processing in steps S385 to S387 in FIG. 18, and thus description is omitted.

As described above, the terminal device 11 acquires the behavior information and the biological information, and transmits the behavior information and the biological information to the insurance management server 12 at timing when the fixed amount is obtained. Further, the insurance management server 12 generates the health state time series data from the received behavior information and biological information.

By doing so, the falsification of the health state time series data can be prevented and the security can be improved. In particular, in the processing described in the present embodiment, the behavior information and the biological information are immediately transmitted when the fixed amount of such information is obtained. Therefore, the security can be improved as compared with the above six and seventh embodiments.

When the health state time series data is recorded in the insurance management server 12 by the above processing, the automobile insurance system thereafter appropriately performs, for example, the processing described with reference to FIG. 14, the processing described with reference to FIG. 15, the processing described with reference to FIG. 16, the processing described with reference to FIG. 9, and the like.

Note that whether or not to transmit the biological information may be made settable in the terminal device 11, similarly to the seventh embodiment.

Further, whether the behavior information and the biological information are transmitted when the fixed amount is obtained, as described with reference to FIG. 20, or whether the behavior information and the biological information are transmitted when the predetermined condition is satisfied, as described with reference to FIG. 18 may be made settable in the terminal device 11.

Figure 21:
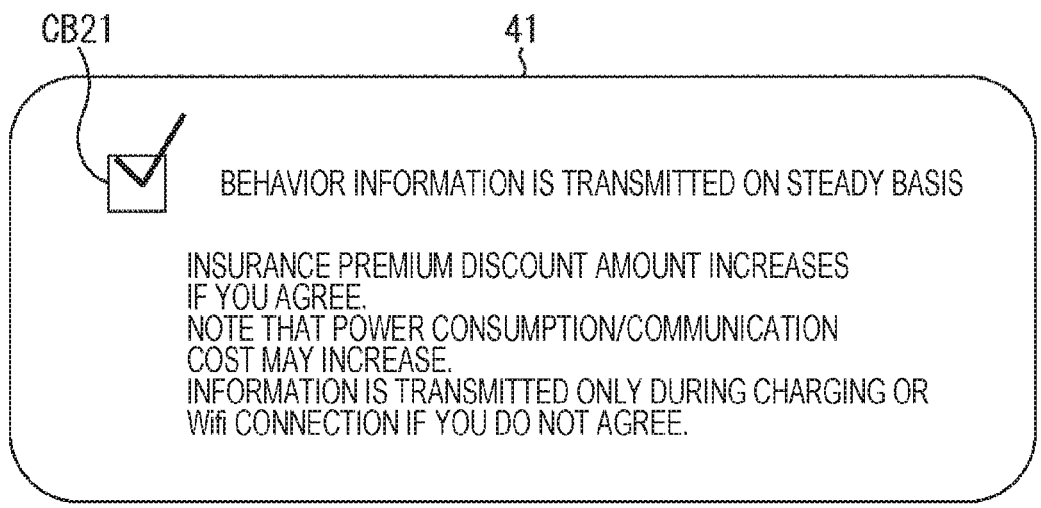
FIG. 21 is a diagram illustrating a display example of a setting screen.

In such a case, the terminal device 11 displays a setting screen illustrated in FIG. 21 on a display unit 48 for setting, for example. Note that, in the example illustrated in FIG. 21, the case of transmitting only the behavior information without transmitting the biological information has been described as an example. However, similar setting may be made in the case of transmitting both the behavior information and the biological information.

In the example illustrated in FIG. 21, character information "Biological information is transmitted on a steady basis", which indicates that the behavior information is transmitted on a steady basis, and a check box CB21 are displayed on the setting screen.

Further, character information "The insurance premium discount amount increases if you agree. Note that power consumption/communication cost may increase. Information is transmitted only during charging or at WiFi connection if you do not agree.", which indicates a merit for the user when transmitting the behavior information on a steady basis is set, is displayed on the setting screen as a message.

For example, if the behavior information is constantly transmitted, the amount of data of one communication is smaller and in addition, fraudulence such as falsification becomes more difficult than the case of transmitting the behavior information when a specific condition such as during charging is satisfied. Therefore, a more appropriate insurance premium can be calculated.

Therefore, even for the insurance management server 12 side, the insurance management server 12 can prevent the fraudulence and improve the security by preferentially treating the user who sets constant transmission of the behavior information and making the discount of the insurance premium large to prompt constant transmission of the behavior information of the user.

In this example, for example, when the user operates an input unit 46 and a check symbol is displayed in the check box CB21, constant transmission of the behavior information is set, that is, immediate transmission of the behavior information when the fixed amount is obtained is set. In this case, the control unit 45 generates a constant transmission flag for constantly transmitting the behavior information on the basis of a signal from the input unit 46, and records the constant transmission flag in a recording unit 47. Then, the processing described with reference to FIG. 20 is performed as the information transmission processing by reference to the constant transmission flag.

In contrast, when the check symbol is not displayed in the check box CB21, transmission of the behavior information when a predetermined condition is satisfied is set, for example. In this case, the control unit 45 generates a constant transmission flag for not constantly transmitting the behavior information on the basis of the signal from the input unit 46, and records the constant transmission flag in the recording unit 47. Then, the processing described with reference to FIG. 18 is performed as the information transmission processing by reference to the constant transmission flag.

Further, the constant transmission flag indicating whether or not to constantly transmit the behavior information is also transmitted to the insurance management server 12 by the communication unit 41. In this case, the communication unit 81 of the insurance management server 12 receives the constant transmission flag from the terminal device 11, and the received constant transmission flag is recorded in a recording unit 82. Further, the constant transmission flag recorded in the recording unit 82 is referred in calculating the insurance premium by an insurance premium calculation unit 91, and the discount amount of the insurance premium is determined according to the value of the constant transmission flag, that is, whether or not to constantly transmit the behavior information. Specifically, the discount amount in the case of constantly transmitting the behavior information becomes larger than the discount amount in the case of not constantly transmitting the behavior information.

Note that a setting screen as to whether or not to constantly transmit the behavior information illustrated in FIG. 21 may be generated in the insurance management server 12 at the time of setting and transmitted to the terminal device 11. In this case, a notification notifying that the discount amount increases by constant transmission of the behavior information is sent from the insurance management server 12 to the terminal device 11.

Ninth Embodiment

<Configuration Example of Terminal Device>

By the way, there is a strong relevance between biological information obtained by a terminal device 11, that is, biological recognition time series data, and driving content of when a user actually drives a vehicle.

For example, when the user's heart rate is high, or the like, the user may not be able to safely drive. Therefore, the terminal device 11 may generate health state time series data and driving state information indicating driving content at the time of driving. Thereby, there is a possibility that the user may not be able to safely drive from the health state time series data and the driving state information at the time of driving, the insurance management server 12 can present a message notifying the possibility to the user before driving a vehicle.

Specifically, for example, in the case where the user has a history of unstable driving such as driving in a zigzag manner when the heart rate is high, a message such as a warning can be presented to call attention when the user attempts to get into a vehicle with a high heart rate.

Figure 22:
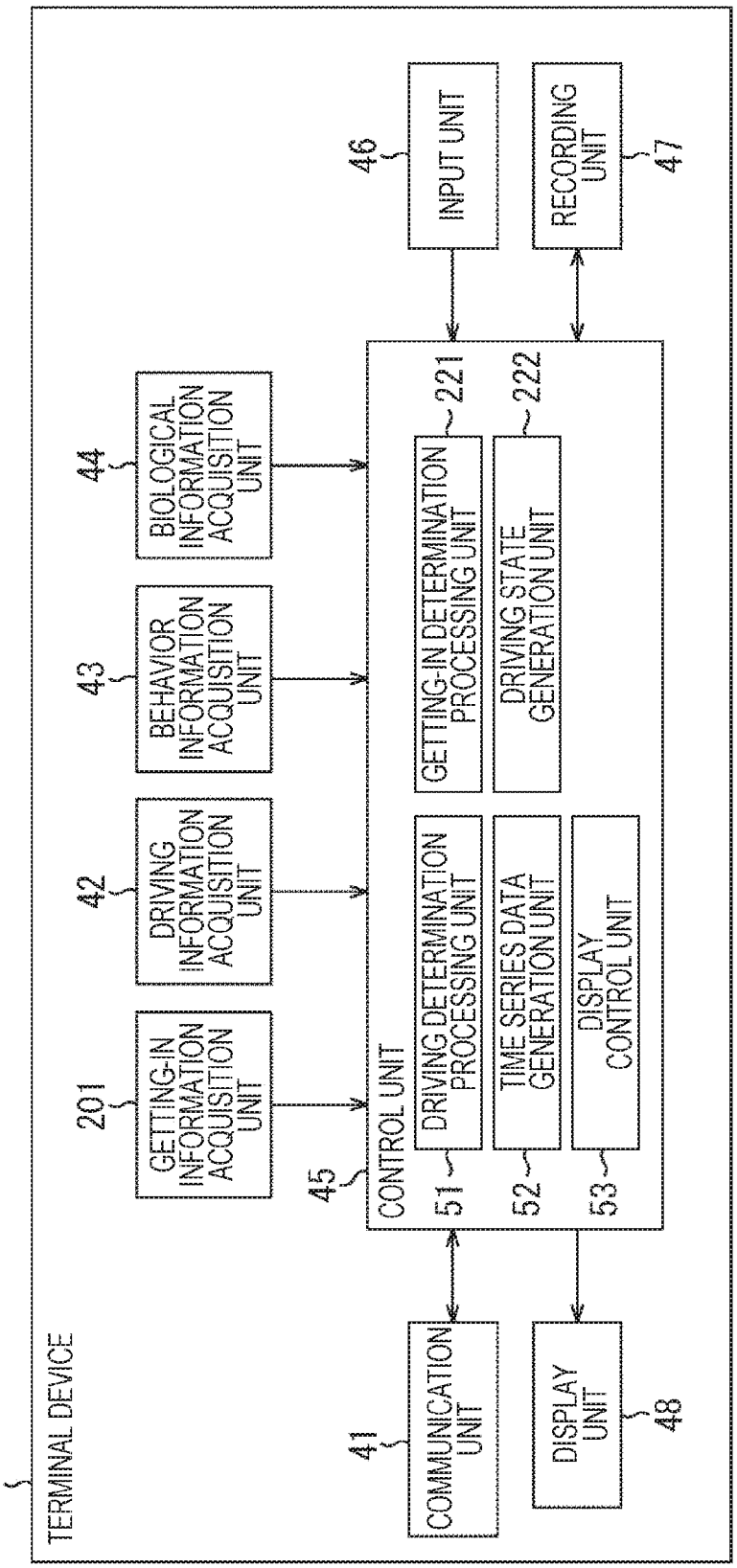
FIG. 22 is a diagram illustrating a configuration example of a terminal device.

In the case of generating the driving state information together with the health state time series data, the terminal device 11 is configured as illustrated in FIG. 22, for example. Note that, in FIG. 22, a portion corresponding to the case in FIG. 2 is denoted by the same reference numeral, and description thereof is omitted.

The terminal device 11 illustrated in FIG. 22 includes a communication unit 41, a getting-in information acquisition unit 201, a driving information acquisition unit 42, a behavior information acquisition unit 43, a biological information acquisition unit 44, a control unit 45, an input unit 46, a recording unit 47, and a display unit 48. Further, the control unit 45 includes a driving determination processing unit 51, a time series data generation unit 52, a display control unit 53, a getting-in determination processing unit 221, and a driving state generation unit 222.

The terminal device 11 illustrated in FIG. 22 has a configuration newly provided with the getting-in information acquisition unit 201, the getting-in determination processing unit 221, and the driving state generation unit 222 with respect to the terminal device 11 illustrated in FIG. 2.

The getting-in information acquisition unit 201 includes, for example, a beacon for performing near field wireless communication, a position measuring unit that measures its own position such as a satellite positioning system, and the like, and acquires getting-in information for detecting getting into a vehicle by the user, and supplies the getting-in information to the control unit 45.

The getting-in determination processing unit 221 performs getting-in determination processing of determining whether or not the user has got into a vehicle covered by automobile insurance on the basis of the getting-in information supplied from the getting-in information acquisition unit 201.

For example, in the case where the getting-in information acquisition unit 201 includes the beacon, the beacon is provided in the vehicle covered by the automobile insurance. When the terminal device 11 approaches the vehicle, that is, when the terminal device 11 enters an area within a predetermined distance from the vehicle, the getting-in information acquisition unit 201 receives a signal indicating that the terminal device 11 has approached the vehicle and outputs the signal to the control unit 45, by the near field wireless communication from the beacon of the vehicle. In the case where the signal indicating that the terminal device 11 has approached the vehicle is supplied from the getting-in information acquisition unit 201, the getting-in determination processing unit 221 determines that the user has got into the vehicle.

Further, for example, in the case where the getting-in information acquisition unit 201 includes the position measuring unit, the getting-in determination processing unit 221 determines that the user has got into the vehicle in the case where the position of the terminal device 11 indicated by position information output from the position measuring unit is a position near the vehicle covered by the automobile insurance.

Note that the getting-in determination processing may be performed by any method as long as the method can detect that the user has approached the vehicle or the user has sat behind the steering wheel of the vehicle, that is, the method can detect that the user has got into the vehicle.

The driving state generation unit 222 generates driving state information indicating a driving state of the vehicle by the user at each time on the basis of the driving information supplied from the driving information acquisition unit 42. Examples of the driving state indicated by the driving state information include states of actual driving such as sudden acceleration, sudden braking, sudden steering, and unstable traveling. Such driving states can be obtained from a measurement result of the position by the position measuring unit as the driving information and a measurement result of acceleration by an acceleration sensor.

<Configuration Example of Insurance Management Server>

Figure 23:
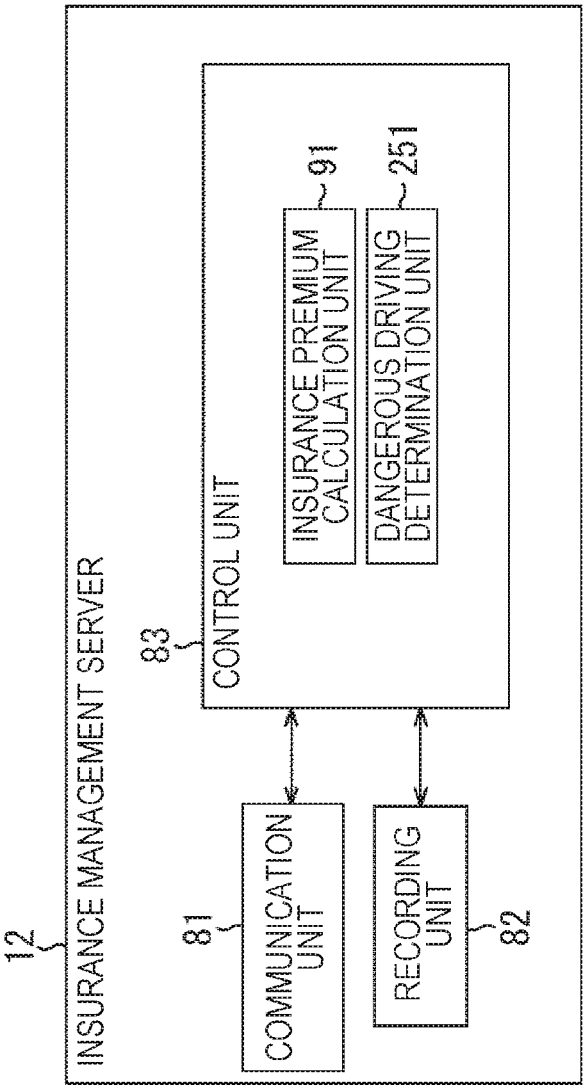
FIG. 23 is a diagram illustrating a configuration example of an insurance management server.

Further, in the case where the driving state information is generated in the terminal device 11, the insurance management server 12 is configured as illustrated in FIG. 23, for example. Note that, in FIG. 23, a portion corresponding to the case in FIG. 3 is denoted by the same reference numeral, and description thereof is omitted.

The insurance management server 12 illustrated in FIG. 23 includes a communication unit 81, a recording unit 82, and a control unit 83. The control unit 83 includes an insurance premium calculation unit 91 and a dangerous driving determination unit 251.

The configuration of the insurance management server 12 illustrated in FIG. 23 is the configuration of the insurance management server 12 illustrated in FIG. 3 further provided with the dangerous driving determination unit 251.

The dangerous driving determination unit 251 determines whether or not the user has performed dangerous driving and generates dangerous driving information according to a determination result on the basis of the health state time series data and the driving state information acquired when the user is driving the vehicle, which has been received from the terminal device 11.

Here, the dangerous driving information is information indicating the content of dangerous driving such as sudden acceleration, for example. Further, information such as date and time of the dangerous driving may be included in the dangerous driving information.

<Description of Driving State Information Transmission Processing and Dangerous Driving Determination Processing>

In the present embodiment, an automobile insurance system is configured by the terminal device 11 illustrated in FIG. 22 and the insurance management server 12 illustrated in FIG. 23. Hereinafter, a specific operation of the automobile insurance system will be described.

In the terminal device 11, the health state time series data is generated in both states of at the time of driving and non-driving of the vehicle by the user, that is, the health state time series data is constantly generated. In particular, not only the health state time series data but also the driving state information are generated at the time of driving.

Figure 24:
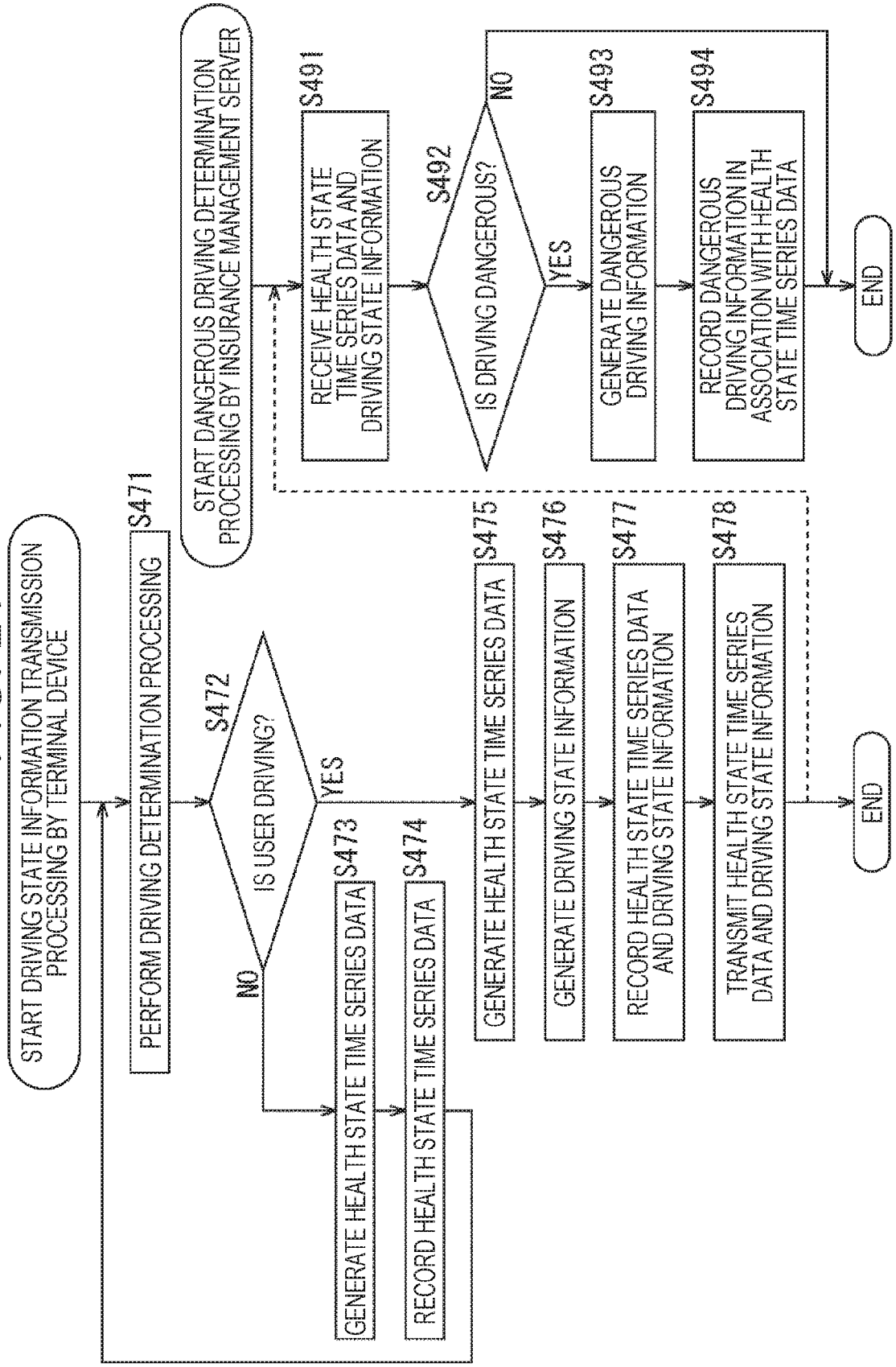
FIG. 24 is a flowchart for describing a driving state information transmission processing and dangerous driving determination processing.

Hereinafter, processing of generating such health state time series data will be described with reference to FIG. 24. That is, hereinafter, driving state information transmission processing by the terminal device 11 and dangerous driving determination processing by the insurance management server 12 will be described with reference to the flowchart in FIG. 24.

When the driving state information transmission processing is started, processing in steps S471 to S474 is performed.

Note that the processing in steps S471 to S474 is similar to the processing in steps S11 to S14 in FIG. 4, and thus description is omitted.

In step S472, in a case where the user is determined to be driving, the time series data generation unit 52 generates the health state time series data in step S475. Note that, in step S475, similar processing to the processing in step S473 is performed and the health state time series data is generated.

Note that, as the health state time series data during driving, biological recognition time series data is in particular important. Therefore, behavior recognition time series data may not be generated.

In step S476, the driving state generation unit 222 generates the driving state information on the basis of the driving information supplied from the driving information acquisition unit 42.

In step S477, the control unit 45 supplies the health state time series data obtained in step S475 and the driving state information obtained in step S476 to the recording unit 47 to record the health state time series data and the driving state information. Note that, in more detail, the processing in steps S475 and S476 is continuously performed while the user is driving the vehicle.

Further, the control unit 45 supplies the health state time series data and the driving state information obtained in steps S475 and S476 to the communication unit 41.

In step S478, the communication unit 41 transmits the health state time series data and the driving state information supplied from the control unit 45 to the insurance management server 12, and the driving state information transmission processing is terminated.

Note that, here, the example in which the health state time series data obtained during driving is transmitted has been described. However, the health state time series data of not only during driving but also within a predetermined time range before driving may be transmitted. In this case, the insurance management server 12 can grasp, for example, relevance between the sleep time and the working hours a day before driving, and the dangerous driving, and the like.

Further, when the health state time series data and the driving state information obtained during driving are transmitted, a communication unit 81 of the insurance management server 12 receives the health state time series data and the driving state information transmitted from the terminal device 11 and supplies the health state time series data and the driving state information to a control unit 83 in step S491.

In step S492, the dangerous driving determination unit 251 determines whether or not the driving of the user is dangerous driving on the basis of the driving state information supplied from the communication unit 81.

For example, whether the driving of the user is dangerous driving is determined from the driving content such as sudden acceleration or sudden braking indicated by the driving state information, the frequency of the driving content with high danger, and the like. Note that the insurance management server 12 may acquire the driving information during driving from the terminal device 11, and the insurance management server 12 may generate the driving state information from the driving information.

In the case where the driving of the user is determined not to be the dangerous driving in step S492, the dangerous driving determination processing is terminated.

On the other hand, in the case where the driving of the user is determined to be the dangerous driving in step S492, the dangerous driving determination unit 251 generates the dangerous driving information on the basis of the driving state information and a determination result in step S492, in step S493.

In step S494, the dangerous driving determination unit 251 supplies the generated dangerous driving information and the health state time series data received in step S491 to a recording unit 82 to record the dangerous driving information and the health state time series data in association with each other, and the dangerous driving determination processing is terminated.

As described above, the terminal device 11 generates the health state time series data and the driving state information while the user is driving, and transmits the health state time series data and the driving state information to the insurance management server 12. Further, the insurance management server 12 determines whether the driving of the user is the dangerous driving from the driving state information. When the dangerous driving is performed, the dangerous driving information and the health state time series data are recorded in association with each other. With the recording, the health state, in particular, the biological state of when the user has performed the dangerous driving can be recorded.

<Description of Getting-in Determination Information Transmission Processing and Insurance Premium Calculation Processing>

Further, in the automobile insurance system, insurance premium amount information is displayed at timing when the user gets into the vehicle, more specifically, immediately before the user gets into the vehicle or immediately after the user gets into the vehicle.

Figure 25:
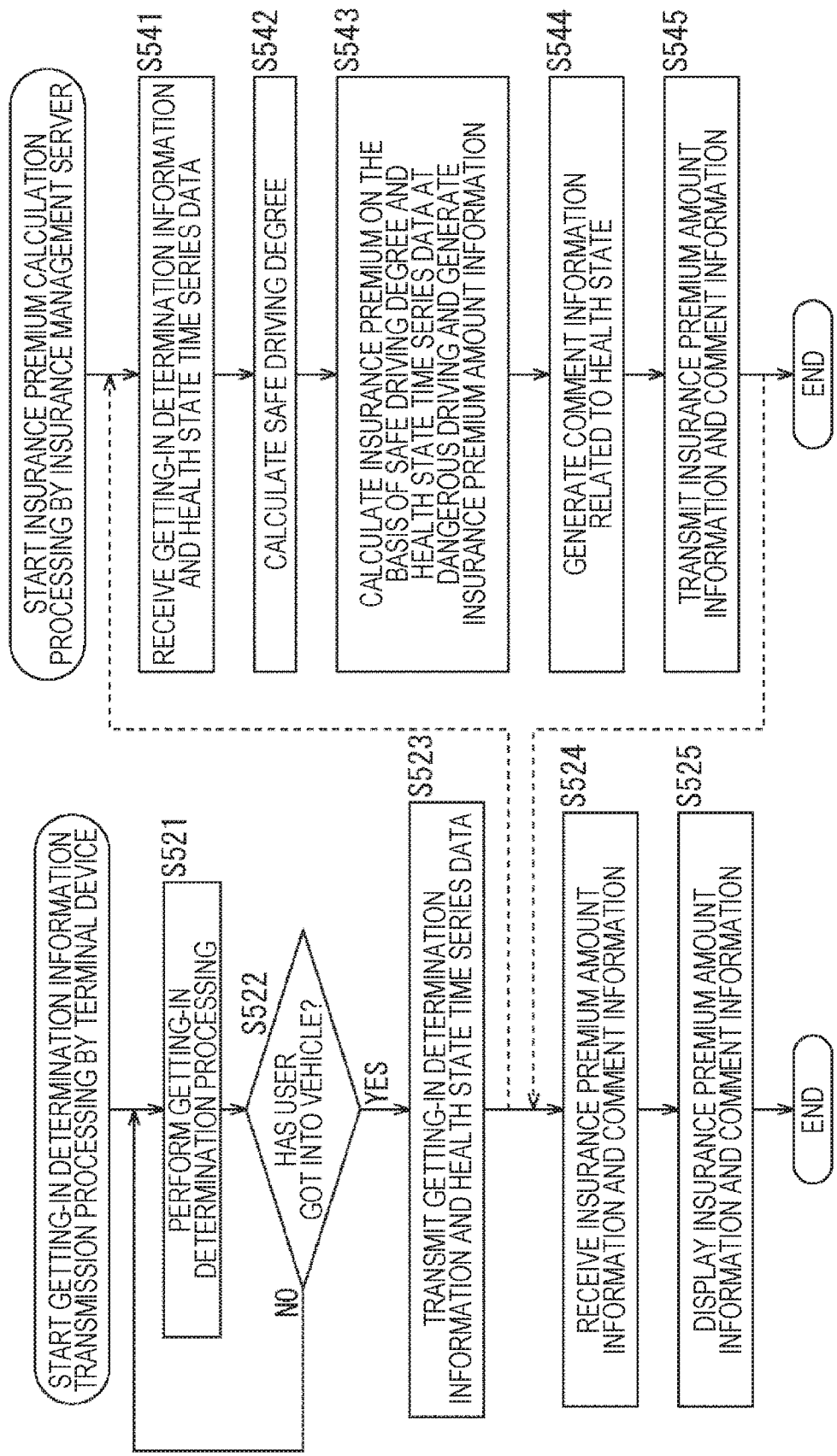
FIG. 25 is a flowchart for describing getting-in determination information transmission processing and insurance premium calculation processing.

Hereinafter, processing performed at this time will be described with reference to the flowchart in FIG. 25. That is, hereinafter, getting-in determination information transmission processing by the terminal device 11 and insurance premium calculation processing by the insurance management server 12 will be described with reference to the flowchart in FIG. 25.

In step S521, the getting-in determination processing unit 221 of the terminal device 11 performs getting-in determination processing on the basis of the getting-in information supplied from the getting-in information acquisition unit 201. For example, when the user has got into a vehicle covered by the automobile insurance or in a case where the user is near the vehicle, the user is determined to have got into the vehicle.

In step S522, the getting-in determination processing unit 221 determines whether or not the user has got into the vehicle on the basis of a determination result of the getting-in determination processing in step S251. In a case where the user is determined not to have got into the vehicle in step S521, the processing returns to step S521 and the above processing is repeatedly performed.

On the other hand, in a case where the user is determined to have got into the vehicle in step S522, the getting-in determination processing unit 221 generates the getting-in determination information indicating that the user has got into the vehicle, and the processing proceeds to step S523. Further, at this time, the control unit 45 reads the health state time series data in a predetermined time range before the user gets into the vehicle, for example, the health state time series data of most recent one day, from the recording unit 47, and supplies the read health state time series data and the getting-in determination information to the communication unit 41.

In step S523, the communication unit 41 transmits the getting-in determination information and the health state time series data to the insurance management server 12.

Then, in step S541, the communication unit 81 of the insurance management server 12 receives the getting-in determination information and the health state time series data transmitted from the terminal device 11 and supplies the getting-in determination information and the health state time series data to the control unit 83.

In step S542, an insurance premium calculation unit 91 calculates a safe driving degree on the basis of the health state time series data supplied from the communication unit 81.

Note that, in step S542, similar processing to the processing in step S22 in FIG. 4 is performed. In step S542, the safe driving degree may be calculated by reference to a getting-in time indicated by the getting-in determination information, past health state time series data recorded in the recording unit 82, information regarding registration such as an age and an accident history of the user recorded in the recording unit 82, and the like.

In step S543, the insurance premium calculation unit 91 calculates the insurance premium on the basis of the safe driving degree calculated in step S542, and the dangerous driving information and the health state time series data at the time of dangerous driving associated with each other, which are recorded in the recording unit 82, and generate insurance premium amount information. At this time, the insurance premium calculation unit 91 calculates the insurance premium by reference to information regarding insurance of the user and the vehicle at the application for the automobile insurance recorded in the recording unit 82, the health state time series data received in step S541, and the like.

For example, the insurance premium calculation unit 91 calculates the degree of similarity between the health state time series data received in step S541 and the health state time series data at the time of dangerous driving, and decrease the discount amount of the insurance premium by a predetermined amount in the case where the degree of similarity is a predetermined value or more, for example. That is, the health state of the user immediately before driving is similar to the health state of when the dangerous driving was performed in the past, the discount amount of the insurance premium is made small. Note that the degree of similarity of the health state time series data is calculated for each information such as a sleep time, working hours, a heart rate, and a blood pressure, for example.

In step S544, the insurance premium calculation unit 91 generates comment information regarding the health state on the basis of the health state time series data received in step S541 and the health state time series data at the time of dangerous driving.

For example, in the case where the degree of similarity between the health state time series data received in step S541 and the health state time series data at the time of dangerous driving is a predetermined value or more, the insurance premium calculation unit 91 generates a message notifying that the user performed dangerous driving in a similar health state in the past, and prompting the user to refrain from driving and to safely drive as the comment information. At this time, for example, in the comment information, specific reasons such as insufficient sleep, long working hours, a high heart rate, a high blood pressure, and the like can be notified.

Further, the insurance premium calculation unit 91 supplies the generated comment information and insurance premium amount information to the communication unit 81.

In step S545, the communication unit 81 transmits the insurance premium amount information and the comment information supplied from the insurance premium calculation unit 91 to the terminal device 11, and the insurance premium calculation processing is terminated.

Then, in step S524, the communication unit 41 of the terminal device 11 receives the insurance premium amount information and the comment information transmitted from the insurance management server 12 and supplies the insurance premium amount information and the comment information to the control unit 45.

In step S525, a display control unit 53 supplies the insurance premium amount information and the comment information supplied from the communication unit 41 to the display unit 48 to display the insurance premium amount information and the comment information, and the getting-in determination information transmission processing is terminated.

As described above, when the user has got into the vehicle, the terminal device 11 transmits the getting-in determination information and the health state time series data to the insurance management server 12. Further, the insurance management server 12 receives the getting-in determination information and the health state time series data, and generates and transmits the insurance premium amount information and the comment information to the terminal device 11.

As a result, it is possible not only to present the insurance premium or the like to the user but also to prompt the user to refrain from driving or to keep in mind the safe driving can by the comment information, and occurrence of an accident can be suppressed.

Tenth Embodiment

<Configuration Example of in-Vehicle Terminal Device>

Further, in the case where the degree of fatigue of a user can be calculated from driver authentication information in an in-vehicle terminal device 111 configuring an automobile insurance system, such a degree of fatigue can be used for calculation of a safe driving degree, that is, an insurance premium.

In the case where an image including the face of the user is obtained as the driver authentication information, fatigue degree estimation information indicating the degree of fatigue of the user can be obtained with high accuracy by estimation, using the driver authentication information.

In contrast, behavior information and biological information are information that can be constantly obtained at a low cost, for example, even if the degree of fatigue is calculated using health state time series data obtained from the information, the degree of fatigue cannot be obtained with as high accuracy as the fatigue degree estimation information.

Therefore, if the fatigue degree estimation information indicating the degree of fatigue of the user obtained from the driver authentication information and the degree of fatigue calculated from health state time series data are compared, and a safe driving degree, that is, an insurance premium is corrected according to a comparison result, a more appropriate insurance premium can be calculated.

Specifically, for example, in the case where the degree of fatigue obtained from the health state time series data is smaller than the degree of fatigue indicated by the fatigue degree estimation information, correction is made such that the safe driving degree is calculated to be slightly small when next time the safe driving degree is calculated.

Figure 26:
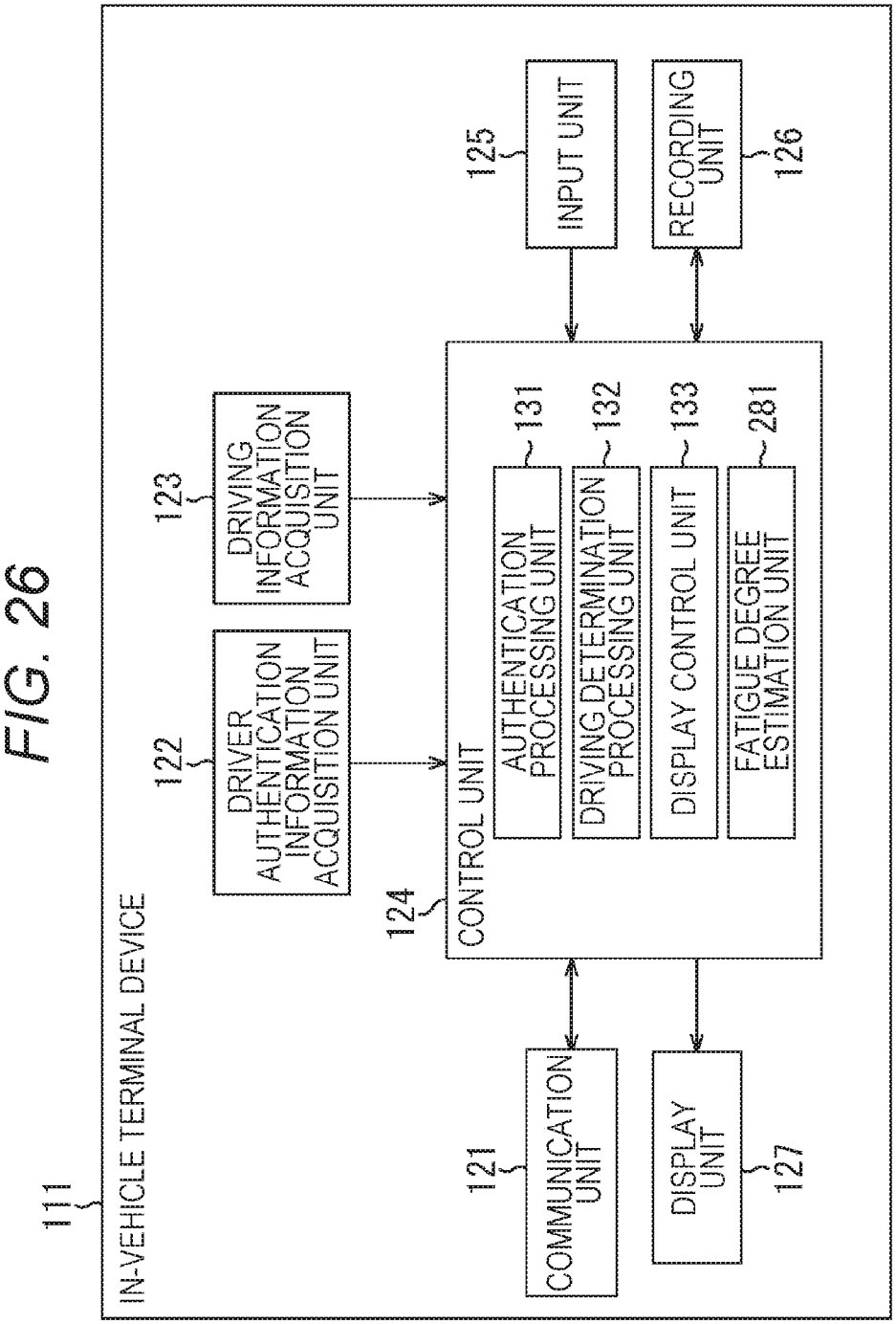
FIG. 26 is a diagram illustrating a configuration example of an in-vehicle terminal device.

In the case of obtaining the fatigue degree estimation information from the driver authentication information in this manner, the in-vehicle terminal device 111 is configured as illustrated in FIG. 26, for example. Note that, in FIG. 26, a portion corresponding to the case in FIG. 5 is denoted by the same reference numeral, and description thereof is omitted.

The in-vehicle terminal device 111 illustrated in FIG. 26 includes a communication unit 121, a driver authentication information acquisition unit 122, a driving information acquisition unit 123, a control unit 124, an input unit 125, a recording unit 126, and a display unit 127. Further, the control unit 124 includes an authentication processing unit 131, a driving determination processing unit 132, a display control unit 133, and a fatigue degree estimation unit 281.

The configuration of the in-vehicle terminal device 111 illustrated in FIG. 26 is a configuration further provided with the fatigue degree estimation unit 281 with respect to the configuration of the in-vehicle terminal device 111 illustrated in FIG. 5.

The fatigue degree estimation unit 281 estimates the degree of fatigue of the user on the basis of the driver authentication information supplied from the driver authentication information acquisition unit 122, and generates fatigue degree estimation information indicating an estimation result.

In the case where the in-vehicle terminal device 111 has the configuration illustrated in FIG. 26, an automobile insurance system is configured by a terminal device 11 illustrated in FIG. 2, the in-vehicle terminal device 111 illustrated in FIG. 26, and an insurance management server 12 illustrated in FIG. 3.

<Description of Driving Determination Information Transmission Processing, Driving Determination Processing, and Insurance Premium Calculation Processing>

Figure 27:
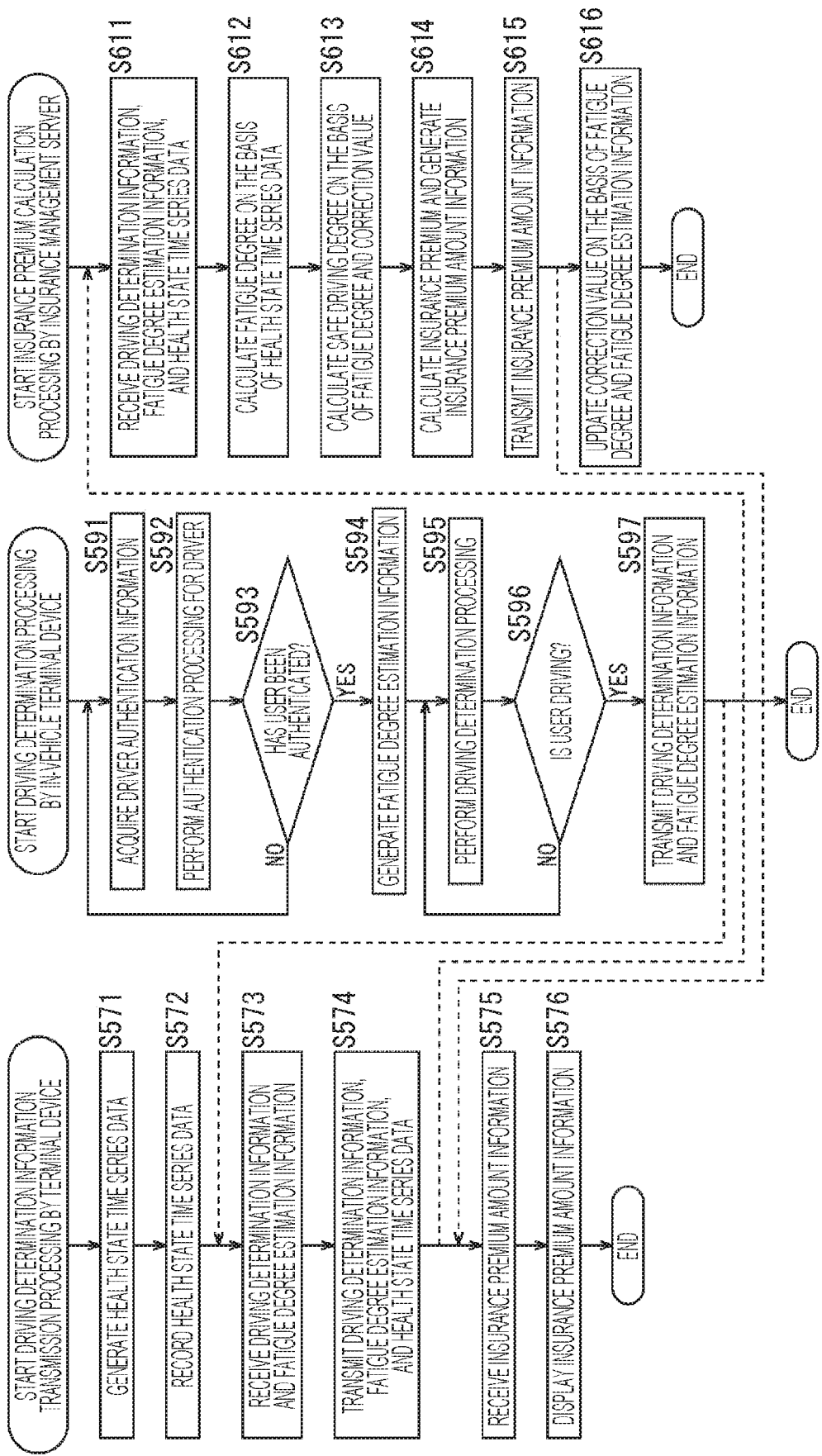
FIG. 27 is a flowchart for describing driving determination information transmission processing, driving determination processing, and insurance premium calculation processing.

Next, a specific operation of such an automobile insurance system will be described. That is, hereinafter, driving determination information transmission processing by the terminal device 11, driving determination processing by the in-vehicle terminal device 111, and insurance premium calculation processing by the insurance management server 12 will be described with reference to the flowchart in FIG. 27.

When the driving determination information transmission processing is started, processing in steps S571 and S572 is performed in the terminal device 11. That is, health state time series data is continuously generated and recorded during non-driving period in which the user is not driving a vehicle covered by automobile insurance.

Note that the processing in steps S571 and S572 is similar to the processing in steps S51 and S52 in FIG. 6, and thus description is omitted.

On the other hand, the in-vehicle terminal device 111 performs authentication for the user to determine whether the user is driving the vehicle that is covered by the automobile insurance.

That is, when the driving determination processing is started, processing in steps S591 to S593 is performed. This processing is similar to the processing in steps S71 to S73 in FIG. 6, and thus description is omitted.

In step S593, in the case where the user is determined to be authenticated, the fatigue degree estimation unit 281 generates the fatigue degree estimation information on the basis of the driver authentication information supplied from the driver authentication information acquisition unit 122 in step S594.

For example, in the case where an image including the face of the user who is the driver as an object is supplied as the driver authentication information, the fatigue degree estimation unit 281 estimates the current degree of fatigue of the user from the expression of the user by image recognition and the like, and generates the fatigue degree estimation information indicating an estimation result.

Note that, for estimating the degree of fatigue based on an image, a dictionary or the like obtained in advance through learning may be used. Further, the degree of fatigue may be estimated from, for example, a pulse rate, a respiratory rate, or the like obtained as the driver authentication information. In such a case, for example, a sensor for measuring the pulse rate, the respiratory rate, or the like is provided on a handle portion or the like of the vehicle as the driver authentication information acquisition unit 122.

Further, here, the case of generating the fatigue degree estimation information in the in-vehicle terminal device 111 is described. However, the fatigue degree estimation information may be generated in the terminal device 11 or the insurance management server 12. In such a case, the driver authentication information obtained in the in-vehicle terminal device 111 may just be transmitted to the terminal device 11 or the insurance management server 12.

When the fatigue degree estimation information is generated, the fatigue degree estimation unit 281 supplies the obtained fatigue degree estimation information to the communication unit 121. Further, after that, processing in steps S595 and step S596 is performed, and whether the user is driving is determined. Note that the processing in steps S595 and S596 is similar to the processing in steps S74 and S75 in FIG. 6, and thus description is omitted.

Further, in step S596, in a case where the user is determined to be driving, the driving determination processing unit 132 generates driving determination information indicating that the user is driving and supplies the driving determination information to the communication unit 121, and the processing proceeds to step S597.

In step S597, the communication unit 121 transmits the driving determination information supplied from the driving determination processing unit 132 and the fatigue degree estimation information supplied from the fatigue degree estimation unit 281 to the terminal device 11, and the driving determination processing is terminated.

Then, in step S573, a communication unit 41 of the terminal device 11 receives the driving determination information and the fatigue degree estimation information transmitted from the in-vehicle terminal device 111 and supplies the driving determination information and the fatigue degree estimation information to a control unit 45. Further, the control unit 45 reads health state time series data within a predetermined time range up to a time when the driving determination information has been received, from the recording unit 47, and supplies the read health state time series data, and the received driving determination information and fatigue degree estimation information to the communication unit 41.

In step S574, the communication unit 41 transmits the driving determination information, the fatigue degree estimation information, and the health state time series data supplied from the control unit 45 to the insurance management server 12.

Then, in step S611, a communication unit 81 of the insurance management server 12 receives the driving determination information, the fatigue degree estimation information, and the health state time series data transmitted from the terminal device 11 and supplies the driving determination information, the fatigue degree estimation information, and the health state time series data to a control unit 83.

In step S612, an insurance premium calculation unit 91 calculates the fatigue degree indicating the current degree of fatigue of the user on the basis of the health state time series data supplied from the communication unit 81. For example, in calculating the fatigue degree, the fatigue degree becomes higher as the sleep time is shorter, and the fatigue degree becomes higher as the working hours are longer, similarly to the safe driving degree, for example. Further, the fatigue degree becomes higher as a difference between a value of the blood pressure, the heart rate, or the like and a value thereof at a normal time is larger, for example.

In step S613, the insurance premium calculation unit 91 calculates the safe driving degree on the basis of the fatigue degree calculated in step S612 and a correction value of the fatigue degree held in advance.

For example, the correction value is a value for correcting the fatigue degree, which is obtained from the fatigue degree calculated from the health state time series data and the fatigue degree estimation information. The insurance premium calculation unit 91 multiplies the held correction value by the fatigue degree obtained in step S612 to calculate the safe driving degree on the basis of the corrected fatigue degree multiplied by the correction value.

Note that, in calculating the safe driving degree, other pieces of information such as the driving determination information received in step S611 and the health state time series data may be used, similarly to the case in step S82 in FIG. 6.

When the safe driving degree is calculated, then, processing in steps S614 and S615 is performed and insurance premium amount information is transmitted to the terminal device 11. This processing is similar to the processing in steps S83 and S84 in FIG. 6, and thus description is omitted.

In step S616, the insurance premium calculation unit 91 updates the held correction value on the basis of the fatigue degree calculated in step S612 and the fatigue degree estimation information received in step S611, and the insurance premium calculation processing is terminated.

In step S616, the insurance premium calculation unit 91 regards the fatigue degree indicated by the fatigue degree estimation information with high estimation accuracy as the true degree of fatigue, and updates the correction value to correct the fatigue degree calculated in step S612 by a difference between the degree of fatigue indicated by the fatigue degree estimation information and the fatigue degree calculated in step S612.

Specifically, for example, in the case where the correction value is a magnification coefficient, an initial value of the magnification coefficient is 1.0. Then, for example, when the degree of fatigue indicated by the fatigue degree estimation information is a value 1.5 times the fatigue degree calculated in step S612, the correction value is updated from 1.0 to 1.5. The correction value corrected in this manner is used in the next processing in step S613.

Note that, here, the case of correcting the fatigue degree with the correction value has been described as an example. However, a correction value to directly correct the safe driving degree may be obtained, or a correction value of a discount amount of an insurance premium may be obtained to correct the discount amount. That is, finally, the insurance premium is made corrected on the basis of the fatigue degree estimation information.

Further, when the insurance premium amount information is transmitted from the insurance management server 12, the terminal device 11 performs processing in steps S575 and S576 and terminates the driving determination information transmission processing. This processing is similar to the processing in steps S55 and S56 in FIG. 6, and thus description is omitted.

As described above, the in-vehicle terminal device 111 generates the fatigue degree estimation information together with the driving determination information. Further, the insurance management server 12 calculates the insurance premium using the fatigue degree estimation information. In this way, by calculating the insurance premium using the fatigue degree estimation information with higher estimation accuracy, a more appropriate insurance premium can be calculated with higher accuracy.

Eleventh Embodiment

<Configuration Example of in-Vehicle Terminal Device>

Further, in a case where an automobile insurance system is configured by a terminal device 11, an in-vehicle terminal device 111 and an insurance management server 12, the in-vehicle terminal device 111 can acquire health state time series data from the terminal device 11 and transmit the health state time series data to the insurance management server 12, or the in-vehicle terminal device 111 can display the insurance premium amount information. Further, at that time, whether or not to provide biological information to the insurance management server 12 in order to calculate an insurance premium can also be made selected.

Figure 28:
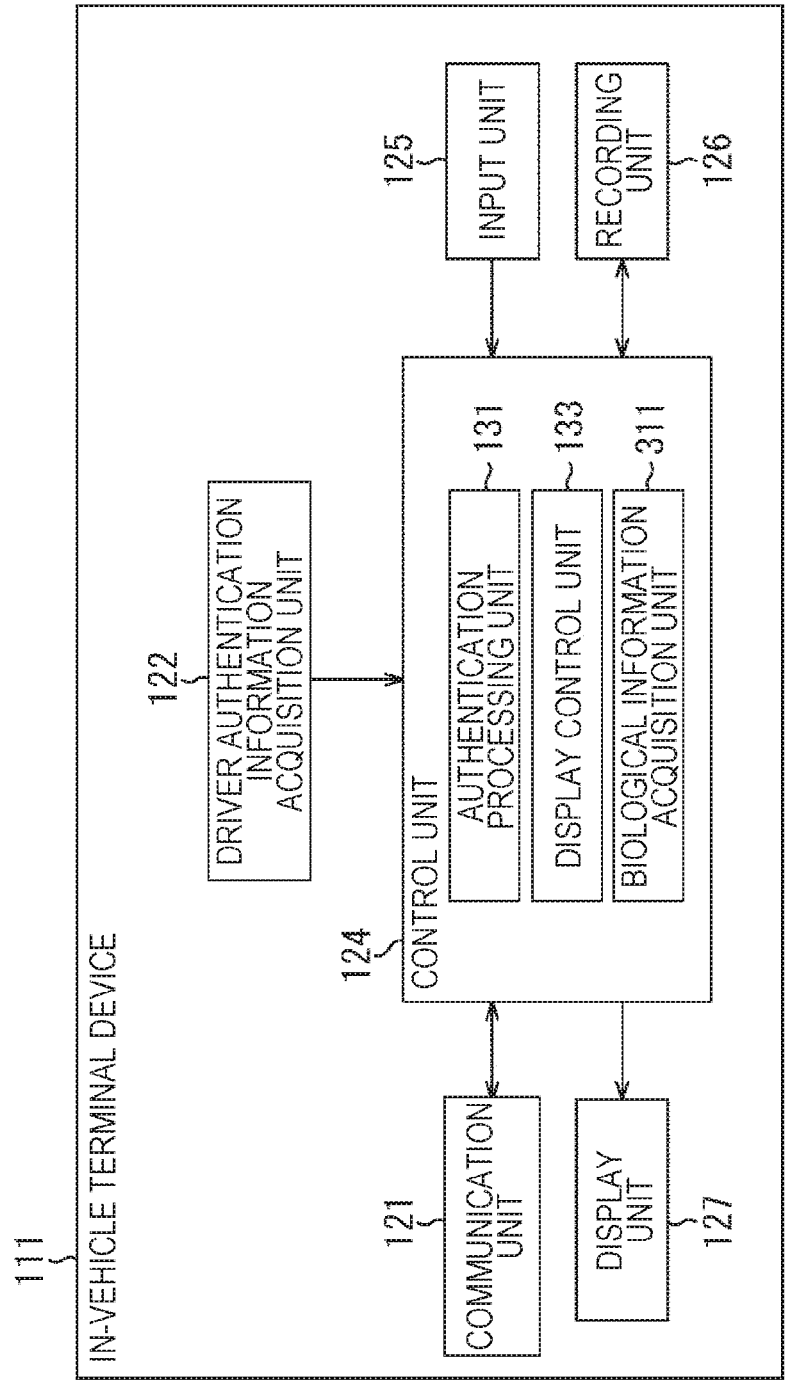
FIG. 28 is a diagram illustrating a configuration example of an in-vehicle terminal device.

In such a case, the in-vehicle terminal device 111 is configured as illustrated in FIG. 28, for example. Note that, in FIG. 28, a portion corresponding to the case in FIG. 5 is denoted by the same reference numeral, and description thereof is omitted.

The in-vehicle terminal device 111 illustrated in FIG. 28 includes a communication unit 121, a driver authentication information acquisition unit 122, a control unit 124, an input unit 125, a recording unit 126, and a display unit 127. Further, the control unit 124 includes an authentication processing unit 131, a display control unit 133, and a biological information acquisition unit 311.

The configuration of the in-vehicle terminal device 111 illustrated in FIG. 28 is different from the configuration of the in-vehicle terminal device 111 illustrated in FIG. 5 in not including the driving information acquisition unit 123 and the driving determination processing unit 132 and in newly including the biological information acquisition unit 311, and is the same as the in-vehicle terminal device 111 in FIG. 5 in other configurations.

The biological information acquisition unit 311 acquires biological information from the terminal device 11 via the communication unit 121 and acquires a part or the whole of driver authentication information output from the driver authentication information acquisition unit 122 as the biological information.

Further, in the case where the in-vehicle terminal device 111 has the configuration illustrated in FIG. 28, the terminal device 11 and the insurance management server 12 configuring the automobile insurance system have configurations illustrated in FIGS. 2 and 3, respectively.

In this automobile insurance system, when a user is authenticated in the in-vehicle terminal device 111, the user is then supposed to start driving a vehicle. In a case where the vehicle is supposed to start, the in-vehicle terminal device 111 acquires the health state time series data from the terminal device 11 and transmits the health state time series data to the insurance management server 12.

Note that, in the present embodiment, the health state time series data basically includes only behavior recognition time series data, and whether to transmit the biological information for obtaining biological recognition time series data as the health state time series data to the insurance management server 12 is made selectable by the user. Further, in the case of providing the biological information to the insurance management server 12, the user can receive a discount of an insurance premium. Here, a case where the biological information is transmitted to the insurance management server 12 will be described. However, the biological recognition time series data may be transmitted.

Figure 29:
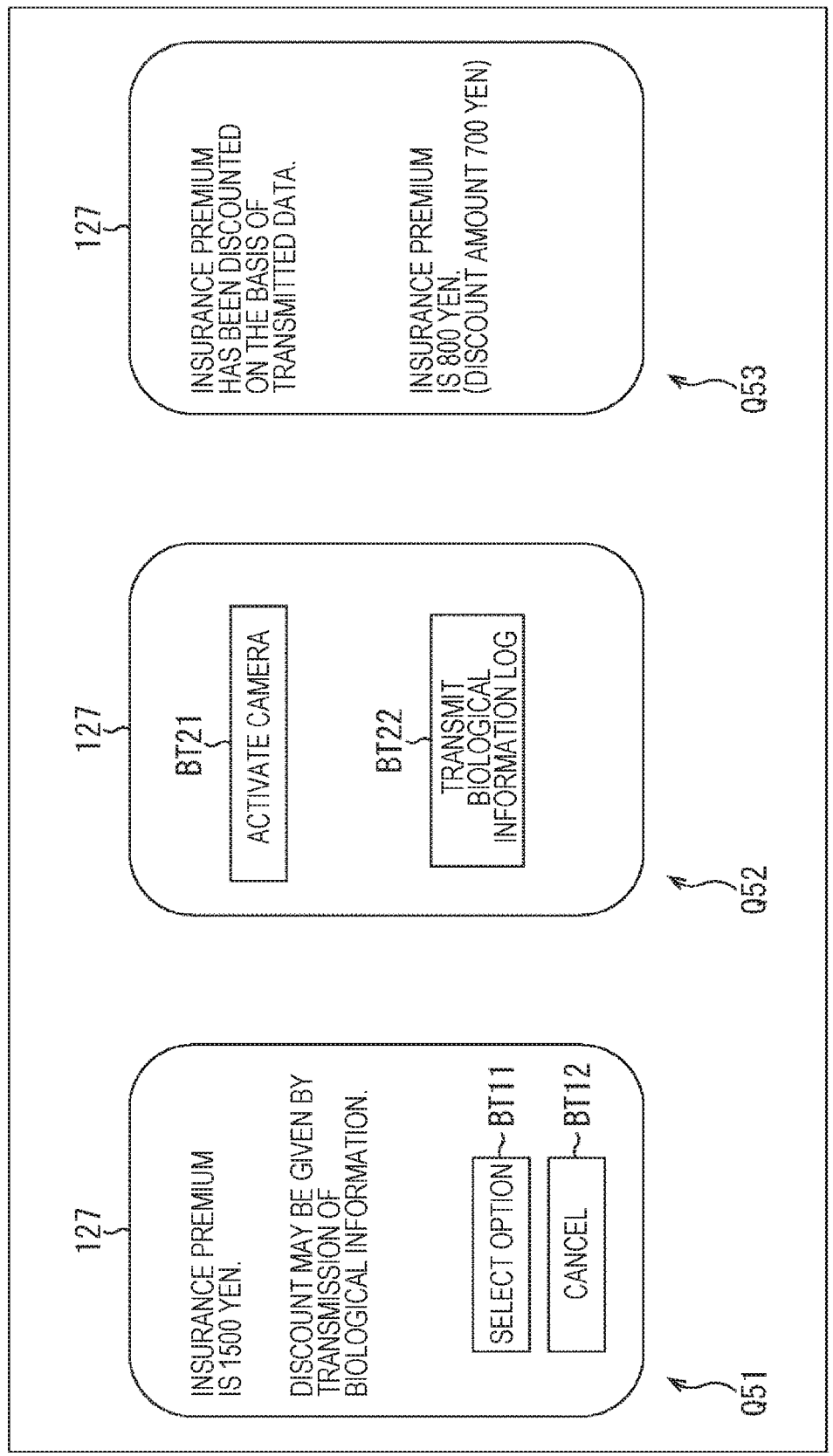
FIG. 29 is a diagram illustrating an example of insurance premium amount information.

In this case, insurance premium amount information as illustrated in FIG. 29 is transmitted from the insurance management server 12 to the in-vehicle terminal device 111, for example.

That is, the insurance premium amount information illustrated by the arrow Q51 in FIG. 29 is displayed on the in-vehicle terminal device 111. The insurance premium amount information includes character information "The insurance premium is 1500 yen.", which indicates the insurance premium, and character information "A discount may be given by transmission of the biological information.", asking whether or not to transmit the biological information, are displayed.

Further, an option selection button BT11 operated when selecting transmission of the biological information, and a cancel button BT12 operated when selecting non-transmission of the biological information are displayed as the insurance premium amount information.

Here, in the case where the cancel button BT12 is operated by the user, transmission of the biological information is not performed and display of the insurance premium amount information is terminated, for example.

In contrast, in the case where the option selection button BT11 is selected, display of the display unit 127 transitions to a selection screen illustrated by the arrow Q52, for example.

A selection button BT21 for selecting a camera as the driver authentication information acquisition unit 122 of the in-vehicle terminal device 111 as an acquisition source of the biological information, and a selection button BT22 for selecting the terminal device 11 as the acquisition source of the biological information are provided on the selection screen.

For example, when the selection button BT21 is operated by the user, the biological information acquisition unit 311 starts the camera as the driver authentication information acquisition unit 122, acquires an image having the face of the user as an object from the camera, as the biological information, and transmits the biological information to the insurance management server 12 by the communication unit 121. Such an image is also used as driver authentication information in the in-vehicle terminal device 111.

Meanwhile, when the selection button BT22 is operated by the user, the biological information acquisition unit 311 acquires the biological information from the terminal device 11 via the communication unit 121, and transmits the acquired biological information to the insurance management server 12 by the communication unit 121.

When the biological information is transmitted in this way, the insurance management server 12 recalculates the insurance premium, using the biological recognition time series data obtained from the biological information as the health state time series data, and the insurance premium amount information after recalculation is transmitted from the insurance management server 12.

Then, the insurance premium amount information illustrated by the arrow Q53 is displayed on the display unit 127 of the in-vehicle terminal device 111, for example. In the insurance premium amount information, character information "the insurance premium has been discounted on the basis of the transmitted data.", which indicates a discount has been made, and character information "The insurance premium is 800 (the discount amount is 700 yen).", which indicates the discount amount and the insurance premium after discount, are displayed.

In this way, by making not only transmission/non-transmission of the biological information selectable but also the acquisition source of the biological information selectable, the user can perform suitable selection for himself/herself in using the automobile insurance service. Further, even in the automobile insurance system, provision of the biological information can be facilitated, and a more appropriate insurance premium can be calculated with higher accuracy using the biological information.

<Description of Driving Determination Processing>

Next, a more specific operation of the automobile insurance system will be described.

First, driving determination processing by the in-vehicle terminal device 111 will be described with reference to the flowchart in FIG. 30.

Note that processing in steps S641 to S643 is similar to the processing in steps S71 to S73 in FIG. 6, and thus description is omitted. Further, in the present embodiment, it is determined that the user is driving a vehicle when the user is authenticated. However, processing similar to the processing in steps S74 and S75 in FIG. 6 may be performed after authentication is determined in step S643.

In the case where the user is determined to have been authenticated in step S643, the control unit 124 generates a transmission request for requesting transmission of the health state time series data and supplies the transmission request to the communication unit 121, and the processing proceeds to step S644.

In step S644, the communication unit 121 transmits the transmission request of the health state time series data supplied from the control unit 124 to the terminal device 11. Then, the health state time series data is transmitted from the terminal device 11 in response to the transmission request. Here, the health state time series data includes only the behavior recognition time series data.

Then in step S645, the communication unit 121 receives the health state time series data transmitted from the terminal device 11 and supplies the health state time series data to the control unit 124.

Further, the control unit 124 supplies the health state time series data supplied from the communication unit 121 to the communication unit 121. At this time, the control unit 124 may also supply driving determination information indicating that the user has started driving the vehicle to the communication unit 121.

In step S646, the communication unit 121 transmits the health state time series data supplied from the control unit 124 to the insurance management server 12. Then, the insurance premium amount information is transmitted from the insurance management server 12.

In step S647, the communication unit 121 receives the insurance premium amount information transmitted from the insurance management server 12 and supplies the insurance premium amount information to the control unit 124.

In step S648, the display control unit 133 supplies the insurance premium amount information supplied from the communication unit 121 to the display unit 127 to display the insurance premium amount information.

As a result, the insurance premium amount information illustrated by the arrow Q51 in FIG. 29 is displayed on the display unit 127, for example. Then, the user operates the input unit 125 to operate the option selection button BT11 or the cancel button BT12 or to operate the selection button BT21 or the selection button BT22 on the selection screen.

In step S649, the control unit 124 determines whether or not a discount option has been selected by the user on the basis of a signal from the input unit 125.

Here, in the case where the option selection button BT11 is operated by the user, it is determined that the discount option has been selected. On the other hand, in the case where the cancel button BT12 is operated by the user, it is determined that the discount option has not been selected.

In the case where it is determined that the discount option has not been selected in step S649, processing from step S650 to S656 is skipped and the driving determination processing is terminated.

On the other hand, in the case where it is determined that the discount option has been selected in step S649, the control unit 124 determines whether or not to acquire the biological information from the terminal device 11 on the basis of the signal from the input unit 125 in step S650.

For example, in the case where the selection button BT21 is operated on the selection screen illustrated by the arrow Q52 in FIG. 29, it is determined that the biological information is not acquired from the terminal device 11, that is, the in-vehicle terminal device 111 acquires the biological information. On the other hand, in the case where the selection button BT22 is operated on the selection screen, it is determined to acquire the biological information from the terminal device 11.

In step S650, in the case where it is determined to acquire the biological information from the terminal device 11, the biological information acquisition unit 311 generates the transmission request for requesting transmission of the biological information and supplies the transmission request to the communication unit 121, and the processing proceeds to step S651.

In step S651, the communication unit 121 transmits the transmission request of the biological information supplied from the biological information acquisition unit 311 to the terminal device 11. Then, the biological information is transmitted from the terminal device 11 in response to the transmission request.

In step S652, the communication unit 121 receives the biological information transmitted from the terminal device 11, and supplies the received biological information to the biological information acquisition unit 311 of the control unit 124. As a result, the biological information acquisition unit 311 acquires the biological information from the terminal device 11.

Note that the biological recognition time series data obtained from the biological information may be received, or the biological recognition time series data may be generated from the biological information received by the biological information acquisition unit 311, instead of the biological information.

The control unit 124 supplies the biological information supplied from the communication unit 121 to the communication unit 121 as to be transmitted to the insurance management server 12, and the processing proceeds to step S654.

On the other hand, in the case where it is determined that the biological information is not acquired from the terminal device 11, that is, the in-vehicle terminal device 111 acquires the biological information, in step S650, the processing proceeds to step S653.

In step S653, the biological information acquisition unit 311 acquires the biological information by acquiring an image from the camera as the driver authentication information acquisition unit 122. The image as the biological information acquired in this way is used for generating the biological recognition time series data indicating a biological state such as the degree of fatigue of the user, for example. Note that the biological recognition time series data may be generated from the image acquired from the camera.

Further, the control unit 124 supplies the acquired biological information to the communication unit 121, and the processing proceeds to step S654.

When the processing in step S652 or S653 is performed, the communication unit 121 transmits the biological information supplied from the control unit 124 to the insurance management server 12 in step S654. Note that both the biological information acquired by the in-vehicle terminal device 111 and the biological information acquired from the terminal device 11 may be transmitted to the insurance management server 12.

Further, when the biological information is transmitted, the insurance management server 12 recalculates the insurance premium using the transmitted biological information, and recalculated insurance premium amount information is transmitted from the insurance management server 12 to the in-vehicle terminal device 111.

In step S655, the communication unit 121 receives the recalculated insurance premium amount information transmitted from the insurance management server 12 and supplies the recalculated insurance premium amount information to the control unit 124.

In step S656, the display control unit 133 supplies the recalculated insurance premium amount information supplied from the communication unit 121 to the display unit 127 to display the recalculated insurance premium amount information, and the driving determination information is terminated. As a result, the insurance premium amount information illustrated by the arrow Q53 in FIG. 29 is displayed on the display unit 127, for example.

Note that the communication unit 121 may transmit the recalculated insurance premium amount information received in step S655 to the terminal device 11.

As described above, the in-vehicle terminal device 111 acquires the biological information according in response to the selection operation by the user and transmits the biological information to the insurance management server 12. By doing so, a more appropriate insurance premium can be calculated with higher accuracy in the insurance management server 12.

<Description of Health State Time Series Data Transmission Processing>

Figure 31:
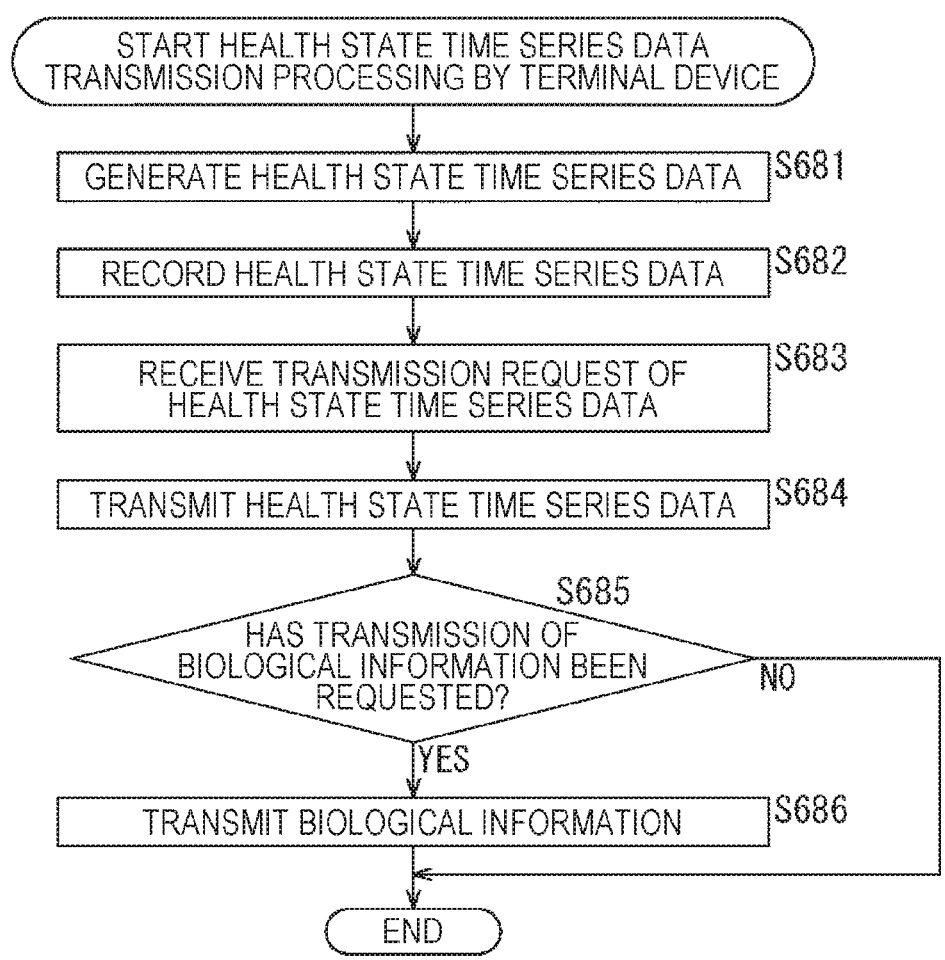
FIG. 31 is a flowchart for describing health state time series data transmission processing.

Next, health state time series data transmission processing by the terminal device 11 will be described with reference to the flowchart in FIG. 31.

Note that processing in steps S681 and S682 is similar to the processing in steps S51 and S52 in FIG. 6, and thus description is omitted. Further, in step S682, obtained biological information at each time is also recorded in a recording unit 47.

Figure 30:
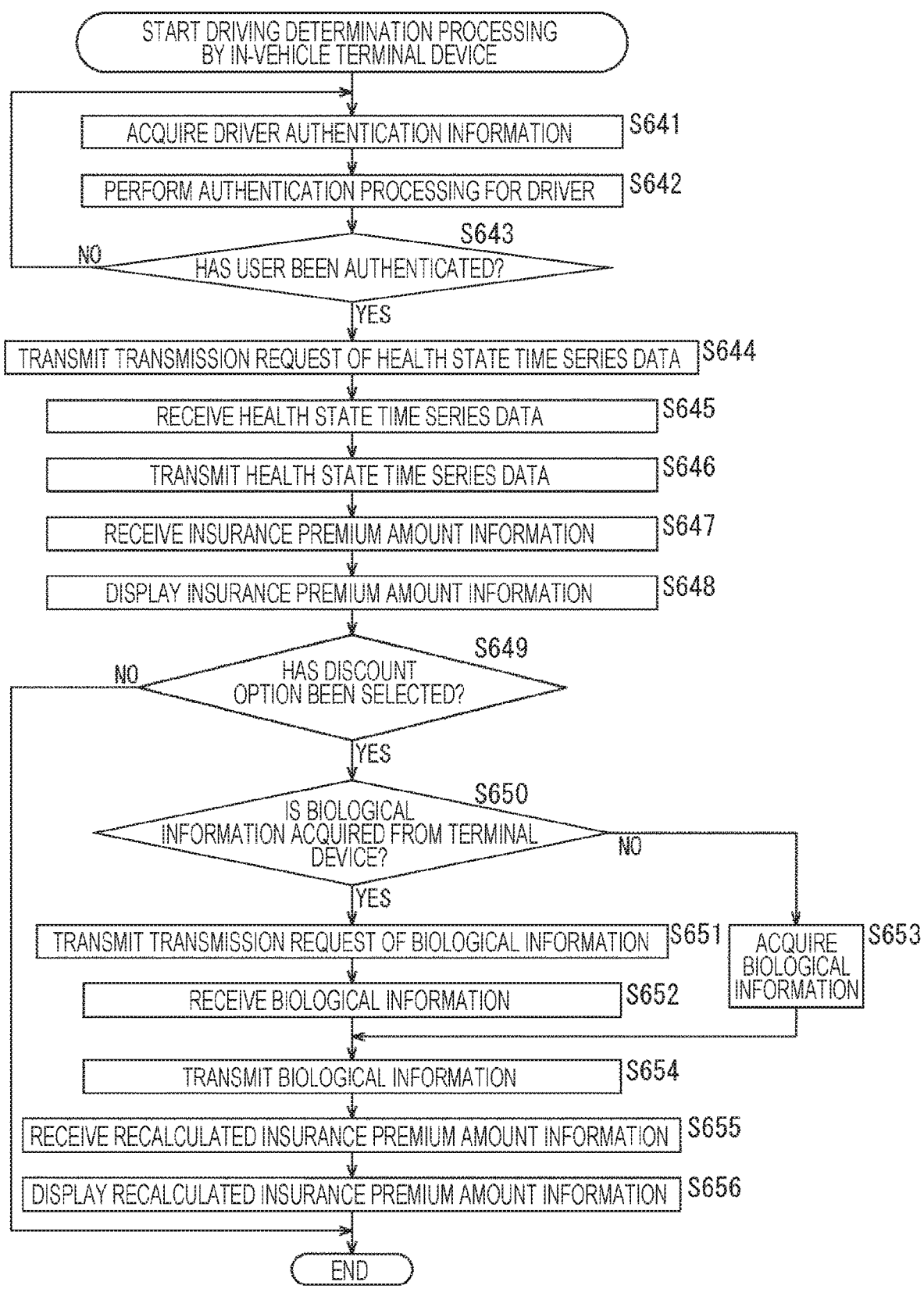
FIG. 30 is a flowchart for describing driving determination processing.

Further, when processing in step S644 in FIG. 30 is performed, a communication unit 41 receives the transmission request of the health state time series data transmitted from the in-vehicle terminal device 111 and supplies the transmission request to a control unit 45 in step S683.

The control unit 45 reads the behavior recognition time series data from the recording unit 47 as the health state time series data and supplies the behavior recognition time series data to the communication unit 41 in response to the transmission request supplied from the communication unit 41. At this time, the behavior recognition time series data in a predetermined time range such as the behavior recognition time series data of most recent one day is read, for example.

In step S684, the communication unit 41 transmits the health state time series data supplied from the control unit 45 to the in-vehicle terminal device 111. As a result, the processing in step S645 in FIG. 30 is performed.

In step S685, the control unit 45 determines whether or not transmission of the biological information has been requested. For example, in a case where processing in step S651 in FIG. 30 is performed, and as a result, the communication unit 41 receives the transmission request of the biological information, it is determined that transmission of the biological information has been requested. In this case, the communication unit 41 supplies the received transmission request to the control unit 45.

In step S685, in the case where it is determined that transmission of the biological information has not been requested, processing in step S686 is skipped, and the health state time series data transmission processing is terminated.

On the other hand, in the case where it is determined that transmission of the biological information has been requested in step S685, the control unit 45 reads the biological information within a predetermined time range up to a current time from the recording unit 47 and supplies the biological information to the communication unit 41 in response to the transmission request supplied from the communication unit 41, and the processing proceeds to step S686.

In step S686, the communication unit 41 transmits the biological information supplied from the control unit 45 to the in-vehicle terminal device 111, and the health state time series data transmission processing ends is terminated. As a result, the in-vehicle terminal device 111 performs processing in step S652 in FIG. 30.

As described above, the terminal device 11 transmits the biological information in response to the request from the in-vehicle terminal device 111. Note that the biological recognition time series data may be transmitted instead of the biological information.

<Description of Insurance Premium Calculation Processing>

Figure 32:
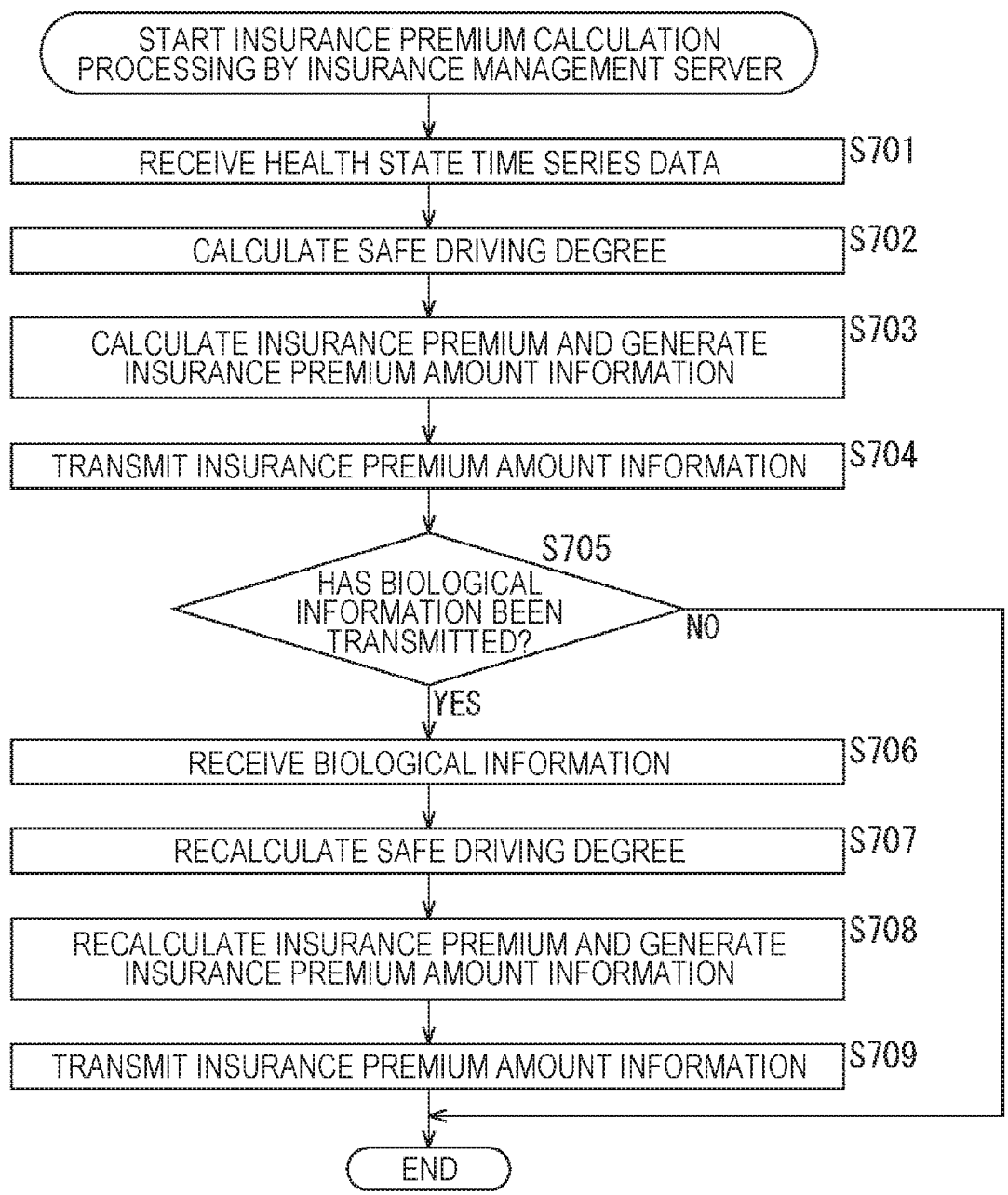
FIG. 32 is a flowchart for describing insurance premium calculation processing.

Next, insurance premium calculation processing by the insurance management server 12 will be described with reference to the flowchart in FIG. 32.

In step S701, a communication unit 81 receives the health state time series data transmitted from the in-vehicle terminal device 111 and supplies the health state time series data to a control unit 83. Here, the received health state time series data is transmitted in step S646 in FIG. 30, and here is health state time series data including only the behavior recognition time series data.

When the health state time series data is received, processing in steps S702 to S704 is performed and the insurance premium amount information is transmitted. This processing is similar to the processing in steps S82 to S84 in FIG. 6, and thus description is omitted. Note that the insurance premium amount information is transmitted to the in-vehicle terminal device 111 in step S704.

In step S705, the control unit 83 determines whether or not the biological information has been transmitted from the in-vehicle terminal device 111.

In step S705, in the case where the biological information is determined not to have been transmitted, the processing in steps S706 to S709 is skipped and the insurance premium calculation processing is terminated.

On the other hand, in the case where the biological information is determined to have been transmitted in step S705, the communication unit 81 receives the biological information transmitted from the in-vehicle terminal device 111 and supplies the biological information to the control unit 83 in step S706. In this case, the biological information transmitted in the processing in step S654 in FIG. 30 is received. Further, the received biological information is appropriately supplied to and recorded in a recording unit 82.

In step S707, the insurance premium calculation unit 91 recalculates the safe driving degree on the basis of the biological information supplied from the communication unit 81, the health state time series data received in step S701, information regarding registration such as an age and an accident history of the user recorded in the recording unit 82, and the like.

At this time, the insurance premium calculation unit 91 appropriately generates the biological recognition time series data on the basis of the biological information, and calculates the safe driving degree using the obtained biological recognition time series data. Note that the calculation of the safe driving degree here is similar to the case in step S82 in FIG. 6, for example.

In step S708, the insurance premium calculation unit 91 recalculates the insurance premium of the user on the basis of the safe driving degree calculated in step S707 and information regarding insurance and a vehicle of the user at the time of application for automobile insurance recorded in the recording unit 82, and generates the insurance premium amount information. At this time, for example, a discount of the insurance premiums based on provision of the biological information and the like are also performed as necessary. Further, the calculation of the insurance premium here is similar to the case in step S83 in FIG. 6, for example.

The insurance premium calculation unit 91 supplies the insurance premium amount information obtained by the recalculation to the communication unit 81.

In step S709, the communication unit 81 transmits the insurance premium amount information supplied from the insurance premium calculation unit 91 to the in-vehicle terminal device 111, and the insurance premium calculation processing is terminated. As a result, the in-vehicle terminal device 111 performs processing in step S655 in FIG. 30.

As described above, in a case where the biological information is transmitted from the in-vehicle terminal device 111, the insurance management server 12 receives the biological information and recalculates the insurance premium. As a result, a more appropriate insurance premium can be calculated with higher accuracy.

Twelfth Embodiment

<Transportation System>

Note that, in the above embodiments, the case where the service regarding the vehicle is the automobile insurance has been described as an example. However, the present technology is applicable not only to the automobile insurance system but also to general services regarding getting in to vehicles.

For example, the present technology can be applied to a transportation service, and hereinafter a case in which the present technology is applied to the transportation service will be described.

For example, the present technology can be applied to a case of providing a taxi service, that is, a transportation service, to a user with self-driving vehicles.

Figure 33:
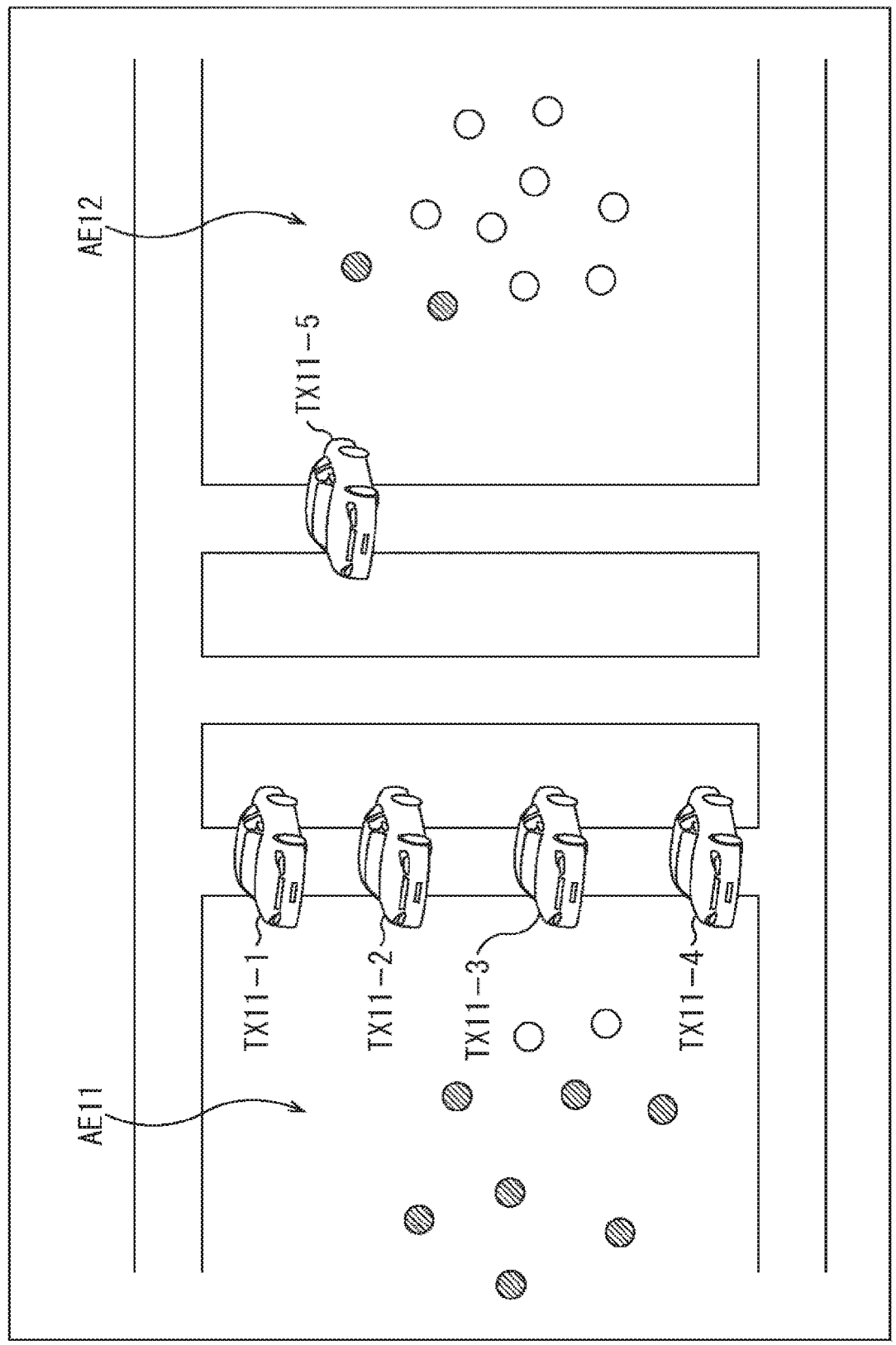
FIG. 33 is a diagram for describing a transportation service.

Specifically, it is assumed that there is a plurality of vehicles TX11-1 to TX11-5 that are caused to go round or stop by a taxi company to provide a service, as illustrated in FIG. 33, for example. Note that, hereinafter, the vehicles TX11-1 to TX11-5 are also simply referred to as vehicles TX11 unless the vehicles TX11-1 to TX11-5 are particularly necessarily distinguished from one another.

These vehicles TX11 are vehicles having a self-driving function to carry the user who is a service user to transport the user to a desired destination. Hereinafter, description will be given on the assumption that the vehicles TX11 perform self-driving. However, it is not necessarily the case, and the vehicles TX11 may be driven by drivers.

Further, in FIG. 33, each circle represents a user. Each user can receive, for example, preferential dispatch, a discount of fare, and the like by providing position information indicating the current position of the user to the taxi company, using a terminal device possessed by the user himself/herself.

In this example, hatched circles, among the circles representing the users, represent the users who are providing the position information. In contrast, unhatched circles represent the users who are not providing the position information.

A management server managed by the taxi company determines an area where the vehicles TX11 go round or stop on the basis of the position information provided from the users, and instructs the vehicles TX11 to go round or stop according to the determination. As a result, the dispatch efficiency of the vehicles TX11 can be improved.

In the dispatch instruction, for example, emphasis is placed on the vicinity of an area where a large number of users who are providing the position information are gathered.

In this example, substantially the same numbers of users are gathered in an area AE11 and an area AE12, but a larger number of users who are providing the position information are gathered in the area AE11 than the area AE12. Therefore, a larger number of vehicles TX11 is arranged in the vicinity of the area AE11 than in the vicinity of the area AE12.

The management server cannot grasp the current position of the user who does not provide the position information, but can grasp the current position of the user who has provided the position information. Therefore, by arranging a larger number of vehicles TX11 in the vicinity of the area where many users who are grasped with the current positions are gathered, the service can be more efficiently provided.

<Configuration Example of Terminal Device>

Figure 34:
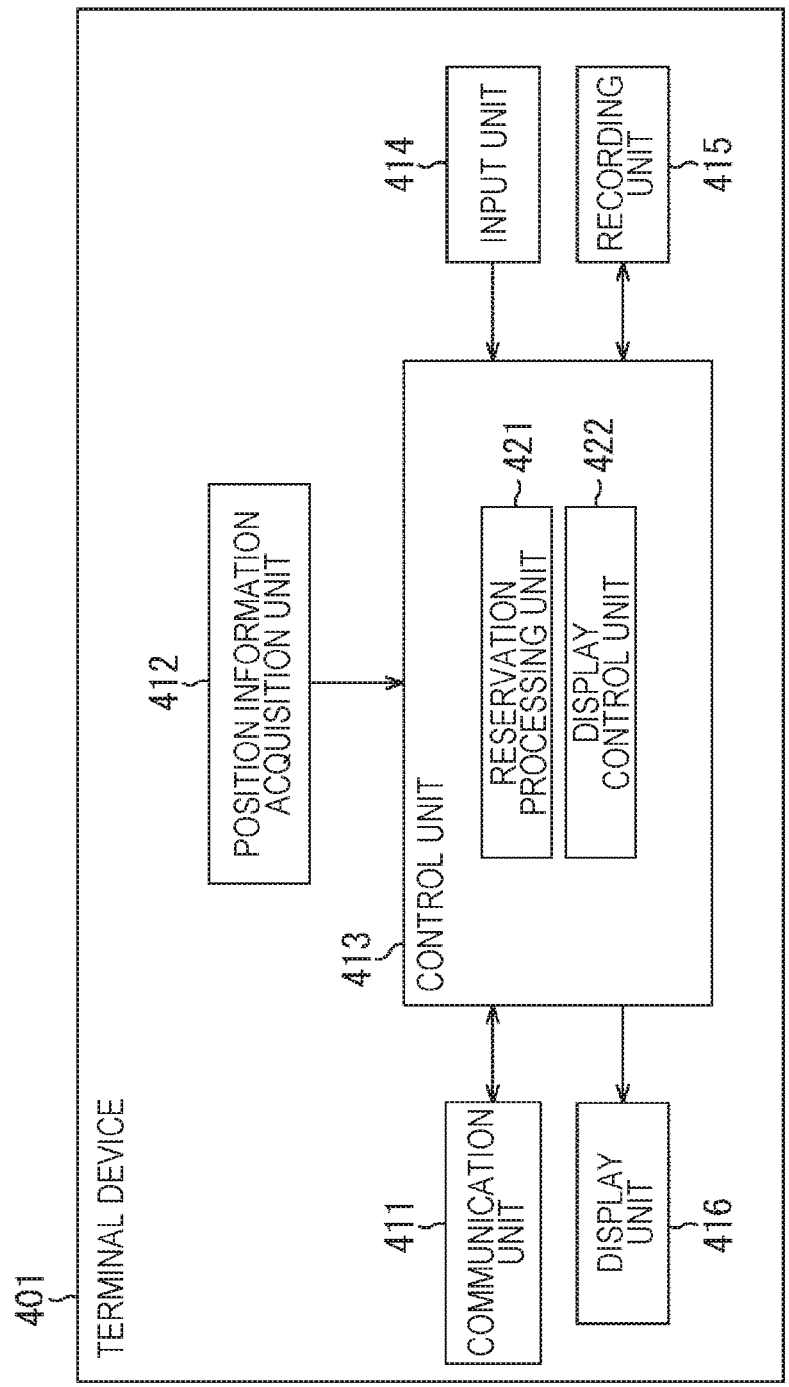
FIG. 34 is a diagram illustrating a configuration example of a terminal device.
Figure 35:
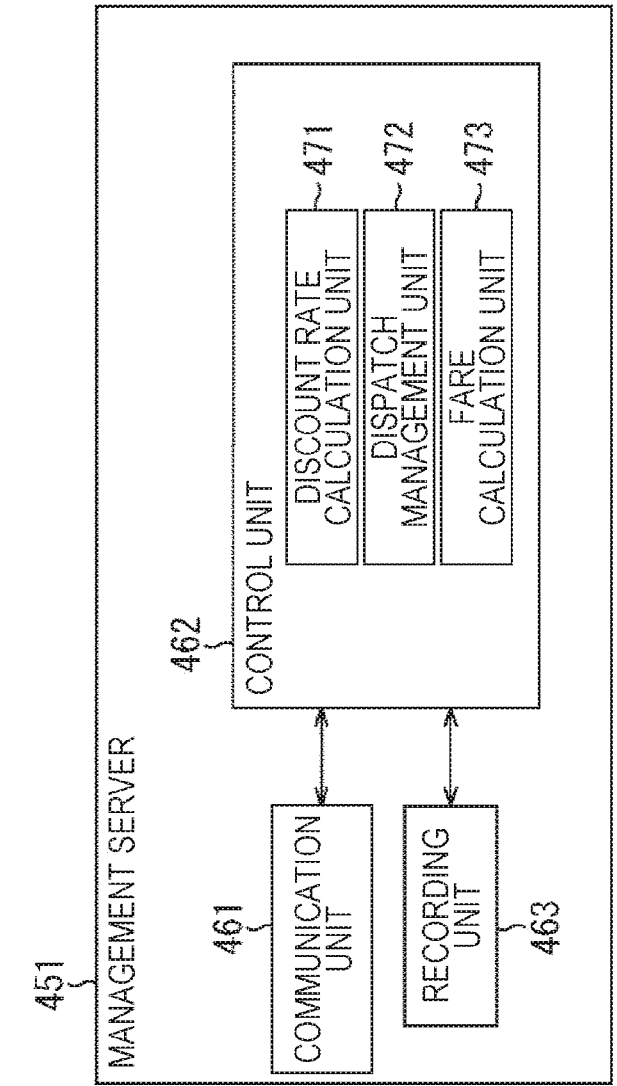
FIG. 35 is a diagram illustrating a configuration example of a management server.
Figure 36:
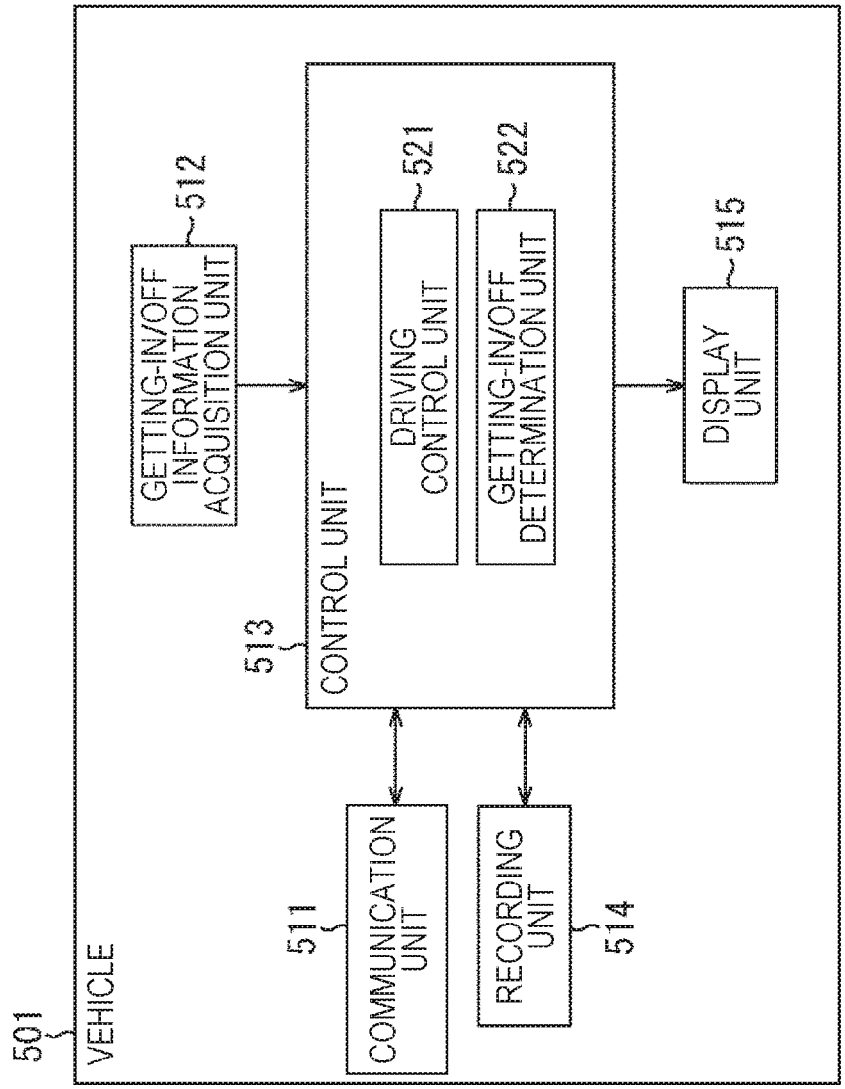
FIG. 36 is a diagram illustrating a configuration example of a vehicle.

The transportation service system realizing provision of the transportation service as described above is configured by, for example, a terminal device, a management server, and a vehicle illustrated in FIGS. 34 to 36.

FIG. 34 is a diagram illustrating a configuration example of a terminal device possessed by the user who will receive the transportation service.

A terminal device 401 illustrated in FIG. 34 includes, for example, a portable terminal device such as a smartphone, a wearable device that can be worn on an arm or the like of the user, or the like.

The terminal device 401 includes a communication unit 411, a position information acquisition unit 412, a control unit 413, an input unit 414, a recording unit 415, and a display unit 416.

The communication unit 411 transmits/receives information to/from an external device such as the management server managed by the taxi company. That is, the communication unit 411 receives information transmitted from the outside, supplies the information to the control unit 413, and transmits information supplied from the control unit 413 to an external device.

The position information acquisition unit 412 includes, for example, a position measuring unit that measures its own position such as a satellite positioning system typified by a GPS, and the like, and measures the position of the terminal device 401 and outputs the measurement result to the control unit 413 as the position information.

The control unit 413 controls operation of the entire terminal device 401. The control unit 413 includes a reservation processing unit 421 and a display control unit 422. The reservation control unit 421 performs processing regarding reservation for dispatch of a vehicle. Further, the display control unit 422 controls display of various kinds of information and images on the display unit 416.

The input unit 414 includes, for example, a touch panel, a button, a switch, and the like provided superimposed on the display unit 416, and supplies a signal corresponding to an operation of the user to the control unit 413. The recording unit 415 includes a nonvolatile recording medium, and records various kinds of information supplied from the control unit 413 and supplies the recorded information to the control unit 413 as necessary.

The display unit 416 includes, for example, a liquid crystal display panel and the like, and displays various kinds of information and images under the control of the display control unit 422.

<Configuration Example of Management Server>

Further, FIG. 35 is a diagram illustrating a configuration example of the management server managed by the taxi company that provides the transportation service.

A management server 451 illustrated in FIG. 35 includes a communication unit 461, a control unit 462, and a recording unit 463.

The communication unit 461 transmits information supplied from the control unit 462 to an external device such as the terminal device 401 or receives information transmitted from an external device and supplies the information to the control unit 462.

The control unit 462 controls operation of the entire management server 451. The control unit 462 includes a discount rate calculation unit 471, a dispatch management unit 472, and a fare calculation unit 473.

The discount rate calculation unit 471 calculates a discount rate for the fare, which is a compensation for the service to be provided, for each user. The dispatch management unit 472 performs dispatch control of the vehicles to be used for provision of the service on the basis of the position information from the terminal device 401. The fare calculation unit 473 calculates the fare at the time of use of the service.

The recording unit 463 includes, for example, a nonvolatile recording medium, and records various kinds of information such as information regarding registration of each user who is the user of the service. In addition, the recording unit 463 supplies the recorded information to the control unit 462 as necessary.

<Configuration Example of Vehicle>

In addition, FIG. 36 illustrates a configuration example of the vehicle that is managed by the taxi company and transports the user who uses the service to the destination. A vehicle 501 illustrated in FIG. 36 includes a communication unit 511, a getting-in/off information acquisition unit 512, a control unit 513, a recording unit 514, and a display unit 515. This vehicle 501 corresponds to the vehicle TX11 illustrated in FIG. 33.

The communication unit 511 receives information transmitted from an external device, supplies the information to the control unit 513, and transmits information supplied from the control unit 513 to an external device.

The getting-in/off information acquisition unit 512 includes, for example, a camera, a sensor and the like, and acquires getting-in/off information for detecting getting in and getting off of the user and supplies the getting-in/off information to the control unit 513.

The control unit 513 controls operation of the entire vehicle 501. The control unit 513 includes, for example, a driving control unit 521 and a getting-in/off determination unit 522. The driving control unit 521 controls driving of the vehicle 501, that is, traveling of the vehicle 501. The getting-in/off determination unit 522 determines getting-in and getting-off of the user on the basis of the getting-in/off information supplied from the getting-in/off information acquisition unit 512.

The recording unit 514 includes a nonvolatile recording medium, for example, and records information supplied from the control unit 513 and supplies the recorded information to the control unit 513 as necessary. The display unit 515 includes, for example, a liquid crystal display panel and the like, and displays information and images supplied from the control unit 513.

<Setting of Position Information Transmission>

By the way, the user can always set whether or not to transmit its own position information to the management server 451 by the terminal device 401.

Figure 37:
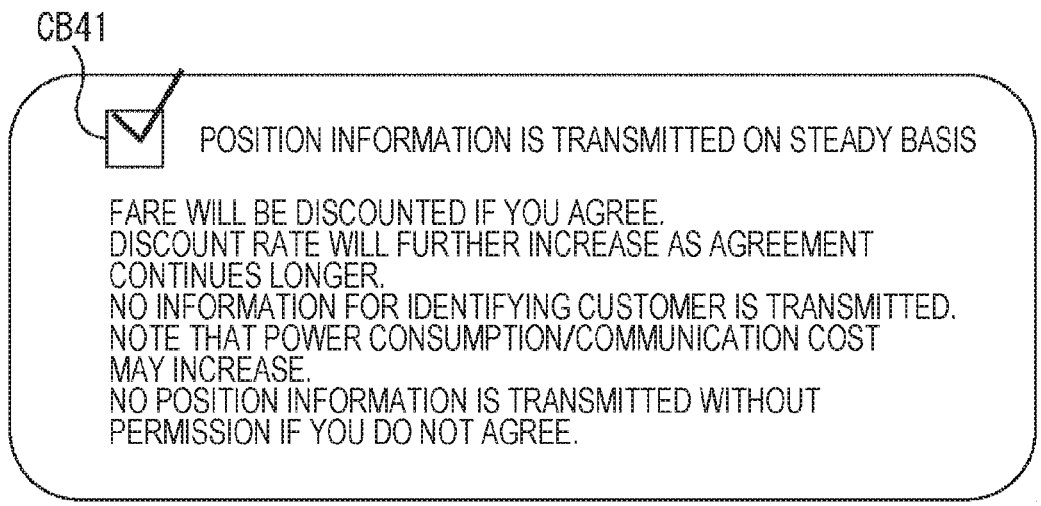
FIG. 37 is a diagram illustrating a display example of a setting screen.

For example, in the case of setting such transmission of the position information, a setting screen illustrated in FIG. 37 is displayed on the display unit 416 of the terminal device 401.

Character information "The position information is transmitted on a steady basis.", which indicates constant transmission of the position information, and a check box CB41 for confirming the setting are displayed on the setting screen.

Further, a message including explanation of the discount that can be given if transmitting the position information, explanation of the discount for prompting the user to constantly transmit the position information, and explanation of the risk associated with the constant transmission of the position information is also displayed on the setting screen.

For example, when the user operates the input unit 414 to operate the check box CB41 and a check symbol is displayed in the check box CB41, constant transmission of the position information is set. In this case, the control unit 413 generates a transmission flag for transmitting the position information on the basis of a signal from the input unit 414, and records the transmission flag in the recording unit 415.

In this case, the position information is transmitted to the management server 451 on a steady basis, in more detail, with a fixed period and the like. Note that, since the management server 451 only has to know how many and where users are, information that can identify the user himself/herself is not transmitted at the time of transmitting the position information. The information that can identify the user himself/herself is transmitted only when personal identification is required, such as at the time of dispatch, for example.

On the other hand, when the check symbol is not displayed in the check box CB41, non-constant transmission of the position information is set. In this case, the control unit 413 generates a transmission flag for not transmitting the position information on the basis of a signal from the input unit 414, and records the transmission flag in the recording unit 415.

Figure 38:
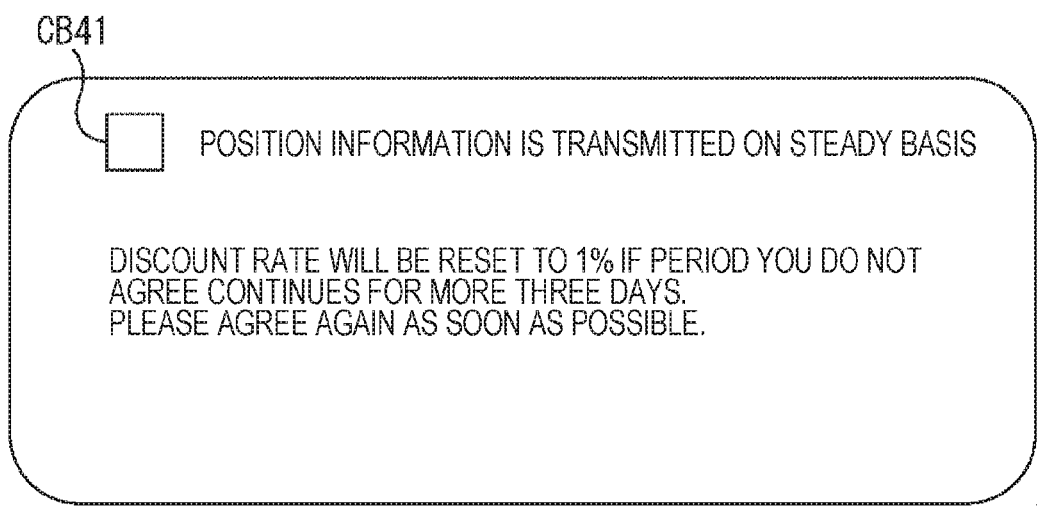
FIG. 38 is a diagram illustrating a display example of the setting screen.
Figure 39:
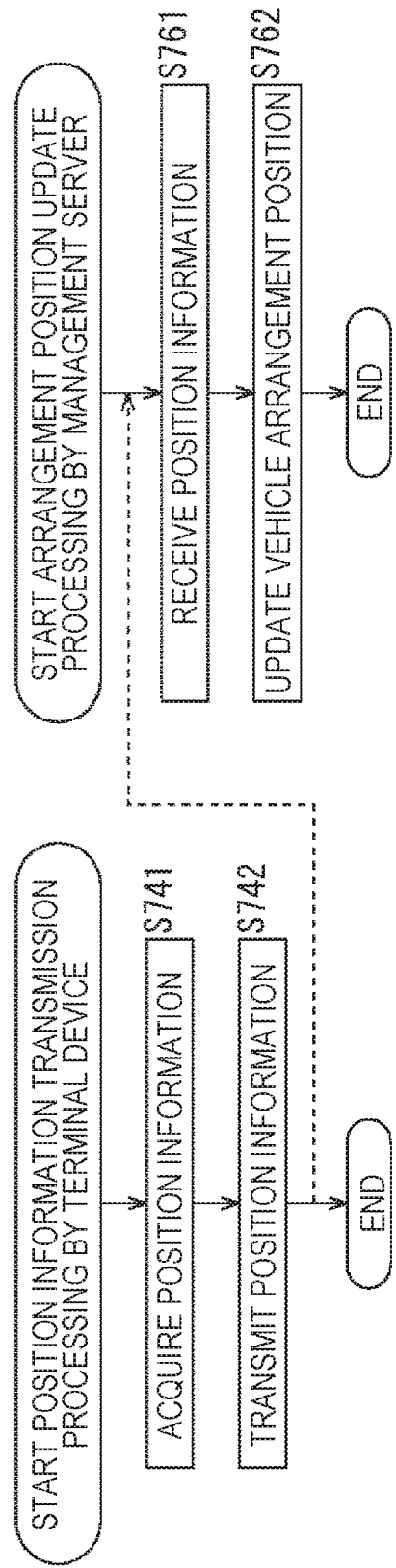
FIG. 39 is a flowchart for describing position information transmission processing and arrangement position update processing.

When the check symbol is not displayed in the check box CB41 in this manner, character information indicating explanation regarding cancellation of the constant transmission of the position information is displayed on the setting screen, as illustrated in FIG. 38, for example. Note that, in FIG. 38, a portion corresponding to the case in FIG. 37 is denoted by the same reference numeral, and description thereof is omitted.

In this example, explanation informing that the discount rate is reset if the cancellation state of the constant transmission continues for a predetermined number of days is displayed on the setting screen. For example, in the case where the constant transmission of the position information is once cancelled, the management server 451 is configured to initialize the count of the number of days until the discount rate is reset, only when the setting to constantly transmit the position information continues for a predetermined period.

In the terminal device 401, a transmission flag indicating whether or not to constantly transmit the position information set by the user is recorded in the recording unit 415. Further, this transmission flag is also transmitted to the management server 451 by the communication unit 411.

In the management server 451, the communication unit 461 receives the transmission flag transmitted from the terminal device 401 and supplies the transmission flag to the control unit 462, and the control unit 462 supplies the transmission flag supplied from the communication unit 461 to the recording unit 463 to record the transmission flag.

Further, for example, the recording unit 463 records continuation setting information in association with the transmission flag, the continuation setting information indicating how many days to continuously and constantly transmit the position information is set by the user, that is, which value of the transmission flag is set, the value indicating how many days to continuously and constantly transmit the position information.

The management server 451 can calculate the discount rate of each user by managing the transmission flag and the continuation setting information of each user.

<Description of Position Information Transmission Processing and Arrangement Position Update Processing>

Next, specific operation of the above-described transportation service system will be described.

First, position information transmission processing by the terminal device 401 and arrangement position update processing by the management server 451 will be described.

In the case where the transmission flag recorded in the terminal device 401 has the value indicating transmission of the position information, the terminal device 401 transmits the position information to the management server 451 with a fixed period.

That is, in step S741, the control unit 413 acquires the position information output from the position information acquisition unit 412 and supplies the position information to the communication unit 411.

In step S742, the communication unit 411 transmits the position information supplied from the control unit 413 to the management server 451, and the position information transmission processing is terminated.

Then, in step S761, the communication unit 461 of the management server 451 receives the position information transmitted from the terminal device 401 and supplies the position information to the control unit 462.

In step S762, the dispatch management unit 472 updates an arrangement position of each vehicle 501 on the basis of the position information received from the terminal device 401 of each user, and the arrangement position update processing is terminated.

For example, the dispatch management unit 472 generates arrangement instruction information instructing stop at the arrangement position after update or going round of the vehicle 501, for each vehicle 501, on the basis of the received position information, and supplies the arrangement instruction information to the communication unit 461. Then, the communication unit 461 transmits the arrangement instruction information supplied from the dispatch management unit 472 to the vehicle 501.

Then, the communication unit 511 of the vehicle 501 receives the arrangement instruction information transmitted from the management server 451 and supplies the arrangement instruction information to the control unit 513. Further, the driving control unit 521 appropriately causes the vehicle 501 to drive on the basis of the arrangement instruction information supplied from the communication unit 511, and moves the vehicle 501 to the instructed arrangement position.

As described above, the management server 451 receives the position information from each terminal device 401, updates the arrangement position of the vehicle 501, and arranges the vehicle 501 at an appropriate position. As a result, the dispatch efficiency of the vehicle 501 can be improved.

<Description of Discount Rate Information Transmission Processing and Discount Rate Information Reception Processing>

Further, the management server 451 generates discount rate information that is information regarding a discount for the user at predetermined timing such as the fixed period or when the setting of the constant transmission of the position information is changed, and transmits the discount rate information to the terminal device 401.

Figure 40:
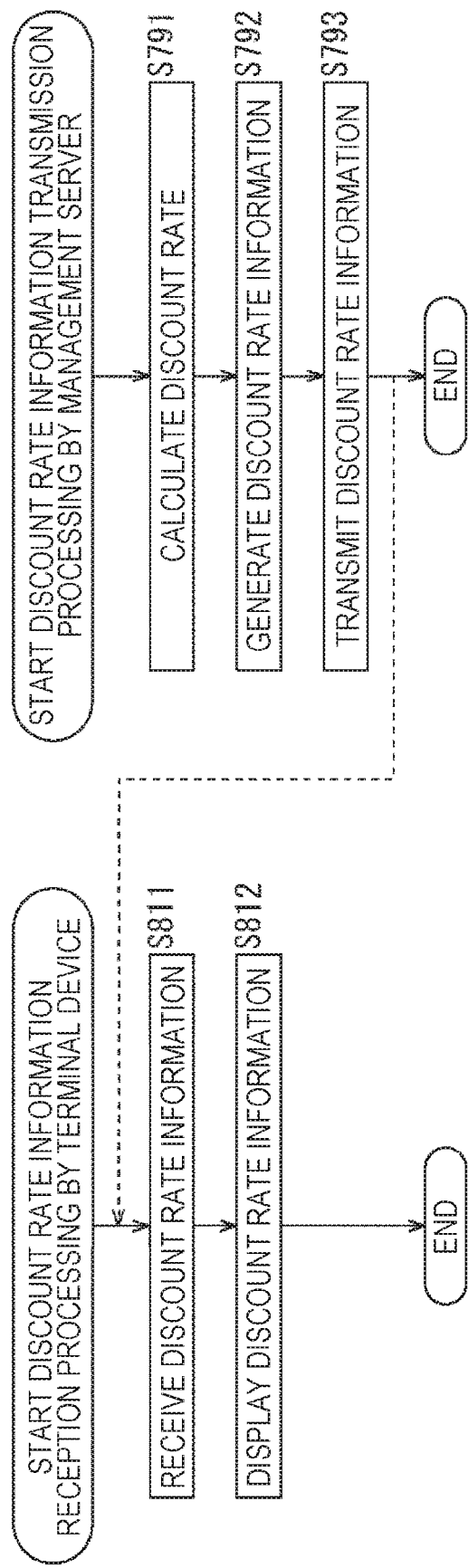
FIG. 40 is a flowchart for describing discount rate information reception processing and discount rate information transmission processing.

Hereinafter, processing performed in such a case will be described with reference to a flowchart of FIG. 40. That is, hereinafter, discount rate information transmission processing by the management server 451 and discount rate information reception processing by the terminal device 401 will be described with reference to the flowchart in FIG. 40.

In step S791, the discount rate calculation unit 471 of the management server 451 calculates the discount rate of the fare for the user on the basis of the continuation setting information and the transmission flag recorded in the recording unit 463.

For example, for a user with the transmission flag that is continuously set to the non-constant transmission of the position information for a predetermined period, the discount rate of the user is set to a predetermined value such as 1%. Further, for example, for a user with the transmission flag that is continuously set to the constant transmission of the position information, the discount rate of the user is set to become larger as the number of continuation days indicated by the continuation setting information is larger.

The discount rate calculation unit 471 supplies the discount rate calculated in this manner to the recording unit 463 to record the discount rate together with the continuation setting information and the transmission flag, for each user. Note that, here, the example in which the discount of the fare for the user is performed on the basis of the discount rate has been described. However, the discount of fare may be performed by determining the discount amount for each user.

In step S792, the discount rate calculation unit 471 generates discount rate information for notifying information such as the discount rate that the user can receive on the basis of the discount rate calculated in step S791, and supplies the discount rate information to the communication unit 461.

For example, the discount rate information may include a target discount rate and user's behavior necessary for getting the target discount rate, various notifications to the user, and the like.

In step S793, the communication unit 461 transmits the discount rate information supplied from the discount rate calculation unit 471 to the terminal device 401, and the discount rate information transmission processing is terminated.

Further, in step S811, the communication unit 411 of the terminal device 401 receives the discount rate information transmitted from the management server 451 and supplies the discount rate information to the control unit 413.

In step S812, the display control unit 422 supplies the discount rate information supplied from the communication unit 411 to the display unit 416 to display the discount rate information, and the discount rate information reception processing is terminated.

Figure 41:
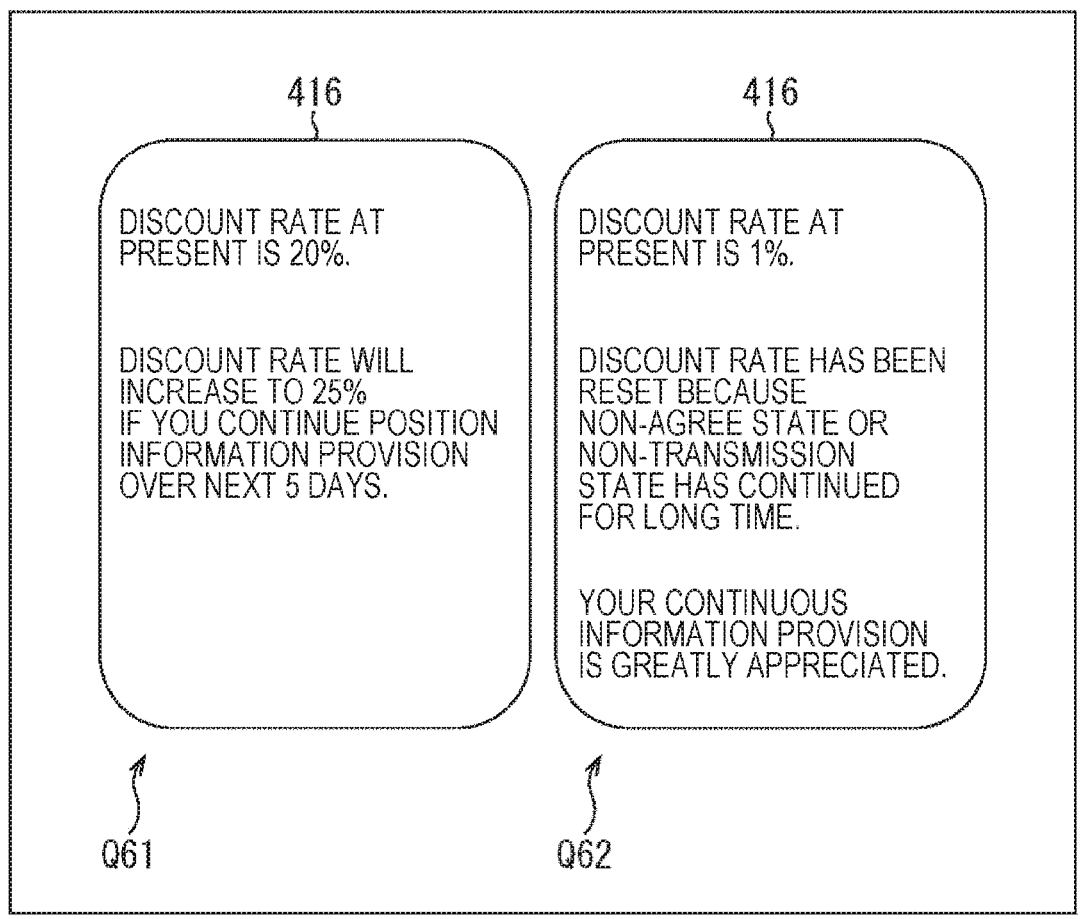
FIG. 41 is a diagram illustrating an example of discount rate information.

For example, the discount rate information illustrated in FIG. 41 is displayed on the display unit 416.

For example, in the example illustrated by the arrow Q61 in FIG. 41, character information "The discount rate at the present time is 20%.", which indicates the discount rate at the present time, is displayed on the display screen of the discount rate information.

Further, character information "The discount rate will increase to 25% if you continue to provide the position information over the next five days.", which indicates the target discount rate and the user's behavior necessary for getting the target discount rate is also displayed. That is, the target discount rate and an advice for achieving the goal are displayed. By setting the goal with such display, the user can be prompted to further continuously provide the position information.

In the example illustrated by the arrow Q62, character information "The discount rate at the present time is 1%.", which indicates the discount rate at the present time is displayed on the display screen of the discount rate information. Further, character information informing that the discount rate has been reset because no transmission is made for the position information, and character information (message) for prompting provision of the position information are displayed.

As described above, the management server 451 calculates the discount rate for each user and transmits the discount rate information indicating the discount rate to the terminal device 401. As a result, the terminal device 401 can present the discount rate to the user. Further, by setting the discount rate according to the provision state the position information, a more appropriate compensation for the service can be calculated for each user.

<Description of Reservation Processing, Acceptance Processing, and Transportation Processing>

Next, processing performed by the transportation service system when the user receives the transportation service with the vehicle 501 will be described. That is, hereinafter, reservation processing by the terminal device 401, acceptance processing by the management server 451, and transportation processing by the vehicle 501 will be described with reference to the flowchart in FIG. 42.

In step S821, the reservation processing unit 421 of the terminal device 401 generates dispatch reservation information for transportation service, that is, for reserving dispatch of the vehicle 501, on the basis of a signal from the input unit 414.

Figure 43:
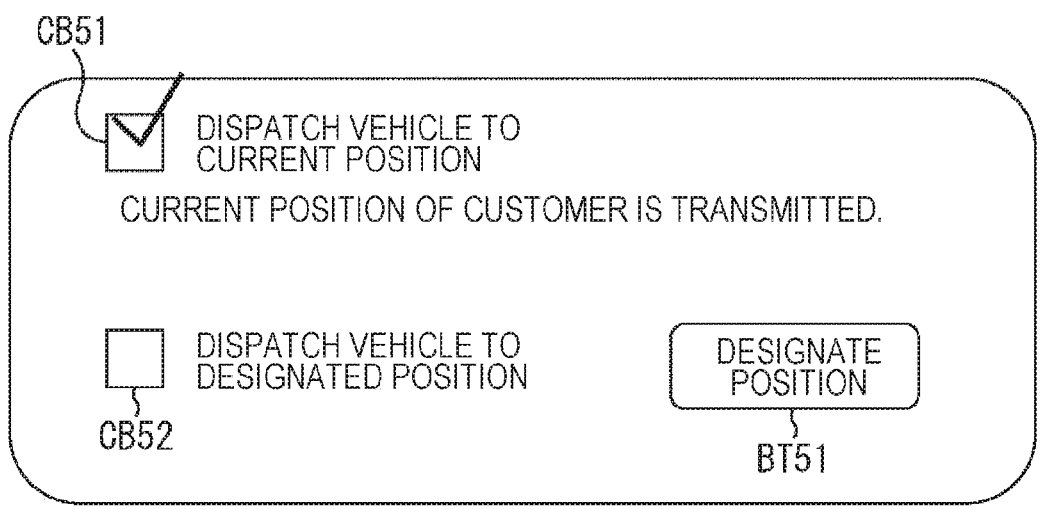
FIG. 43 is a diagram illustrating a display example of a reservation screen.

For example, when the user operates the input unit 414 to instruct reservation of dispatch, the display control unit 422 controls the display unit 416 to display a reservation screen illustrated in FIG. 43. The reservation of dispatch is made, for example, a few hours before or a few minutes before a desired getting-in time.

A check box CB51 operated when dispatching the vehicle 501 to the current position of the user, and a check box CB52 operated when dispatching the vehicle 501 to the position designated by the user are displayed on the reservation screen illustrated in FIG. 43. Further, a position designating button BT51 for designating a specific dispatch position when the check box CB52 is operated is displayed on the reservation screen.

For example, in the case of instructing dispatch to the current position of the user, the user operates the input unit 414 to display a check symbol in the check box CB51.

In contrast, in the case of instructing dispatch to the place designated by the user, the user operates the input unit 414 to display the check symbol in the check box CB52. At this time, the user operates the position designating button BT51 to designate the dispatch position.

For example, when the position designating button BT51 is operated, a map is displayed on the display unit 416 so that the user can designate a desired position on the map as the dispatch position. Note that the designation of the dispatch position is not limited to the designation of the position on the map, and designation may be able to be made by, for example, searching for or inputting the dispatch position.

When the instruction of dispatch is made in this manner, the reservation processing unit 421 generates dispatch reservation information including information indicating the dispatch position, information indicating the desired dispatch time, user identification information for specifying the user, and the like on the basis of a signal from the input unit 414.

Note that, in the case where the current position of the user is designated as the dispatch position, the user identification information for identifying the user himself/herself and the position information obtained in the position information acquisition unit 412 may be transmitted to the management server 451 a few minutes before the desired dispatch time, or the like, separately from the dispatch reservation information, rather than the information indicating the dispatch position being included in the dispatch reservation information.

Figure 42:
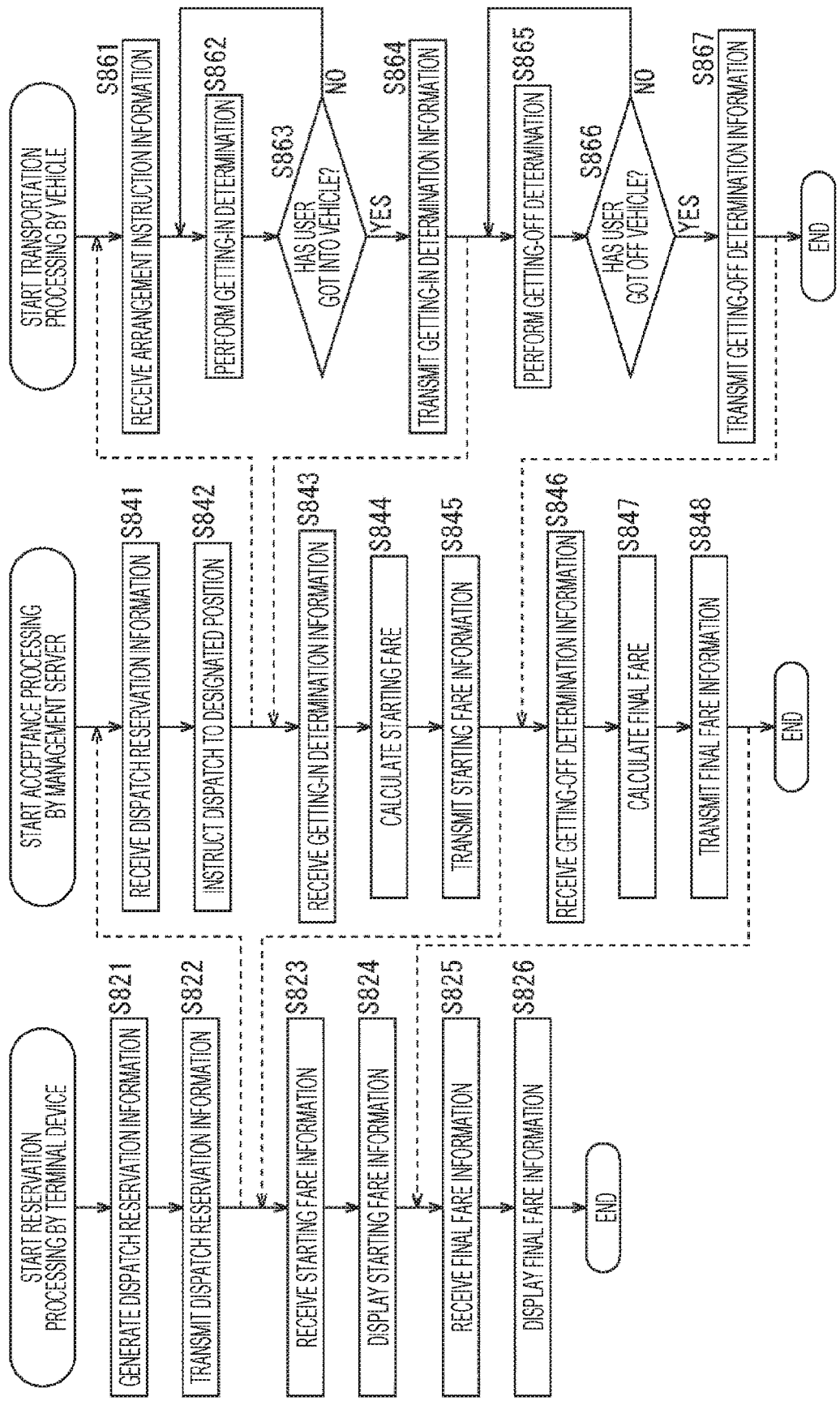
FIG. 42 is a flowchart for describing application processing, acceptance processing, and transportation processing.

Referring back to the description of the flowchart in FIG. 42, when the reservation processing unit 421 generates the dispatch reservation information, the reservation processing unit 421 supplies the dispatch reservation information to the communication unit 411.

In step S822, the communication unit 411 transmits the dispatch reservation information supplied from the reservation processing unit 421 to the management server 451.

Then, in step S841, the communication unit 461 of the management server 451 receives the dispatch reservation information transmitted from the terminal device 401 and supplies the dispatch reservation information to the control unit 462.

The control unit 462 appropriately accepts the dispatch reservation on the basis of the dispatch reservation information supplied from the communication unit 461.

In step S842, the dispatch management unit 472 instructs the vehicle 501 to be dispatched to the designated position on the basis of the dispatch reservation information received in step S841.

For example, the dispatch management unit 472 generates arrangement instruction information in which the position indicated by the information is the arrangement position, on the basis of the information indicating the dispatch position, which is included in the dispatch reservation information, and supplies the arrangement instruction information to the communication unit 461. Further, the communication unit 461 transmits the arrangement instruction information supplied from the dispatch management unit 472 to the vehicle 501. Here, a transmission destination of the arrangement instruction information is, for example, the vehicle 501 presenting in the vicinity of the arrangement position indicated by the arrangement instruction information and having no passengers at the present time, or the like.

When the arrangement instruction information is transmitted to the vehicle 501, the communication unit 511 of the vehicle 501 receives the arrangement instruction information transmitted from the management server 451 and supplies the arrangement instruction information to the control unit 513 in step S861.

Further, the driving control unit 521 causes the vehicle 501 to travel in accordance with the arrangement instruction information supplied from the communication unit 511, and moves the vehicle 501 to the position indicated by the arrangement instruction information.

In step S862, the getting-in/off determination unit 522 determines whether the user has got into the vehicle on the basis of the getting-in/off information supplied from the getting-in/off information acquisition unit 512.

For example, getting-in determination, that is, determination as to whether or not the user has got into the vehicle may be performed by any method. For example, in the case where an image captured by the camera as the getting-in/off information acquisition unit 512 is obtained as the getting-in/off information, the getting-in/off determination unit 522 determines whether the user has got into the vehicle by performing image recognition or the like for the image as the getting-in/off information.

Alternatively, for example, the getting-in determination may be made on the basis of opening and closing of the door of the vehicle 501 or an attachment state of the seatbelt, which is obtained by the sensor as the getting-in/off information acquisition unit 512, or a detection result of proximity of the terminal device 401 possessed by the user to the vehicle 501, using the near field wireless communication, or the like. Such getting-in determination is performed, for example, a few minutes before the desired dispatch time of the user. Note that information necessary for identifying the user and the desired dispatch time of the user may be supplied from the management server 451 to the vehicle 501.

In step S863, the getting-in/off determination unit 522 determines whether or not the user has got into the vehicle. In the case where the user is determined not to have got into the vehicle in step S863, the processing returns to step S862, and the above processing is repeated.

On the other hand, in the case where the user is determined to have got into the vehicle in step S863, the getting-in/off determination unit 522 generates getting-in determination information indicating that the user has got into the vehicle and supplies the getting-in determination information to the communication unit 511, and the processing proceeds to step S864.

In step S864, the communication unit 511 transmits the getting-in determination information supplied from the getting-in/off determination unit 522 to the management server 451.

When the user has got into the vehicle, the vehicle 501 appropriately moves to the destination designated by the user while communicating with the management server 451. Note that the destination may be designated at the time of reservation of dispatch and information indicating the destination may be included in the dispatch reservation information or may be designated after the user gets in the vehicle 501.

Further, when the getting-in determination information is transmitted, the communication 461 of the management server 451 receives the getting-in determination information transmitted from the vehicle 501 and supplies the getting-in determination information to the control unit 462 in step S843. By receiving such getting-in determination information, the management server 451 can grasp that the user has got into the vehicle 501.

In step S844, the fare calculation unit 473 calculates a starting fare on the basis of the discount rate of the user recorded in the recording unit 463, and generates starting fare information indicating the fare.

For example, the starting fare is an amount obtained by multiplying a basic fare that is an amount of a predetermined starting fare by the discount rate of the user. The fare calculation unit 473 supplies the generated starting fare information to the communication unit 461.

In step S845, the communication unit 461 transmits the starting fare information supplied from the fare calculation unit 473 to the terminal device 401.

Then, in step S823, the communication unit 411 of the terminal device 401 receives the starting fare information transmitted from the management server 451 and supplies the starting fare information to the control unit 413.

In step S824, the display control unit 422 supplies the starting fare information supplied from the communication unit 411 to the display unit 416 to display the starting fare information. As a result, the user knows the starting fare after discount. Note that, here, the example of transmitting the starting fare information to the terminal device 401 has been described. However, the starting fare information may be transmitted to the vehicle 501, and the vehicle 501 may display the starting fare information.

Further, when the vehicle 501 arrives at the destination, the vehicle 501 determines whether or not the user has got off the vehicle, that is, performs getting-off determination of the user.

In step S865, the getting-in/off determination unit 522 performs getting-off determination of the user on the basis of the getting-in/off information supplied from the getting-in/off information acquisition unit 512.

In the getting-off determination, for example, in the case where an image captured by the camera as the getting-in/off information acquisition unit 512 is obtained as the getting-in/off information, the getting-in/off determination unit 522 determines whether the user has got off the vehicle by specifying whether or not the user becomes unobserved on the image as the getting-in/off information.

Alternatively, for example, the getting-off determination may be made on the basis of opening and closing of the door of the vehicle 501 or an attachment state of the seatbelt, which is obtained by the sensor as the getting-in/off information acquisition unit 512, or a detection result of proximity of the terminal device 401 possessed by the user to the vehicle 501, using the near field wireless communication, or the like.

Note that, in step S865 or S866, whether or not the vehicle has arrived at the destination may be determined instead of determining whether or not the user has got off the vehicle.

In step S866, the getting-in/off determination unit 522 determines whether or not the user has got off the vehicle. In the case where the user is determined not to have got off the vehicle in step S866, the processing returns to step S865, and the above processing is repeated.

On the other hand, in the case where the user is determined to have got off the vehicle in step S866, the getting-in/off determination unit 522 generates getting-off determination information indicating that the user has got off the vehicle and supplies the getting-off determination information to the communication unit 511, and the processing proceeds to step S867.

In step S867, the communication unit 511 transmits the getting-off determination information supplied from the getting-in/off determination unit 522 to the management server 451, and the transportation processing is terminated.

Further, when the getting-off determination information is transmitted, the communication 461 of the management server 451 receives the getting-off determination information transmitted from the vehicle 501 and supplies the getting-off determination information to the control unit 462 in step S846. By receiving such getting-off determination information, the management server 451 can grasp that the user has got off the vehicle 501.

In step S847, the fare calculation unit 473 calculates the final fare on the basis of the discount rate of the user recorded in the recording unit 463, the travel distance and travel time of the vehicle 501, and the like, and transmits the final fare information. Note that the management server 451 can obtain the travel distance and travel time of the vehicle 501 by appropriately communicating with the vehicle 501.

For example, the final fare is an amount obtained by multiplying a general fare calculated from the seat load time, the travel distance, or the like of the user by the discount rate of the user. The fare calculation unit 473 supplies the generated final fare information to the communication unit 461.

In step S848, the communication unit 461 transmits the final fare information supplied from the fare calculation unit 473 to the terminal device 401, and the acceptance processing is terminated.

Then, in step S825, the communication unit 411 of the terminal device 401 receives the final fare information transmitted from the management server 451 and supplies the final dare to the control unit 413.

In step S826, the display control unit 422 supplies the final fare information supplied from the communication unit 411 to the display unit 416 to display the final fare information, and the reservation processing is terminated. As a result, the user knows the final fare after discount. Note that, here, the example of transmitting the final fare information to the terminal device 401 has been described. However, the final fare information may be transmitted to the vehicle 501, and the vehicle 501 may display the final fare information.

As described above, the management server 451 receives the dispatch reservation information from the terminal device 401, accepts the dispatch reservation, calculates the fare on the basis of the getting-in determination information and the getting-off determination information from the vehicle 501, and transmits the starting fare information and the final fare information to the terminal device 401. As a result, the user can receive the transportation service without performing troublesome procedures.

Note that, in the present technology, the above-described embodiments may be combined as appropriate.

By the way, the above-described series of processing described above can be executed by hardware or software. In the case of executing the series of processing by software, a program that configures the software is installed in a computer. Here, the computer includes a computer incorporated in dedicated hardware, and a general-purpose personal computer and the like capable of executing various functions by installing various programs, for example.

Figure 44:
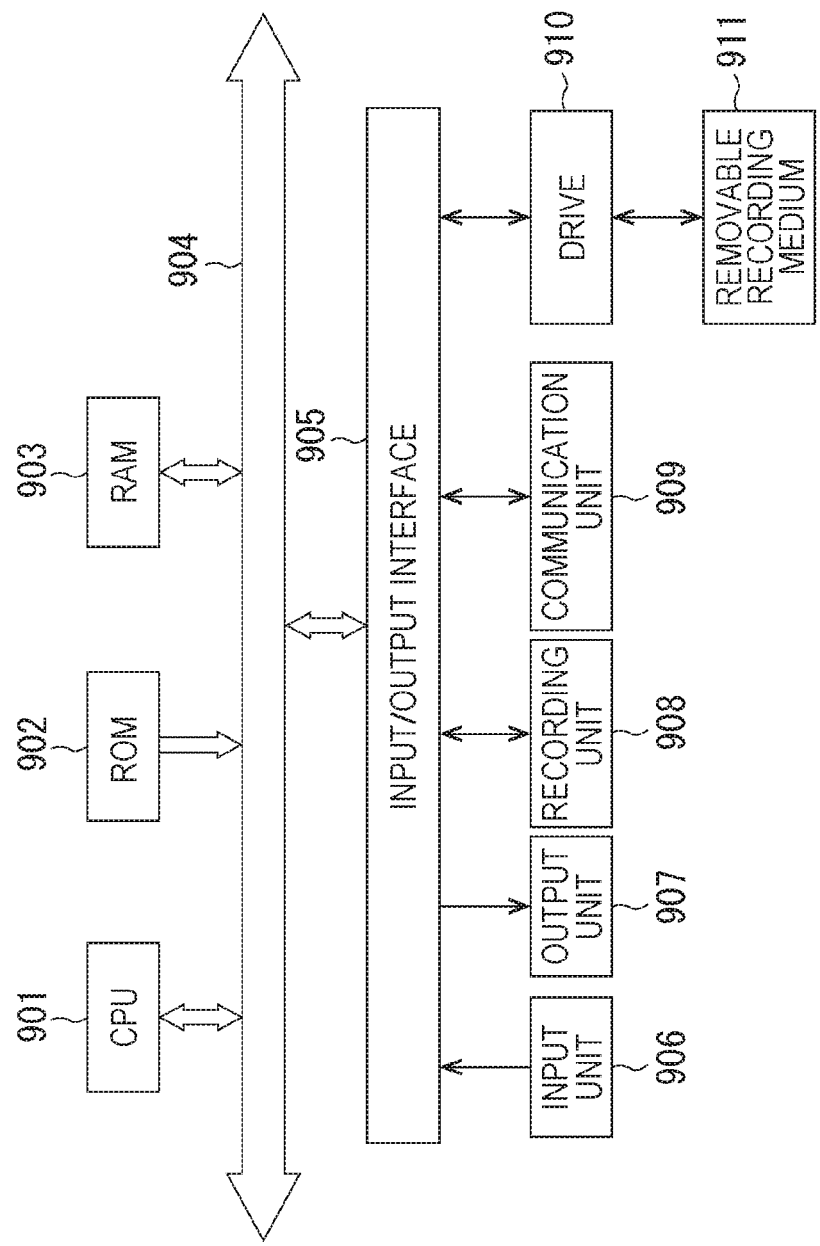
FIG. 44 is a diagram illustrating a configuration example of a computer.

FIG. 44 is a block diagram illustrating a configuration example of hardware of a computer that executes the above-described series of processing by a program.

In the computer, a central processing unit (CPU) 901, a read only memory (ROM) 902, and a random access memory (RAM) 903 are mutually connected by a bus 904.

Further, an input/output interface 905 is connected to the bus 904. An input unit 906, an output unit 907, a recording unit 908, a communication unit 909, and a drive 910 are connected to the input/output interface 905.

The input unit 906 includes a keyboard, a mouse, a microphone, an imaging element, and the like. The output unit 907 includes a display, a speaker, and the like. The recording unit 908 includes a hard disk, a nonvolatile memory, and the like. The communication unit 909 includes a network interface and the like. The drive 910 drives a removable recording medium 911 such as a magnetic disk, an optical disk, a magneto-optical disk, or a semiconductor memory.

In the computer configured as described above, the CPU 901 loads a program recorded in the recording unit 908 into the RAM 903 and executes the program via the input/output interface 905 and the bus 904, whereby the above-described series of processing is performed, for example.

The program to be executed by the computer (CPU 901) can be recorded on the removable recording medium 911 as a package medium or the like, for example, and can be provided. Further, the program can be provided via a wired or wireless transmission medium such as a local area network, the Internet, or digital broadcast.

In the computer, the removable recording medium 911 is attached to the drive 910, whereby the program can be installed in the recording unit 908 via the input/output interface 905. Further, the program can be received by the communication unit 909 via a wired or wireless transmission medium and installed in the recording unit 908. Other than the above method, the program can be installed in the ROM 902 or the recording unit 908 in advance.

Note that the program executed by the computer may be a program processed in chronological order according to the order described in the present specification or may be a program executed in parallel or at necessary timing such as when a call is made.

Further, embodiments of the present technology are not limited to the above-described embodiments, and various modifications can be made without departing from the gist of the present technology.

For example, in the present technology, a configuration of cloud computing in which one function is shared and processed in cooperation by a plurality of devices via a network can be adopted.

Further, the steps described in the above-described flowcharts can be executed by one device or can be executed by a plurality of devices in a shared manner.

Furthermore, in the case where a plurality of processes is included in one step, the plurality of processes included in the one step can be executed by one device or can be shared and executed by a plurality of devices.

Furthermore, the present technology may be configured as follows.

(1)

An information processing apparatus including:

a reception unit configured to receive health state information regarding a health state of a user;

a calculation unit configured to calculate a compensation for a service on the basis of the health state information before getting-in to a vehicle by the user or before presenting the compensation for the service regarding the getting-in to a vehicle to the user; and a transmission unit configured to transmit information indicating the compensation for the service.

(2)

The information processing apparatus according to (1), in which the health state information is information regarding behavior of the user.

(3)

The information processing apparatus according to (2), in which the information regarding behavior of the user is information indicating the behavior of the user at each time including at least sleep or labor.

(4)

The information processing apparatus according to (2) or (3), in which the transmission unit transmits information indicating a relationship between the compensation for the service or the behavior of the user.

(5)

The information processing apparatus according to any one of (1) to (4), in which the health state information is information regarding a biological state of the user.

(6)

The information processing apparatus according to (5), in which the information regarding a biological state of the user is information indicating the biological state of the user at each time including at least one of a blood pressure, a heart rate, a respiratory rate, and a degree of fatigue.

(7)

The information processing apparatus according to (5) or (6), in which the transmission unit transmits information indicating a relationship between a type or an amount of the information regarding a biological state of the user provided by the user and the compensation for the service.

(8)

The information processing apparatus according to any one of (1) to (7), in which the compensation for the service is an insurance premium of automobile insurance.

(9)

The information processing apparatus according to (8), in which the calculation unit calculates the compensation for the service on the basis of the health state information in a predetermined period immediately before the user drives the vehicle.

(10)

The information processing apparatus according to (9), in which the reception unit further receives the health state information of when the user is driving the vehicle, and driving state information indicating a driving state of the vehicle by the user, the information processing apparatus further including:

a dangerous driving determination unit configured to determine whether or not the user has performed dangerous driving on the basis of the driving state information of when the user is driving the vehicle, in which the calculation unit calculates the compensation for the service on the basis of the health state information in the predetermined period immediately before the user drives the vehicle and the health state information of when the user has performed the dangerous driving.

(11)

The information processing apparatus according to claim (8) or (9), in which the reception unit further receives fatigue degree estimation information indicating the fatigue degree of the user, and the calculation unit corrects the compensation for the service on the basis of the fatigue degree estimation information.

(12)

The information processing apparatus according to any one of (1) to (11), in which the calculation unit calculates the compensation for the service on the basis of the health state information and information regarding the getting-in by the user.

(13)

The information processing apparatus according to claim 12, in which the information regarding the getting-in by the user is at least one of a type of the vehicle, a driving start time, and a scheduled driving time.

(14)

An information processing method including steps of:

receiving health state information regarding a health state of a user;

calculating a compensation for a service on the basis of the health state information before getting-in to a vehicle by the user or before presenting the compensation for the service regarding the getting-in to a vehicle to the user; and transmitting information indicating the compensation for the service.

(15)

A program for causing a computer to execute processing including steps of:

receiving health state information regarding a health state of a user;

calculating a compensation for a service on the basis of the health state information before getting-in to a vehicle by the user or before presenting the compensation for the service regarding the getting-in to a vehicle to the user; and transmitting information indicating the compensation for the service.

(16)

An information processing apparatus including:

a recording unit configured to record health state information regarding a health state of a user;

a communication unit configured to transmit the health state information for calculating a compensation for a service regarding getting-in to a vehicle by the user, and receive information indicating the compensation for the service; and a display control unit configured to control display of the information regarding the compensation for the service.

(17)

The information processing apparatus according to (16), in which the health state information is information regarding behavior of the user.

(18)

The information processing apparatus according to (17), in which the information regarding behavior of the user is information indicating the behavior of the user at each time including at least sleep or labor.

(19)

The information processing apparatus according to (17) or (18), in which the communication unit receives information indicating a relationship between the compensation for the service and the behavior of the user, and the display control unit controls display of information indicating the relationship between the compensation for the service and the behavior of the user.

(20)

The information processing apparatus according to any one of (16) to (19), in which the health state information is information regarding a biological state of the user.

(21)

The information processing apparatus according to (20), in which the information regarding a biological state of the user is information indicating the biological state of the user at each time including at least one of a blood pressure, a heart rate, a respiratory rate, and a degree of fatigue.

(22)

The information processing apparatus according to (20) or (21), in which the communication unit receives information indicating a relationship between a type or an amount of the information regarding a biological state of the user provided by the user and the compensation for the service, and the display control unit controls display of the information indicating a relationship between a type or an amount of the information regarding a biological state of the user and the compensation for the service (23)

The information processing apparatus according to any one of (16) to (22), in which the compensation for the service is an insurance premium of automobile insurance.

(24)

The information processing apparatus according to (23), further including:

a driving determination processing unit configured to determine whether or not the user is driving the vehicle, in which the communication unit transmits the health state information in a predetermined period immediately before the user drives the vehicle.

(25)

The information processing apparatus according to (23), further including:

a driving determination processing unit configured to determine whether or not the user is driving the vehicle; and a driving state information generation unit configured to generate driving state information indicating a driving state of the vehicle by the user, in which the communication unit transmits the health state information and the driving state information of when the user is driving the vehicle.

(26)

An information processing method including steps of:

recording health state information regarding a health state of a user;

transmitting the health state information for calculating a compensation for a service regarding getting-in to a vehicle by the user, and receiving information indicating the compensation for the service; and controlling display of the information regarding the compensation for the service.

(27)

A program for causing a computer to execute processing including steps of:

recording health state information regarding a health state of a user;

transmitting the health state information for calculating a compensation for a service regarding getting-in to a vehicle by the user, and receiving information indicating the compensation for the service; and controlling display of the information regarding the compensation for the service.

(28)

An information processing apparatus including:

an authentication processing unit configured to authenticate a user who has got into a vehicle;

a health state information acquisition unit configured to acquire health state information regarding a health state of the authenticated user; and a communication unit configured to transmit the health state information for calculating a compensation for a service regarding getting-in to the vehicle by the user, and receive information indicating the compensation for the service.

(29)

The information processing apparatus according to (28), in which the health state information acquisition unit acquires the health state information from a terminal device of the user.

(30)

The information processing apparatus according to (28) or (29), further including:

a display control unit configured to control display of the information indicating the compensation for the service.

(31)

The information processing apparatus according to (28) or (29), in which the communication unit transmits the information regarding the compensation for the service to a terminal device of the user.

(32)

The information processing apparatus according to any one of (28) to (31), in which the health state information is information regarding a biological state of the user.

(33)

The information processing apparatus according to (32), in which the information regarding a biological state of the user is information indicating the biological state of the user at each time including at least one of a blood pressure, a heart rate, a respiratory rate, and a degree of fatigue.

(34)

The information processing apparatus according to any one of (28) to (33), in which the compensation for the service is an insurance premium of automobile insurance.

(35)

An information processing method including steps of:

authenticating a user who has got into a vehicle;

acquiring health state information regarding a health state of the authenticated user; and transmitting the health state information for calculating a compensation for a service regarding getting-in to the vehicle by the user, and receiving information indicating the compensation for the service.

(36)

A program for causing a computer to execute processing including steps of:

authenticating a user who has got into a vehicle;

acquiring health state information regarding a health state of the authenticated user; and transmitting the health state information for calculating a compensation for a service regarding getting-in to the vehicle by the user, and receiving information indicating the compensation for the service.

REFERENCE SIGNS LIST

11 Terminal device
12 Insurance management server
41 Communication unit
42 Driving information acquisition unit
43 Behavior information acquisition unit
44 Biological information acquisition unit
45 Control unit
48 Display unit
51 Driving determination processing unit
52 Time series data generation unit
53 Display control unit
81 Communication unit
83 Control unit
91 Insurance premium calculation unit
111 In-vehicle terminal device
121 Communication unit
122 Driver authentication information acquisition unit
123 Driving information acquisition unit
124 Control unit
127 Display unit
131 Authentication processing unit
132 Driving determination processing unit
133 Display control unit

The invention claimed is:

1. An information processing apparatus, comprising:
circuitry configured to:
receive, from a terminal device, biological information of a user, wherein
the biological information comprises a value of at least one of a blood pressure, a heart rate, or a respiratory rate, and a degree of fatigue, and
the degree of fatigue is based on a face recognition of the user;
calculate insurance information based on the biological information one of before detection of entry of the user into a vehicle or before presentation of the insurance information to the user, wherein the insurance information comprises at least one of a premium, an amount changed from an original premium, and the premium with the changed amount; and
transmit the insurance information to at least one of the terminal device or the vehicle.

2. The information processing apparatus according to claim 1, wherein the biological information corresponds to behavior of the user.

3. The information processing apparatus according to claim 1, wherein the circuitry is further configured to calculate the insurance information based on the biological information and information regarding the entry of the user into the vehicle.

4. An information processing method, comprising:
receiving, from a terminal device, biological information of a user, wherein
the biological information comprises a value of at least one of a blood pressure, a heart rate, or a respiratory rate, and a degree of fatigue, and
the degree of fatigue is based on a face recognition of the user;
calculating insurance information based on the biological information one of before detection of entry of the user into a vehicle or before presentation of the insurance information to the user, wherein the insurance information comprises at least one of a premium, an amount changed from an original premium, and the premium with the changed amount; and
transmitting the insurance information to at least one of the terminal device or the vehicle.

5. A non-transitory computer-readable medium having stored thereon, computer-executable instructions which, when executed by a computer, cause the computer to execute operations, the operations comprising:
receiving, from a terminal device, biological information of a user, wherein
the biological information comprises a value of at least one of a blood pressure, a heart rate, or a respiratory rate, and a degree of fatigue, and
the degree of fatigue is based on a face recognition of the user;
calculating insurance information based on the biological information one of before detection of entry of the user into a vehicle or before presentation of the insurance information to the user, wherein the insurance information comprises at least one of a premium, an amount changed from an original premium, and the premium with the changed amount; and
transmitting the insurance information to at least one of the terminal device or the vehicle.

6. An information processing apparatus, comprising:
circuitry configured to:
authenticate a user;
receive, from a terminal device, biological information of the authenticated user, wherein
the biological information comprises a value of at least one of a blood pressure, a heart rate, or a respiratory rate, and a degree of fatigue, and
the degree of fatigue is based on a face recognition of the user; and
transmit, one of before detection of entry of the user into a vehicle or before presentation of insurance information to the user, the biological information for calculation of the insurance information, wherein the insurance information comprises at least one of a premium, an amount changed from an original premium, and the premium with the changed amount.

7. The information processing apparatus according to claim 6, wherein the circuitry is further configured to:
control display of the insurance information.

8. The information processing apparatus according to claim 6, wherein the circuitry is further configured to:
transmit the insurance information to the terminal device of the authenticated user.

9. An information processing method, comprising:
authenticating a user;
receiving, from a terminal device, biological information of the authenticated user, wherein
the biological information comprises a value of at least one of a blood pressure, a heart rate, or a respiratory rate, and a degree of fatigue, and
the degree of fatigue is based on a face recognition of the user; and
transmitting, one of before detection of entry of the user into a vehicle or before presentation of insurance information to the user, the biological information for calculation of the insurance information, wherein the insurance information comprises at least one of a premium, an amount changed from an original premium, and the premium with the changed amount.

10. A non-transitory computer-readable medium having stored thereon, computer-executable instructions which, when executed by a computer, cause the computer to execute operations, the operations comprising:
authenticating a user;
receiving, from a terminal device, biological information of the authenticated user, wherein
the biological information comprises a value of at least one of a blood pressure, a heart rate, or a respiratory rate, and a degree of fatigue, and
the degree of fatigue is based on a face recognition of the user; and
transmitting, one of before detection of entry of the user into a vehicle or before presentation of insurance information to the user, the biological information for calculation of the insurance information, wherein the insurance information comprises at least one of a premium, an amount changed from an original premium, and the premium with the changed amount.

* * * * *